(12) United States Patent
Kuhn

(10) Patent No.: US 12,208,965 B2
(45) Date of Patent: Jan. 28, 2025

(54) CONVEYOR SYSTEM AND DRIVE SYSTEM FOR SAME

(71) Applicant: Motoveyo Corporation, Highland Heights, KY (US)

(72) Inventor: John W. Kuhn, Cold Spring, KY (US)

(73) Assignee: Motoveyo Corporation, Highland Heights, KY (US)

( * ) Notice: Subject to any disclaimer, the term of this patent is extended or adjusted under 35 U.S.C. 154(b) by 58 days.

(21) Appl. No.: 18/170,801

(22) Filed: Feb. 17, 2023

(65) Prior Publication Data

US 2023/0202761 A1 Jun. 29, 2023

Related U.S. Application Data

(63) Continuation-in-part of application No. 17/680,952, filed on Feb. 25, 2022, now Pat. No. 11,939,171.

(60) Provisional application No. 63/239,682, filed on Sep. 1, 2021, provisional application No. 63/153,650, filed on Feb. 25, 2021.

(51) Int. Cl.
  *B65G 17/08* (2006.01)
  *B65G 39/02* (2006.01)
  *B65G 39/07* (2006.01)

(52) U.S. Cl.
  CPC ......... *B65G 17/083* (2013.01); *B65G 39/025* (2013.01); *B65G 39/07* (2013.01)

(58) Field of Classification Search
  None
  See application file for complete search history.

(56) References Cited

U.S. PATENT DOCUMENTS 4,093,084 A 6/1978 Ringer
5,125,504 A 6/1992 Corlett et al.
(Continued)

FOREIGN PATENT DOCUMENTS

CN 102849449 A 1/2013
EP 0068475 A2 1/1983
(Continued)

OTHER PUBLICATIONS

European Patent Office; Search Report and Written Opinion in related International Patent Application No. PCT/US2022/017918 dated Jun. 7, 2022; 14 pages.
(Continued)

*Primary Examiner* — Kavel Singh
(74) *Attorney, Agent, or Firm* — Wood Herron & Evans LLP

(57) ABSTRACT

A conveyor system and drive element for same include a chain including a plurality of links that hinge with respect to each other and a plurality of moving elements such as balls that freely move in the links. A drive element drives the chain in a conveying direction and includes an elongated body with a surface that has a plurality of planar facets arranged around the longitudinal axis of the body. The facets extend along the body and engage respective links of the chain as the body is rotated to drive the chain. Relief elements are located in each facet and are configured for receiving the moving elements of the chain links engaging the facets so the links lie generally flat on the facets when the chain is driven. Other versions of the drive element are faceted for driving a chain with links but without relief elements.

20 Claims, 37 Drawing Sheets

(56) References Cited

U.S. PATENT DOCUMENTS

| | | | |
|---|---|---|---|
| 5,238,099 A | 8/1993 | Schroeder et al. | |
| 5,735,388 A * | 4/1998 | Brouwer | B65G 39/07 |
| | | | 492/30 |
| 5,868,238 A | 2/1999 | Bonnet | |
| 5,878,865 A * | 3/1999 | Bailey | B65G 23/30 |
| | | | 198/459.8 |
| 6,318,544 B1 * | 11/2001 | O'Connor | B65G 17/24 |
| | | | 198/779 |
| 7,533,766 B1 * | 5/2009 | Fourney | B65G 17/24 |
| | | | 198/779 |
| 7,857,118 B2 * | 12/2010 | Jans | B65G 47/244 |
| | | | 198/779 |
| 7,942,257 B2 * | 5/2011 | DePaso | B65G 21/20 |
| | | | 198/833 |
| 8,167,118 B2 * | 5/2012 | Fourney | B65G 17/24 |
| | | | 198/779 |
| 8,915,353 B2 * | 12/2014 | Fourney | B65G 17/24 |
| | | | 198/779 |
| 9,096,379 B2 | 8/2015 | Gilley, Jr. et al. | |
| 9,108,801 B2 * | 8/2015 | Constanzo | B65G 47/53 |
| 10,532,894 B2 | 1/2020 | Kuhn | |
| 10,640,303 B2 | 5/2020 | Kuhn | |
| 10,661,996 B2 | 5/2020 | Balsells Mercade | |
| 10,766,711 B2 | 9/2020 | Lundahl et al. | |
| 10,793,364 B1 | 10/2020 | Skarlupka et al. | |
| 11,130,643 B2 | 9/2021 | Kuhn | |
| 11,174,108 B1 | 11/2021 | Skarlupka et al. | |
| 11,235,356 B2 | 2/2022 | Lundahl et al. | |
| 11,247,849 B2 | 2/2022 | Kuhn et al. | |
| 2005/0155846 A1 | 7/2005 | Sofranec et al. | |
| 2012/0318644 A1 | 12/2012 | MacLachlan et al. | |

FOREIGN PATENT DOCUMENTS

| | | |
|---|---|---|
| EP | 0560480 A2 | 9/1993 |
| EP | 3592673 A1 | 1/2020 |
| GB | 1554539 A | 10/1979 |
| JP | 2005138918 A | 6/2005 |
| JP | 2009292601 A | 12/2009 |

OTHER PUBLICATIONS

Tsubakimoto Chain Company; Tsubaki Beltop Chain, BTBB Ball Transfer System Brochure published Aug. 2009.

Tsubakimoto Chain Company; Tsubaki O-Carry Modular Unit Brochure published Aug. 2009.

Emerson Industrial Automation; System Plast, Designed for Diversity Multidirection Roller Top Belt Series 2253 RT Engineering Manual published 2011.

Emerson Industrial Automation; Multidirection Roller Top Sales Brochure published Oct. 2012.

Itoh Denki; MDR Belt Design Guide for 2.5 Diameter Rollers Brochure.

Holjeron; website: https://holjeron.com/built-square-shell-holjerons-new-2-5-inch-motorized-smartroller-drives-intralox-series-900-sprocket-belt-applications-including-green-uncured-tire-handling dated Aug. 12, 2016.

* cited by examiner

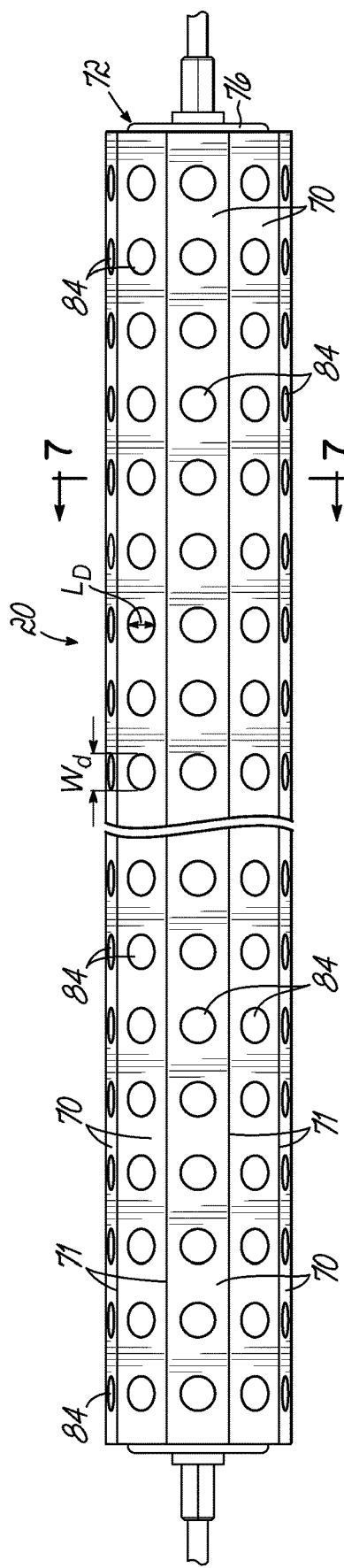
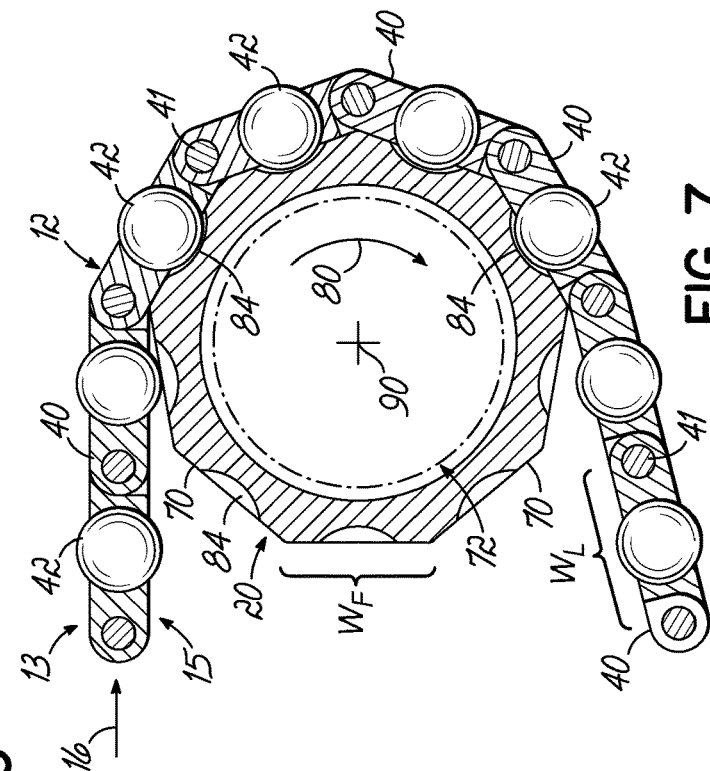
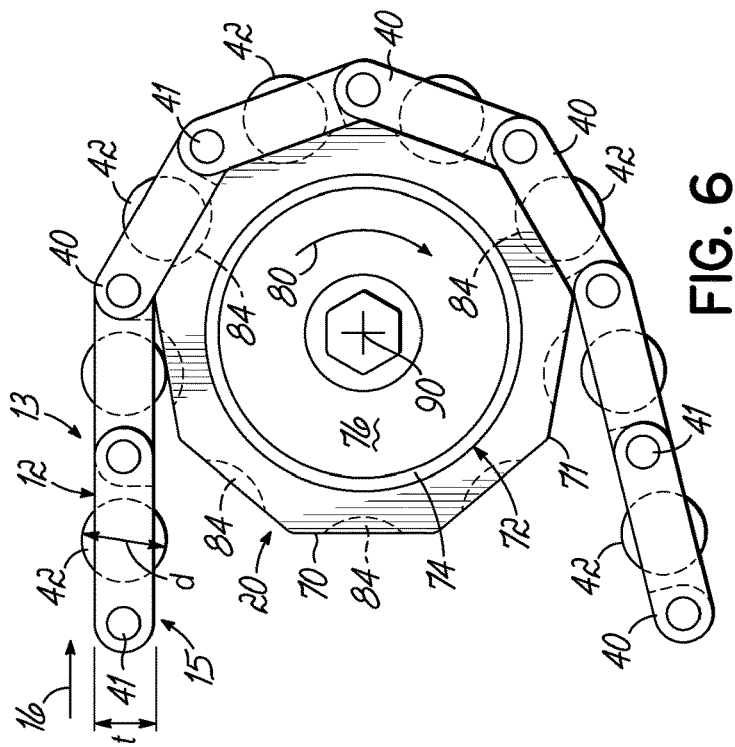
FIG. 5
FIG. 6
FIG. 7

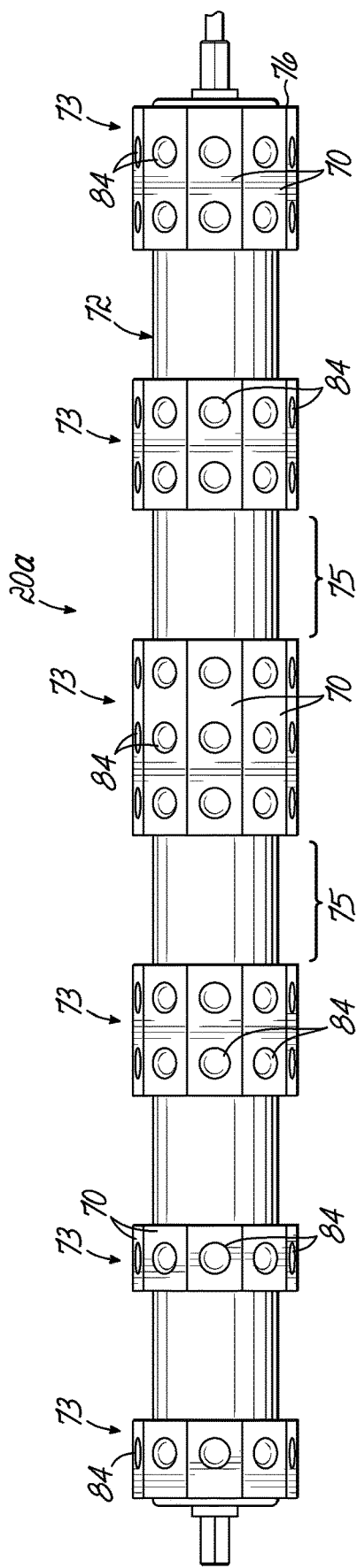
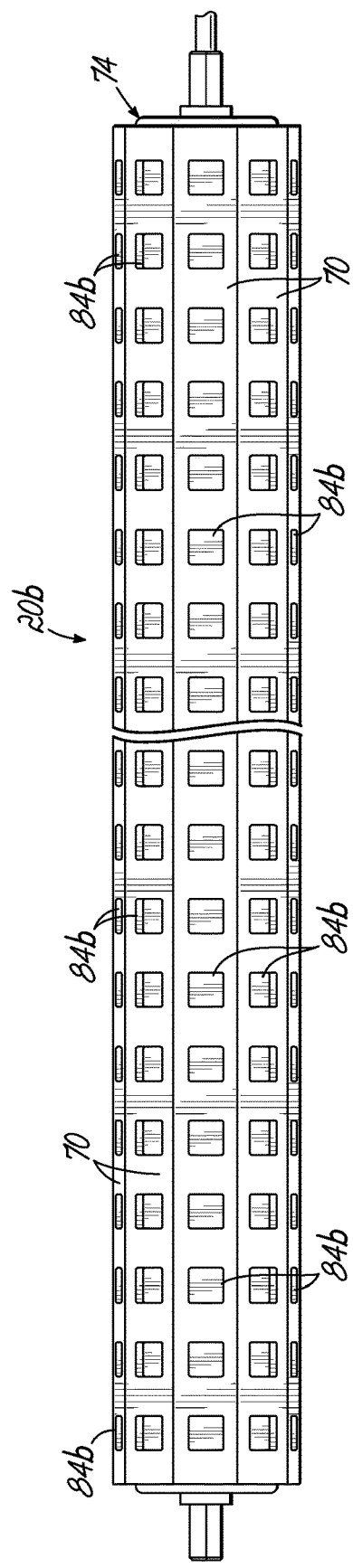
FIG. 5A
FIG. 5B

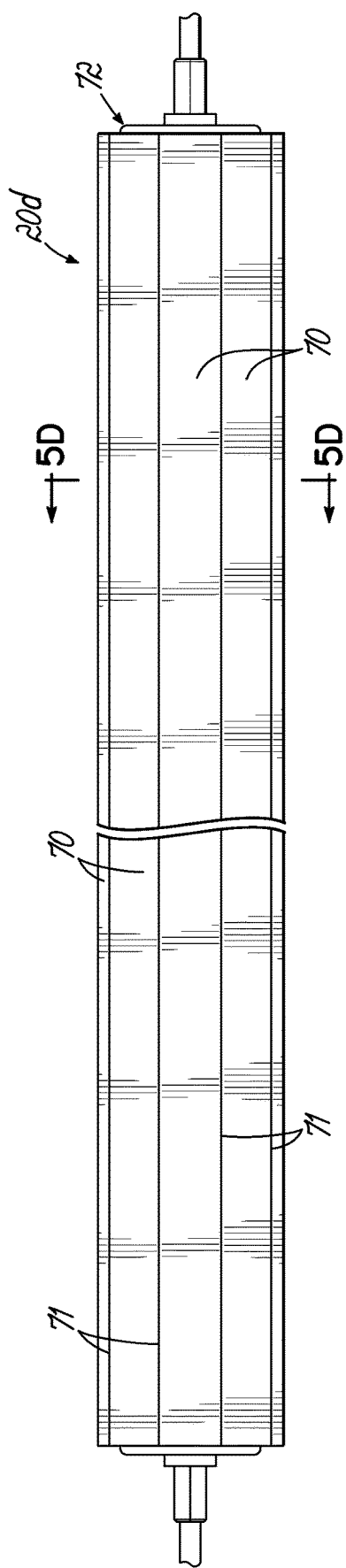
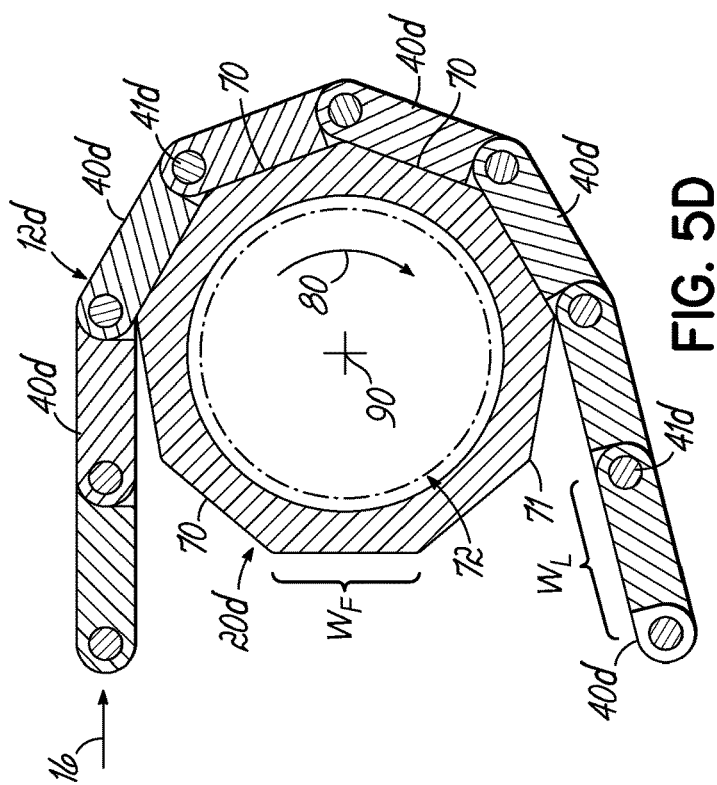
FIG. 5C
FIG. 5D

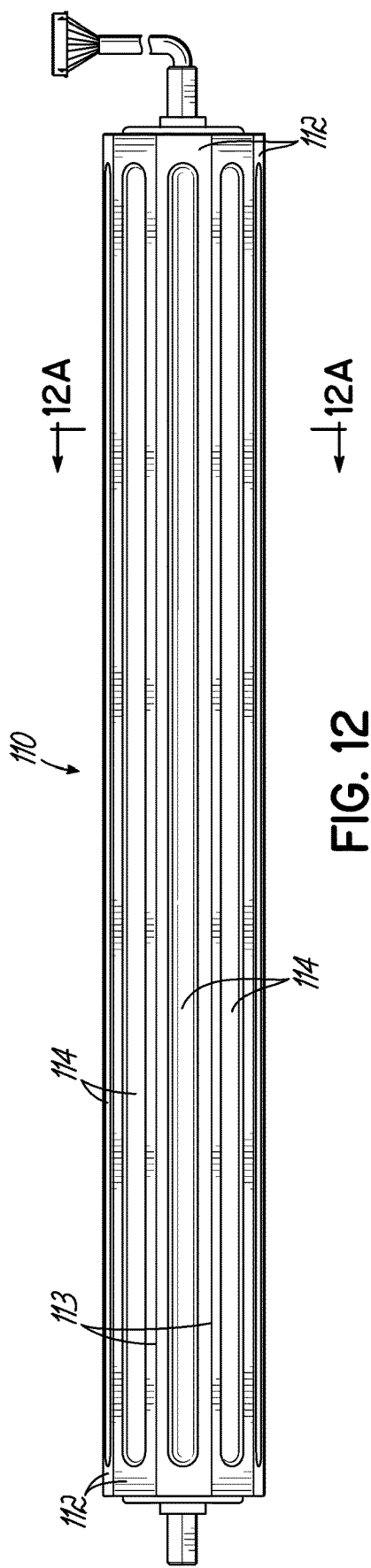
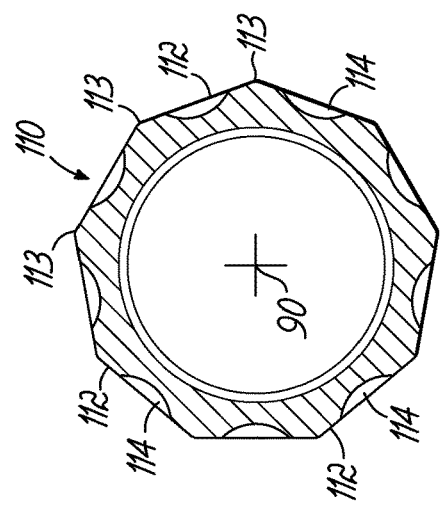
FIG. 12
FIG. 12A

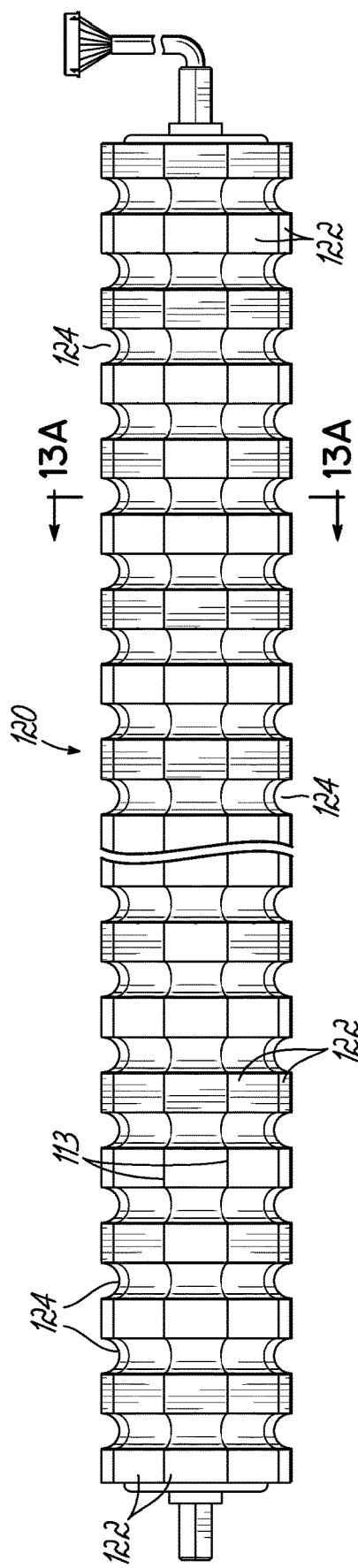
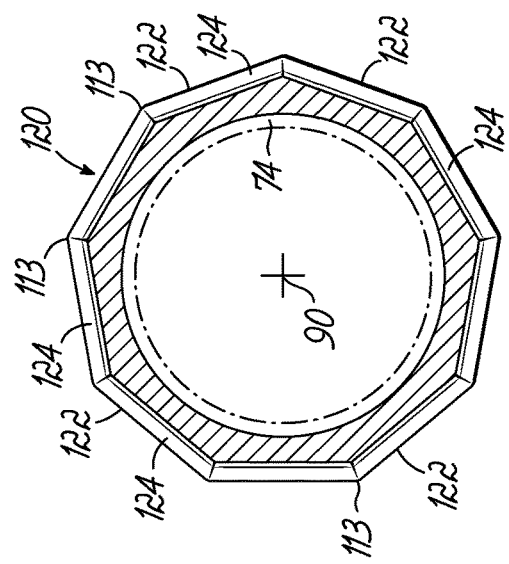
FIG. 13
FIG. 13A

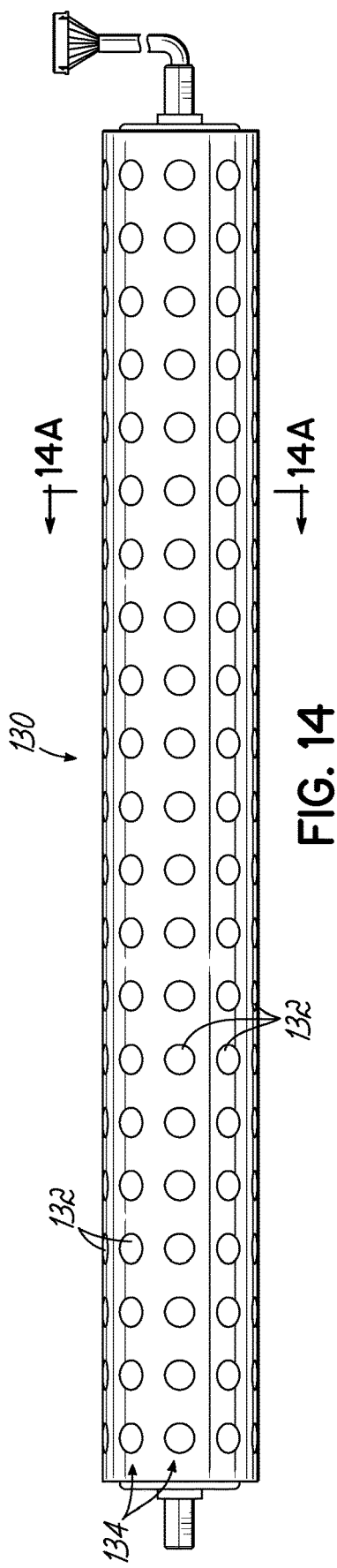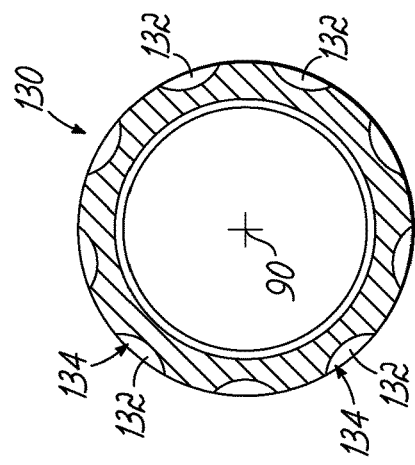
FIG. 14
FIG. 14A

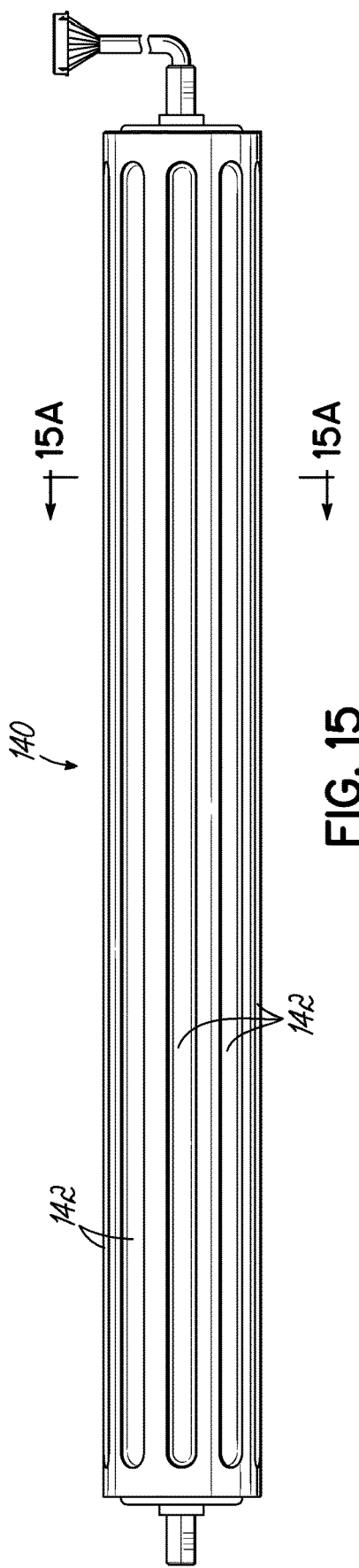
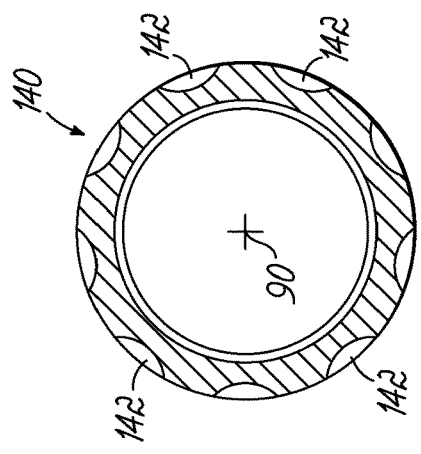
FIG. 15
FIG. 15A

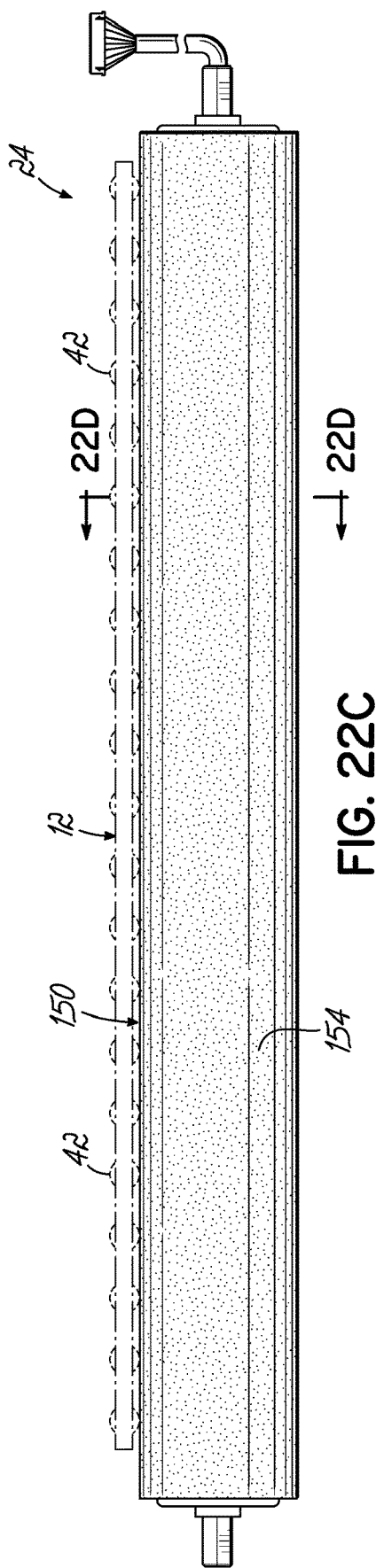
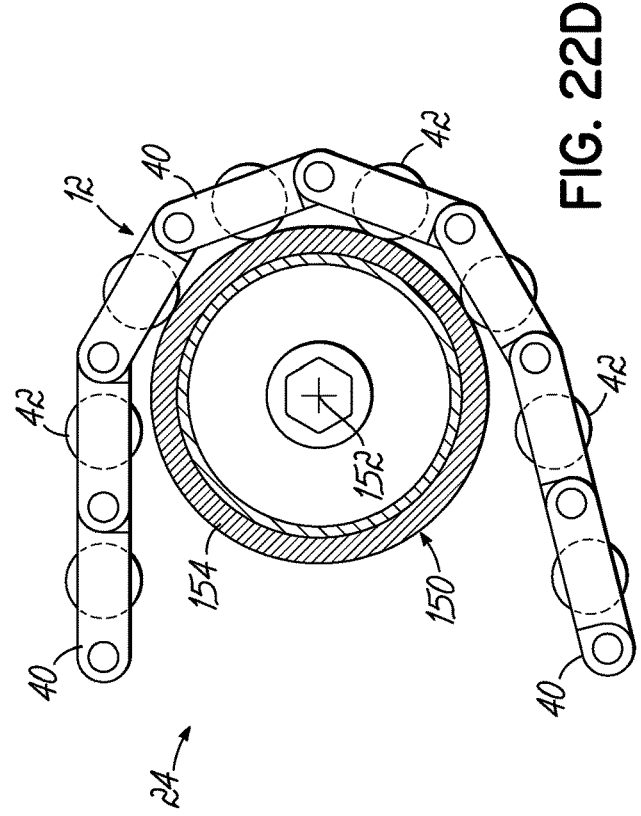
FIG. 22C
FIG. 22D

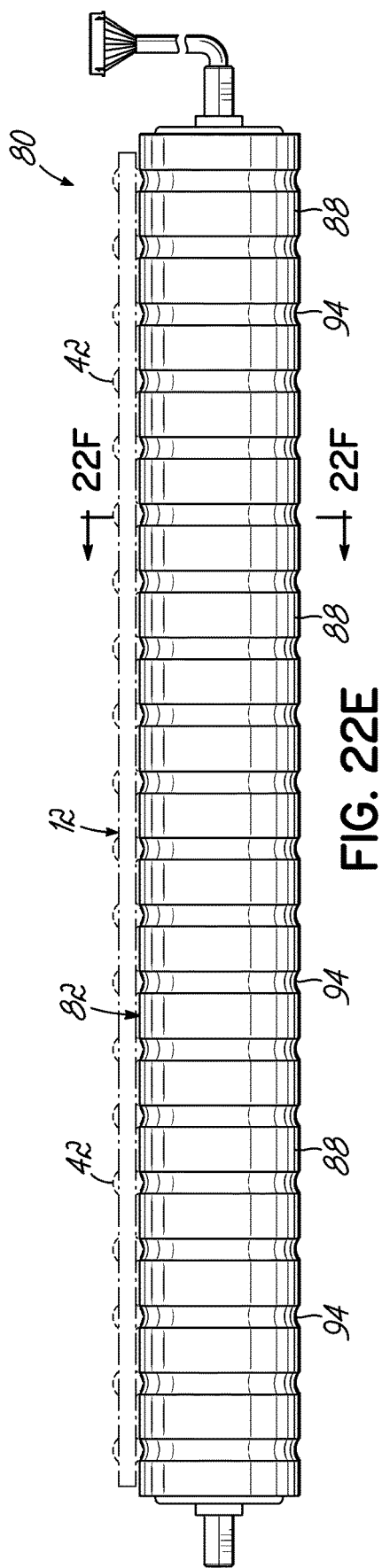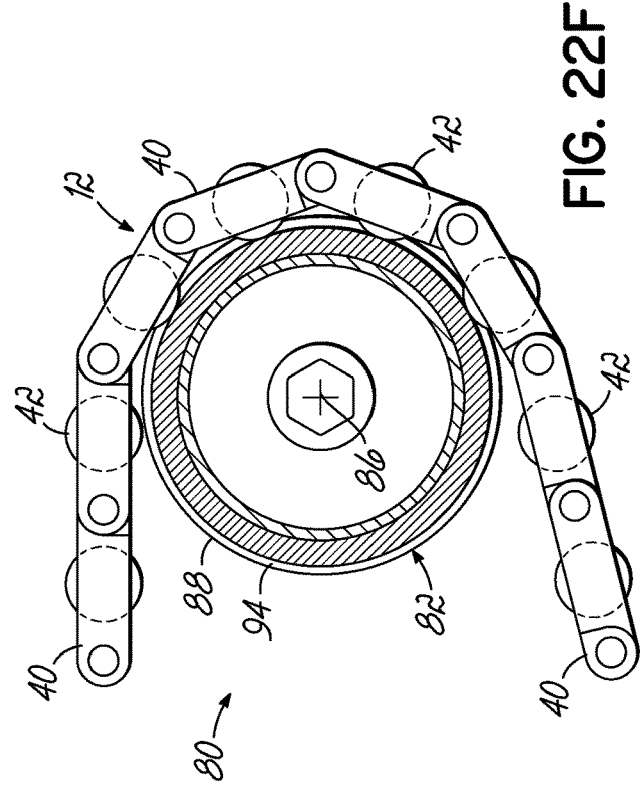

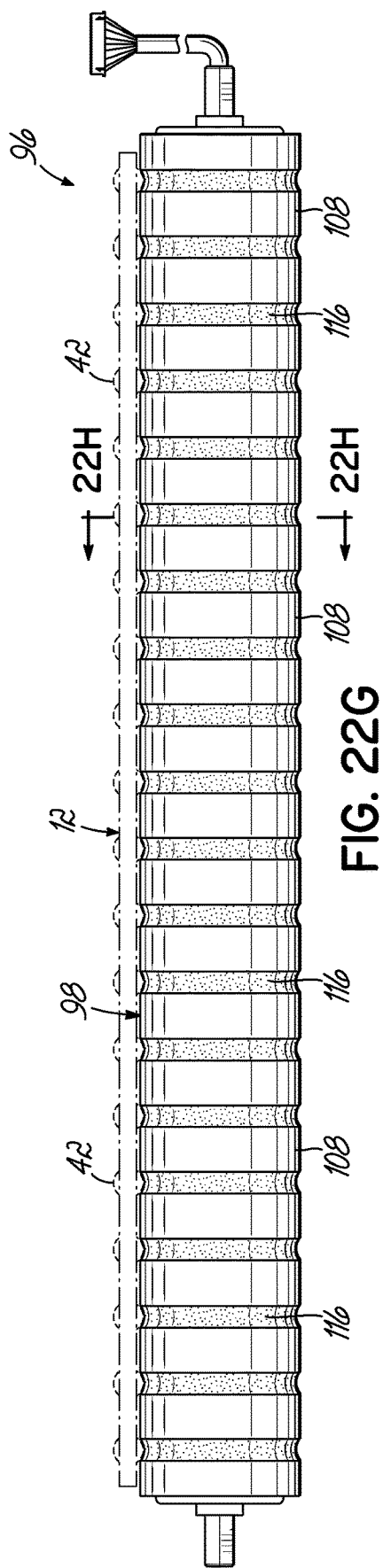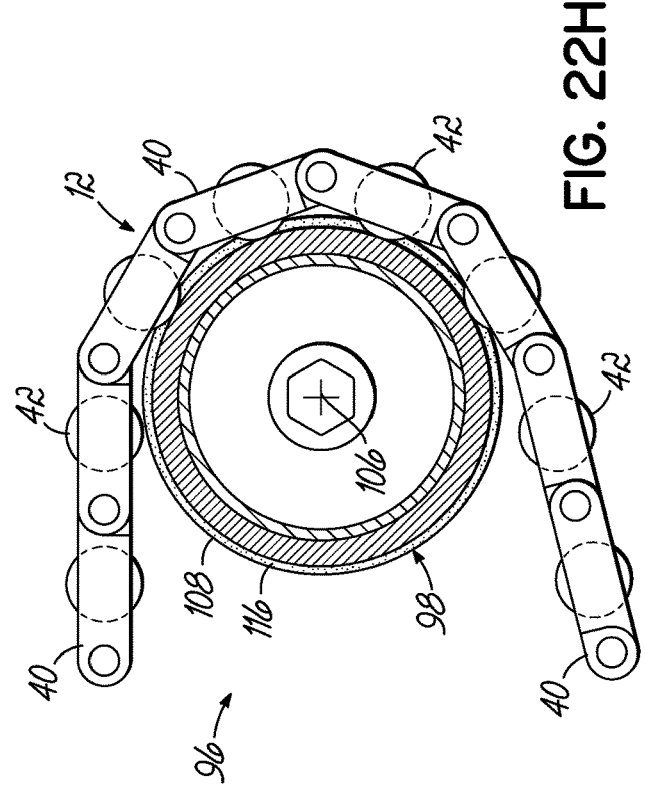

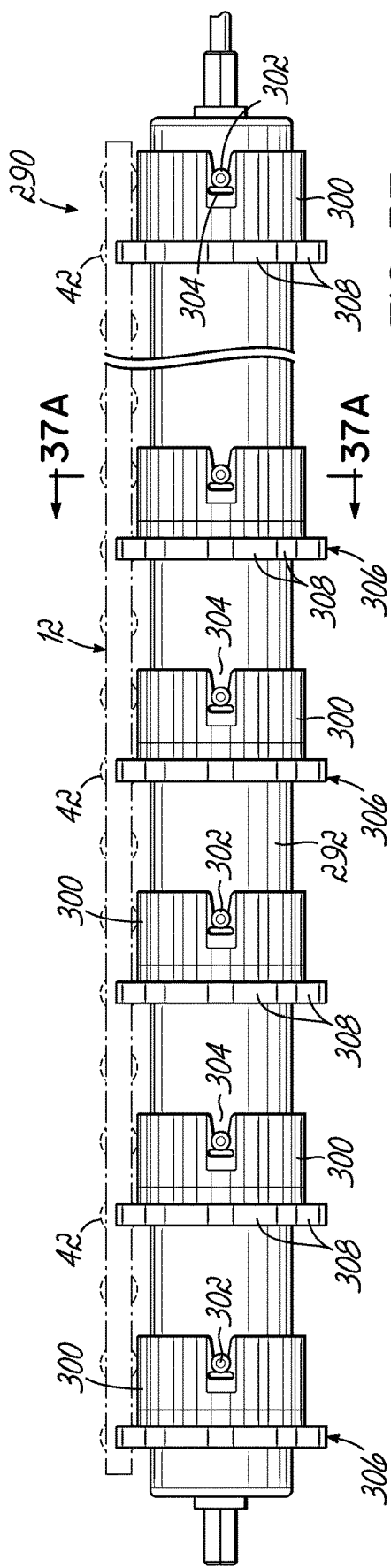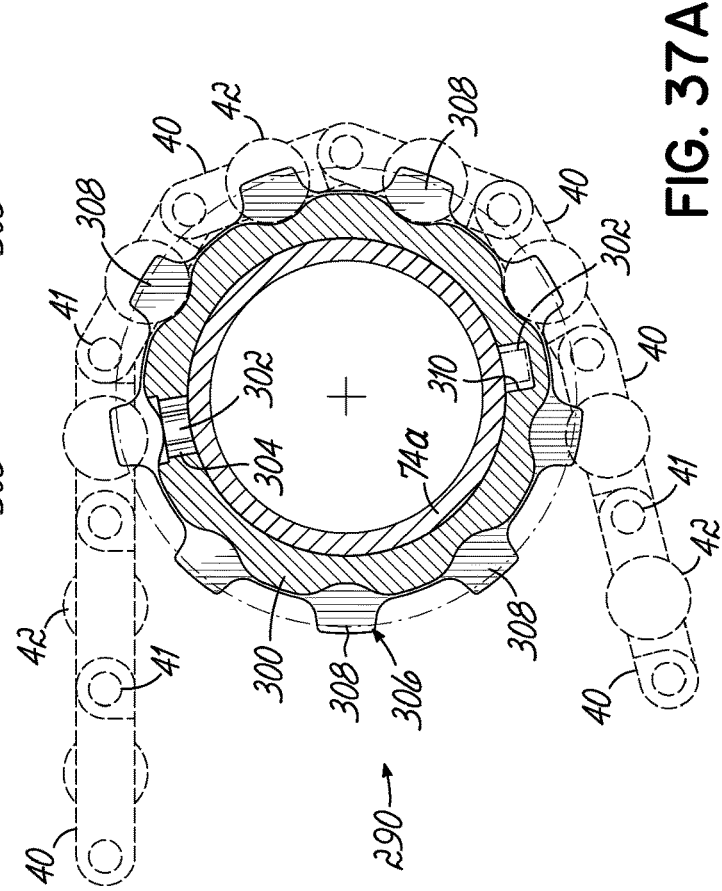
FIG. 37
FIG. 37A

CONVEYOR SYSTEM AND DRIVE SYSTEM FOR SAME

CROSS-REFERENCE TO RELATED APPLICATIONS

This application is a Continuation-In-Part of U.S. patent application Ser. No. 17/680,952 filed Feb. 25, 2022 (pending), which application claims the benefit of priority to U.S. Provisional Patent Application Ser. No. 63/153,650 filed Feb. 25, 2021 and U.S. Provisional Patent Application Ser. No. 63/239,682 filed Sep. 1, 2021, the disclosures of which are all incorporated by reference herein.

FIELD OF THE INVENTION

The invention is directed generally to conveyor systems and more specifically to a drive system for driving a ball chain for use with conveyor systems, such as a modular package sortation module.

BACKGROUND OF THE INVENTION

Conveyor systems are traditionally used for conveying items between different points at a location, such as a warehouse or shipping distribution center. Generally, large conveying systems incorporate various different belts and other conveying surface elements to carry the items from point to point. Oftentimes a plurality of modules stacked together in a system form the conveying path. Also incorporated in such systems are structures and additional conveying elements or modules that divert or re-direct items from one conveyor system to another system or from a conveying system to a sort destination. Such modules are often referred to as sortation modules.

One type of conveyor system uses a conveyor surface element that incorporates a chain having a plurality of hinged links, with each link spanning the width of the chain. The links hinge with respect to each other along the length of the chain and hinge over and around a drive element used for driving the chain. Each of the chain links incorporates a row of freely rolling omni-directional ball elements or balls that roll in their place in the link. Collectively, the links of the chain form a grid of freely rolling omni-directional balls integrated into the span of the chain. Herein, for consistency, such a conveyor element will be referred to as a "ball chain". The ball elements in a ball chain may be independently driven while the chain is driven and conveying items, thus allowing the conveying speed of the items on the chain to be increased or decreased. Such ball chains may also be used in combination with a diverter belt or belts beneath the main conveyor ball chain that is used to move the balls at an angle to the main conveying direction and thereby divert items off of the ball chain or to another area on the ball chain. Diverter belts beneath the ball chain generally travel in a direction normal to the direction of travel of the ball chain to cause such diversion.

Ball chains may be driven at each end, in a continuous path over rotating elements on which a continuous ball chain is looped. Traditionally, on at least one end of the ball chain, rotating sprockets engage respective receiving pockets located in the underside of the ball chain for driving the chain. In other systems, the chain may be rolled over rollers that frictionally engage the chain. However, there is still a need in the art to improve upon conveyor systems that use such ball chains and chain drive elements for the purposes of providing a more flexible, quiet, robust, cost-effective and reliable conveyor systems that can handle a wide range of size and weight of items.

SUMMARY OF THE INVENTION

A conveyor system for handling items includes a chain having a plurality of links that hinge with respect to each other and a plurality of balls that freely rotate the links to define a row of balls of the link. A drive element rotates and drives the chain around the drive element in a conveying direction and includes a body with a surface layer that has a plurality of generally planar facets arranged around its longitudinal axis. The facets extend along the body and are configured for engaging respective links of the chain as the body is rotated to drive the chain. Relief elements are located in each facet and are configured for receiving the balls of the links engaging the facets so the links lie generally flat on the facets when the chain is driven. The drive element and chain may be used over a surface, such as one or more diverter belt(s) having a driving direction normal to the conveying direction of the chain. Specialized guide and transition features may be used to assist in delivering the ball chain on and off the surface. The diverter belts may include tracking features and tensioning members for affecting the operation of the belt. Multiple diverter belts might be used at different speeds of operation.

A drive element for driving chains with moving balls or other elements therein includes an elongated body configured for rotating about a longitudinal axis. A surface layer has a plurality of generally planar facets arranged around the longitudinal axis of the elongated body and each of the facets extends along the body for engaging respective links of the chain as the body is rotated to drive the chain. Relief elements are located in the facets for receiving balls or other elements of a chain link engaging the facet so the link lies generally flat on the facet when the chain is driven by the drive element.

A drive element for driving a chain of a conveyor system having flat links with hinge points therebetween includes an elongated body configured for rotating about a longitudinal axis. A surface layer has a plurality of generally planar facets arranged around the longitudinal axis of the elongated body and each of the facets extends along the body for engaging respective links of the chain as the body is rotated to drive the chain.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 5 is a front view of a drive element implemented in a conveyor chain drive system of an embodiment of the invention.

FIG. 5A is a front view of an alternative drive element implemented in a conveyor chain drive system of another embodiment of the invention.

FIG. 5B is a front view of another alternative drive element implemented in a conveyor chain drive system of another embodiment of the invention.

FIG. 5C is a front view of a drive element implemented in a conveyor chain drive system of another alternative embodiment of the invention.

FIG. 5D is a side view of a drive element as shown in FIG. 5C implemented in a conveyor chain drive system of an alternative embodiment of the invention.

FIG. 6 is a side view of a drive element implemented in a conveyor chain drive system of an embodiment of the invention.

FIG. 7 is a side cross sectional view of a drive element implemented in a conveyor chain drive system of an embodiment of the invention.

FIGS. 12 and 12A are a front view and side cross-sectional view, respectively, of an alternative drive element implemented in the conveyor chain drive system of an embodiment of the invention.

FIGS. 13 and 13A are a front view and side cross-sectional view, respectively, of an alternative drive element implemented in the conveyor chain drive system of an embodiment of the invention.

FIGS. 14 and 14A are a front view and side cross-sectional view, respectively, of an alternative drive element implemented in the conveyor chain drive system of an embodiment of the invention.

FIGS. 15 and 15A are a front view and side cross-sectional view, respectively, of an alternative drive element implemented in the conveyor chain drive system of an embodiment of the invention.

FIG. 22C is a side view of the roller as shown in FIG. 22A.

FIG. 22D is a cross-sectional view of the roller of FIG. 22A, taken along line 22D of FIG. 22C.

FIG. 22E is a side view of a roller according to an alternative embodiment of the invention.

FIG. 22F is a cross-sectional view of the roller of FIG. 22E, taken along line 22F of FIG. 22E.

FIG. 22G is a side view of a roller according to another alternative embodiment of the invention.

FIG. 22H is a cross-sectional view of the roller of FIG. 22G, taken along line 22H of FIG. 22G.

FIG. 37 is a side view of an alternative drive element implemented in a conveyor chain drive system in accordance with an alternative embodiment of the invention.

FIG. 37A is a side view of a drive element implemented in a conveyor chain drive system of an embodiment of the invention It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS OF THE INVENTION

Figure 1:
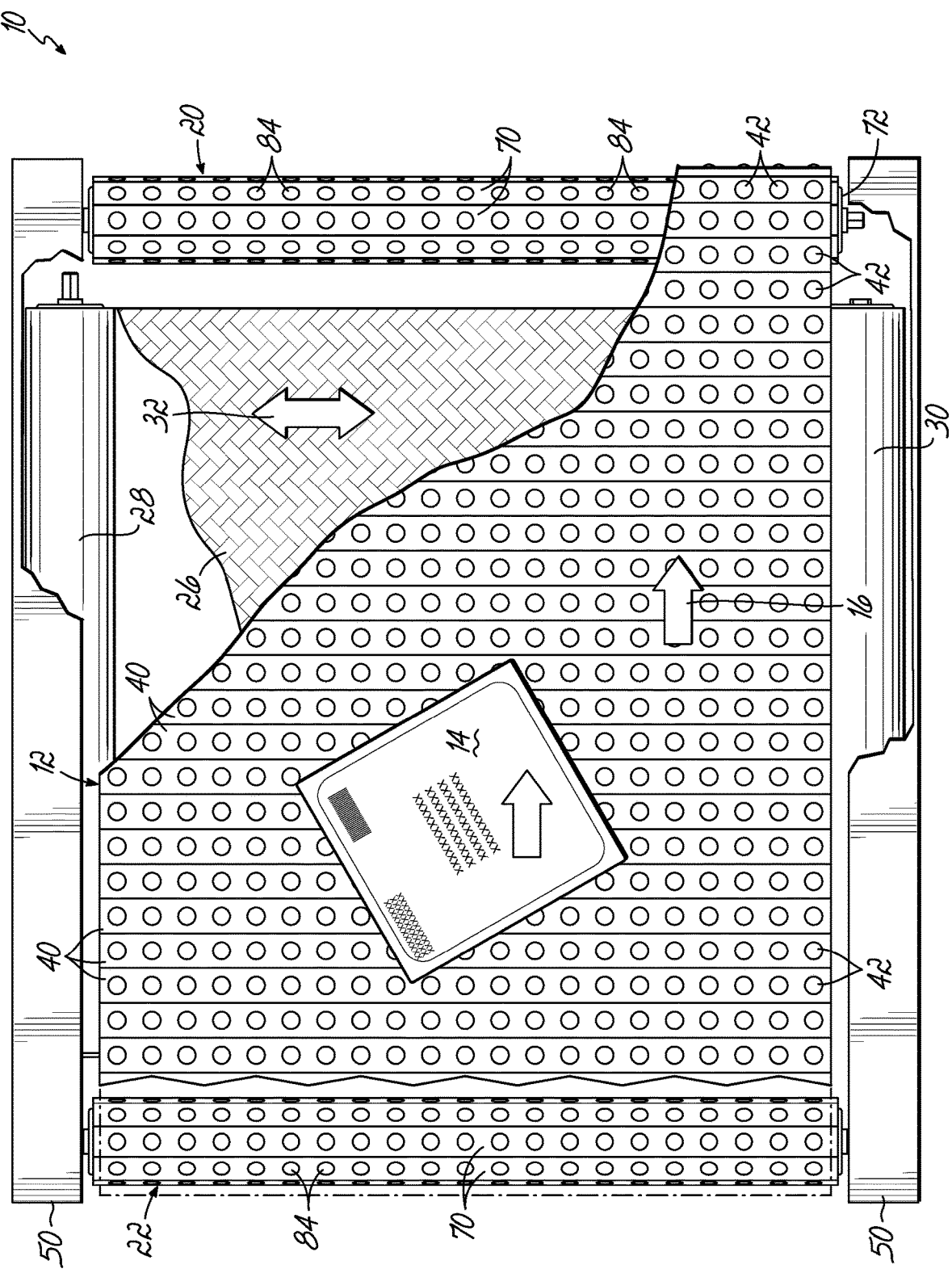
FIG. 1 is a top plan view, in partial section, of a conveyor module using the conveyor chain drive system of an embodiment of the invention.

FIG. 1 illustrates a top plan view of a conveyor system in accordance with one embodiment of the invention. More specifically the conveyor system includes a drive system in accordance with an embodiment of the invention and also incorporates diversion functionality for the diversion or redirection of items and packages that are in the conveyor system and traveling in the direction of the conveyor. As an example, a conveyor module using the inventive drive system is described herein and such a module is used to designate one particular conveyor system. However other types of conveyor systems may benefit from the drive systems and other features described herein and the specific conveyor module illustrated is not limiting on the invention.

Specifically, the conveyor module 10 is of a size such that multiples of such modules may be implemented, end-to-end, to form a larger conveyor system. The module 10 incorporates a main conveyor chain 12 that conveys an item or a package 14 sitting on the chain 12 in the conveying direction of arrow 16 as shown in FIG. 1. As noted, the conveyor module 10 will be implemented end-to-end, with other conveyor modules in a stack or row to provide flexibility within a larger conveyor line for diverting and redirecting items 14. Items 14 move from module to module in the system. In one configuration of module 10, the chain 12 loops in a continuous loop over a drive element 20 and an idler element 22. The chain 12 is driven by drive element 20 at one end of the module 10 and moves over idler element 22 at the other end of the module 10 so that module operates in a defined conveying direction. As may be appreciated, in other configurations, the idler element 22 can be replaced by another drive element 20, and additionally the main conveyor chain 12 may also be operated bi-directionally in any chosen direction depending on the individual application. For discussions of exemplary embodiments discussed herein, the drive element 20 is located forward of or downstream of the idler element 22 to define a conveying direction. In that way, the drive element 20 pulls the chain 12 in the conveying direction in a continuous loop.

For the functionality of diversion to move the item 14 to another area on the chain 12 or to move the item off of the chain 12, a transfer or diverter belt 26 is positioned beneath conveyor chain 12 and is independently driven with respect to the conveyor chain 12. The diverter belt 26 is driven and/or idled at its ends by drive and idler elements, such as rollers 28, 30. The drive and idler rollers 28, 30 will drive the belt 26 in either direction generally normal to or at 90 degrees with respect to the direction of travel 16 or the conveying direction of the main conveyor chain 12. Arrow 32 reflects the direction of diversion from the main conveyor chain 12. As may be appreciated a single direction or bi-directional diverter belt arrangement may be used under chain 12.

In one embodiment, the main conveyor chain 12 may be in the form of a ball chain that includes individual rows that are defined by a plurality of flat links 40 which are hingedly coupled together about a hinge point by a hinge element 41 (see FIG. 6). The links 40 hinge with respect to each other and so can progress over the drive elements 20 and idler elements 22. The links 40 and the bodies or structures of the links 40 are each configured to contain and support freely rotating ball elements or balls 42 that rotate within the various links 40. More specifically, each link 40 includes and defines a row of the balls 42 so that the links together form the chain 12 and form a grid of balls that move and operate in the chain 12 as it is conveyed. For example, one suitable conveyor chain that may be used to form the main conveyor chain 12 is disclosed in U.S. Pat. No. 7,021,454 and is available from Tsubaki Yamakyu Chain Company as the BTB8 chain. Another suitable chain that includes rows of linkages 40 as well as ball elements 42 is available from Ammeraal Beltech as the UNI QNB chain. Other chains having other moving elements besides balls, such as chains having moving roller elements, may be used with the drive element of the invention. For consistency herein and to discuss the illustrated embodiments, such a conveyor chain will be referred to as a "ball chain.", but that term also refers to other chains without balls or ball-shaped elements or to chains that have no moving elements, like the chain in FIGS. 5C and 5D. There are other commercially available, similarly configured chains or ball chains that would be suitable for embodiments of the present invention and they function generally in the same manner, may be built to the same overall dimensional standards, and provide for effective conveying and diverting a wide range of product sizes, shapes, and configurations.

Figure 2:
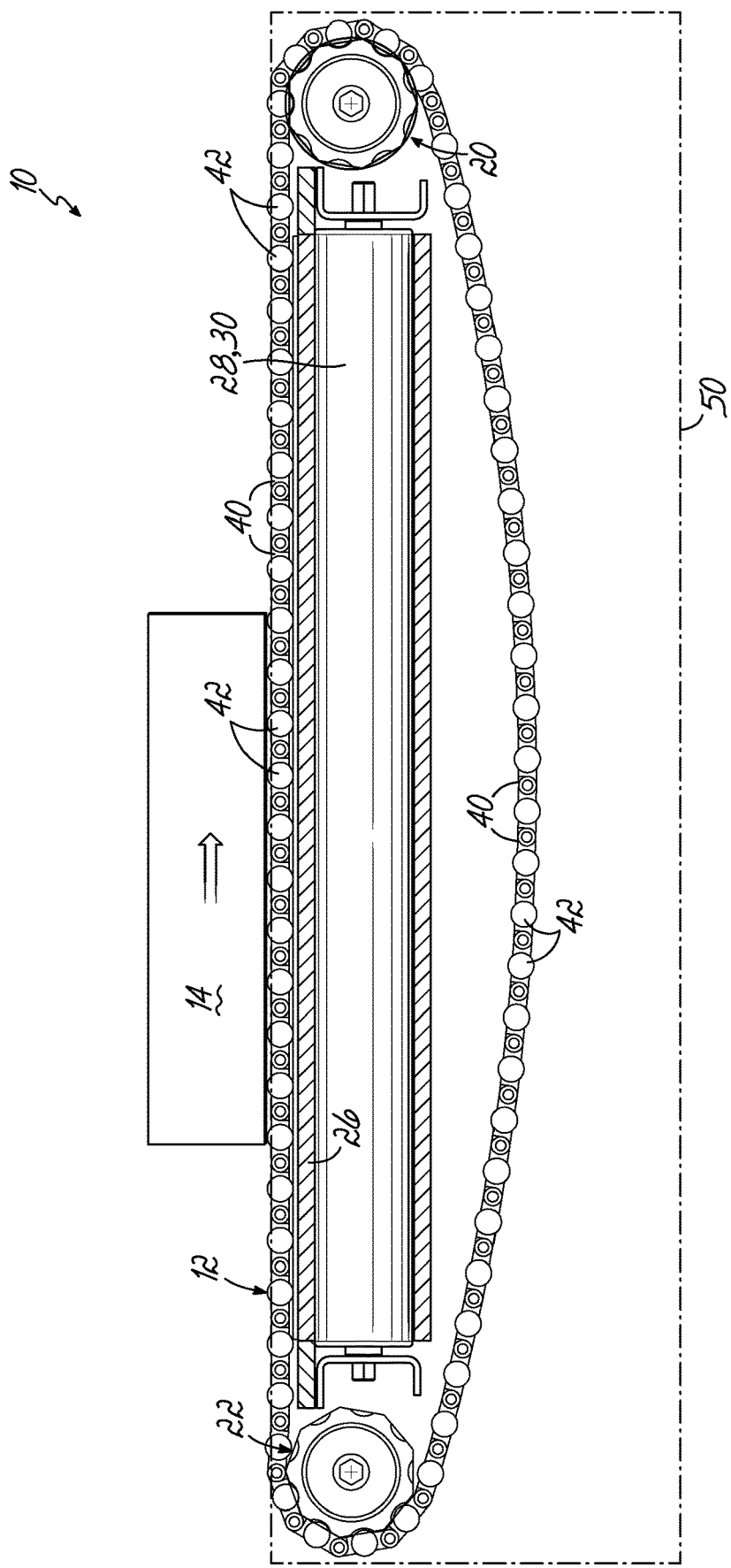
FIG. 2 is a side cross-sectional view of a conveyor module using the conveyor chain drive system of an embodiment of the invention.

The ball chain design of the main conveyor chain 12 takes advantage of the grid of freely rolling balls 42 for both increasing the speed of the conveyor module 10 as well as diverting an item 14 as is known in the art. Referring to FIG. 2, in a module of the invention, the ball chain 12 that defines the conveying surface travels on top of the transfer or diverter belt 26. Specifically, ball chain 12 has an item-bearing side 13 and a backside 15 that faces the diverter belt 26. (See FIG. 6). The thickness "t" of the links 40 is generally smaller than the diameter "d" of the balls 42 contained in the links 40 and so the balls 42 effectively define contact points for items on the item-bearing side 13 of the chain 12 as shown in FIG. 2. In the same way, the balls 42 make contact with the belt 26 on the backside 15 of the chain 12. As the ball chain 12 is driven by drive element 20 in direction 16, the balls 42 will also roll over the belt 26 at the same time that the chain 12 is moving. With such action, the item sitting on the rolling balls 42 of the chain 12 will thus move at a faster speed than the belt. The item 14 traveling on the ball chain 12 will be moving at a speed approximately double the actual speed of the moving ball chain 12. This is generally based on the geometry of the ball chain 12 itself, such as the diameter and circumference of the individual balls 42 and their center of rotation in the links of the ball chain 12. For example, if the ball chain 12 is moving at 100 feet per minute, then the item 14 that sits atop the ball chain 12 as shown in FIG. 2 will be traveling at, generally, 200 feet per minute. This is a known feature of ball chains.

Since the balls 42 roll from contact with the diverter belt 26 as the conveyor ball chain 12 moves, the process of item diversion takes place by running the diverter belt 26 in either direction 32 as the item 14 is translated across module 10 on ball chain 12. The diverter belt 26 may be operated on-the-fly while the ball chain 12 is translated or the ball chain 12 may be stopped and the diverter belt 26 is operated to divert the item 14 to either side of module 10, such as to be received by another conveyor chain or a final destination location. As will be appreciated, if the ball chain 12 is stopped, the operation of the diverter belt will move item 14 generally in a direction 32 that is 90 degrees or normal with respect to the main travel direction 16 of conveyor module 10. If the ball chain 12 and diverter belt 26 are run simultaneously, the resulting diversion motion is a vector direction which will be determined by the relative speeds of the chain 12 and belt 26. Fairly common in practice, items 14 are diverted on-the-fly (while being conveyed) to achieve conveyor rates which are required in the industry. Referring to FIG. 2, the various components, including the ball chain 12 and respective drive element 20 and idler element 22 and diverter belt drive respective drive roller 28 and idler roller 30 are coupled together to operate (along with other elements) on a suitable frame structure 50 to form the module in accordance with the invention.

In the illustrated embodiments, the ball chain 12 and drive element 20 are implemented in a module wherein the surface below the ball chain 12 is provided by a diverter belt 26 that may be oriented to divert product. Such an illustrated embodiment, however, is only exemplary and not limiting to the invention. The inventive drive element 20 may be used to drive a ball chain 12 on top of other surfaces in a module. For example, the diverter belt 26 might be replaced with a stationary surface 26 that does not move or divert. Also, the diverter belt 26 is shown to operate in a direction that is normal or 90 degrees to the conveying direction for the purposes of item diversion. In another embodiment, the belt 26 might be oriented and operated to move in the same direction as the conveying direction and as the ball chain 12. In such a case, the diverter belt 26 would not divert but rather would contact and rotate the balls 42 in-line or parallel with the conveying direction and would thereby increase or decrease the convey speed (depending on which direction the belt 26 is operated). Still further, the ball chain 12 might be driven freely with no surface or belt 26 thereunder to contact the balls 42. That is, they would not be forced to rotate. As such, the invention may be used to drive a ball chain 12 over any surface or over no surface at all in the module or system.

Figure 2A:
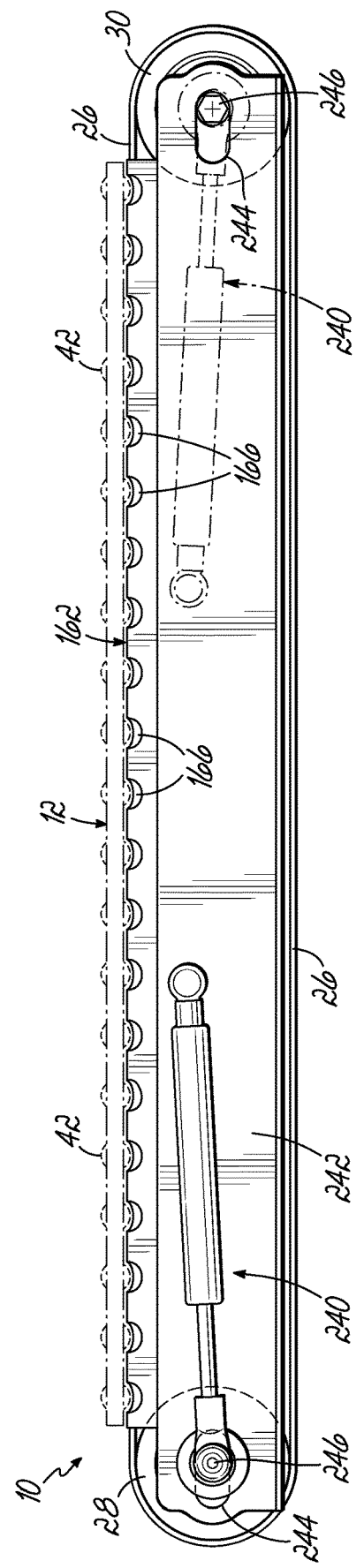
FIG. 2A is a side cross-sectional view of a conveyor module, illustrating drive rollers for the diverter belt with capability for belt tensioning according to an embodiment of the invention.

FIG. 2A illustrates an end view of the module 10 and the chain and shows the drive roller 28 and idler roller 30 that move the diverter belt 26. As discussed further below and shown in FIG. 16, for transition between adjacent modules, a transition ramp portion 162 may be used at the end of the module and includes a plurality of ball guides 166 that extend longitudinally along the transition ramp portion 162. The guides 166 are approximately aligned with the rows of balls 42 in the ball chain 12 to improve the transition of the ball chain 12 between the diverter belt 26 and the corresponding drive or idler elements 20, 22 to prevent the balls 42 from abruptly impacting against the planar surface 146 during transition. As discussed further herein with respect to FIGS. 26-27, the module 10 may include one or more tensioner elements 240 utilized to apply a constant force to one or both of the drive and idler rollers 28, 30 to maintain the diverter belt(s) 26, under a constant tension, particularly as the belt(s) 26, stretch over time from use. The tensioner 240 may be a gas spring, piston, or other suitable structure for applying a constant force on the one or more belts of the module and may also include damping to compensate for diverter belt bunching or wind up. As shown, the tensioners 240 are coupled between one of the drive or idler rollers 28, 30 and a frame member 242 of the module 10*d*. The tensioners 240 are configured to laterally space the roller 28 from the opposite roller 30 to thereby apply a tensioning force on the diverter belt(s) 26, To permit lateral movement of the idler roller 28 by the tensioner 240, the frame member 242 includes slots 244 through which an axle 246 of the drive or idler rollers 28, 30 is positioned. Further details of the tensioners 240 are discussed herein.

Figure 3:
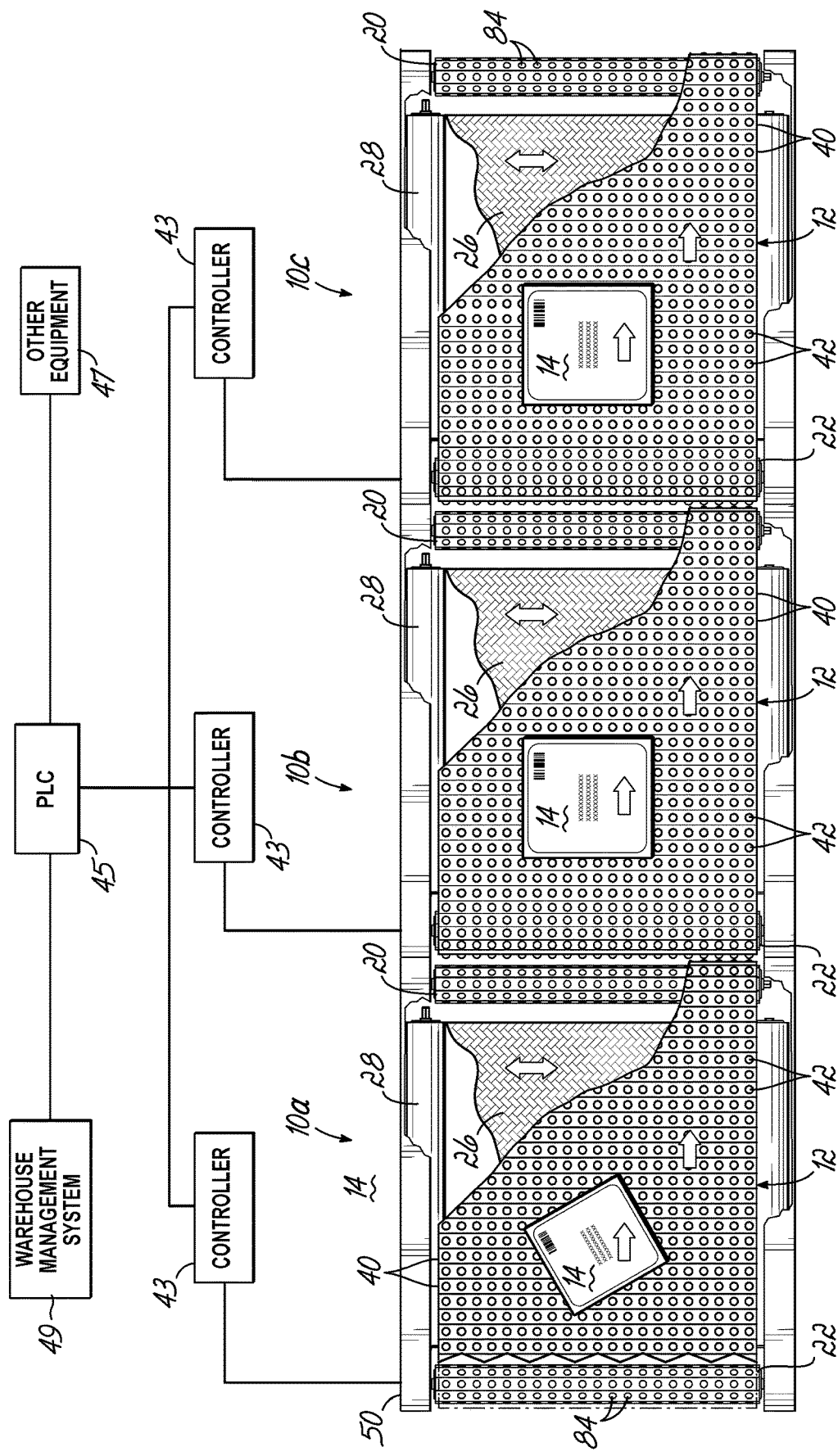
FIG. 3 is a top plan view of a plurality of conveyor modules using the conveyor chain drive system of an embodiment of the invention.

The modules 10 of the invention can be arranged in almost an infinite variety of ways to form conveyor systems and the invention is not limited with respect to how modules 10 might be used. Referring to FIG. 3, one exemplary arrangement is shown wherein various modules 10*a*, 10*b*, 10*c* are illustrated stacked together in an end-to-end configuration to provide a system that has a plurality of divider modules and to handle a variety of diversion scenarios as desired for the overall conveyor system. Items 14 move from module to module and at any particular point along the conveyor system of FIG. 3, the items 14 may be shifted on or diverted off of the module.

Figure 4:
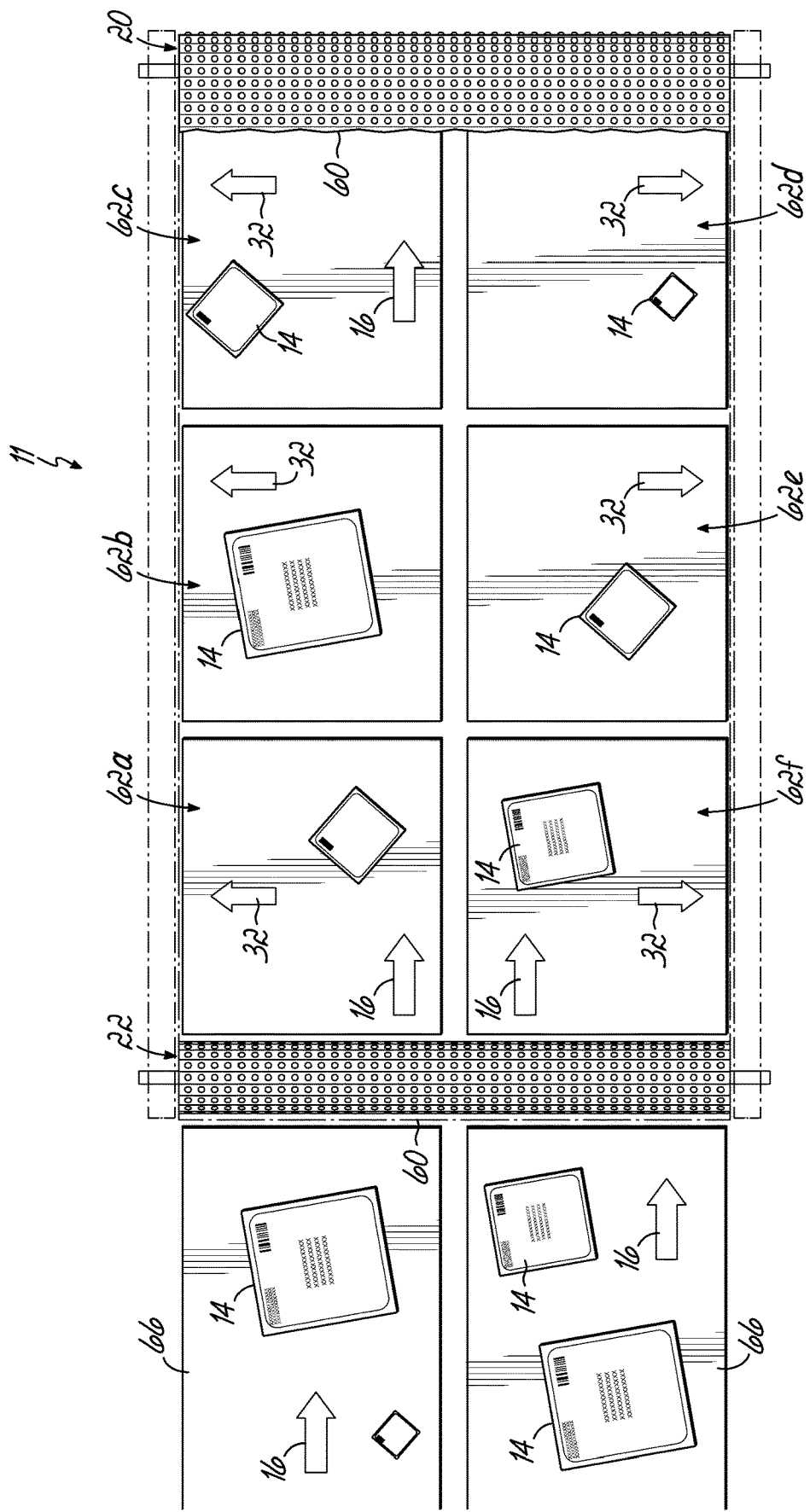
FIG. 4 is a top plan view of an alternative conveyor module using the conveyor chain drive system of an embodiment of the invention.

The configuration illustrated in FIG. 4, for example, may implement a module 10 of the invention that is sized and configured to provide a divider module 11. Referring to FIG. 4, one or more feed conveyors 66 direct items 14 onto a double wide divider module or table 11. The module 11 (with the ball chain shown partially removed) has a ball chain 60 driven by the inventive drive element 20 and idler element 22 and one or more underside diverter belts 62*a*-62*f* that are operated to side-justify or divide the various items 14. The figure shows a single conveyor ball chain 60 implemented over top of a plurality of diverter belts 62*a*-62*f* that may be used to selectively divert items 14 from the main direction of travel 16 on different sections of the singular chain 60. Chain 60 would be driven similarly to chain 12 in FIG. 1 utilizing a drive element 20 and an idler element 22. The drive element 20 and idler element 22 may also be utilized to drive the ball chain 60 with the side-justified items 14 to some other subsequent downstream equipment, such as a diverter or sorter section. As such, conveyor features using the inventive drive element 20 and idler element 22 as described herein may be implemented in a number of scenarios for driving a ball chain 12, 60.

Figure 4A:
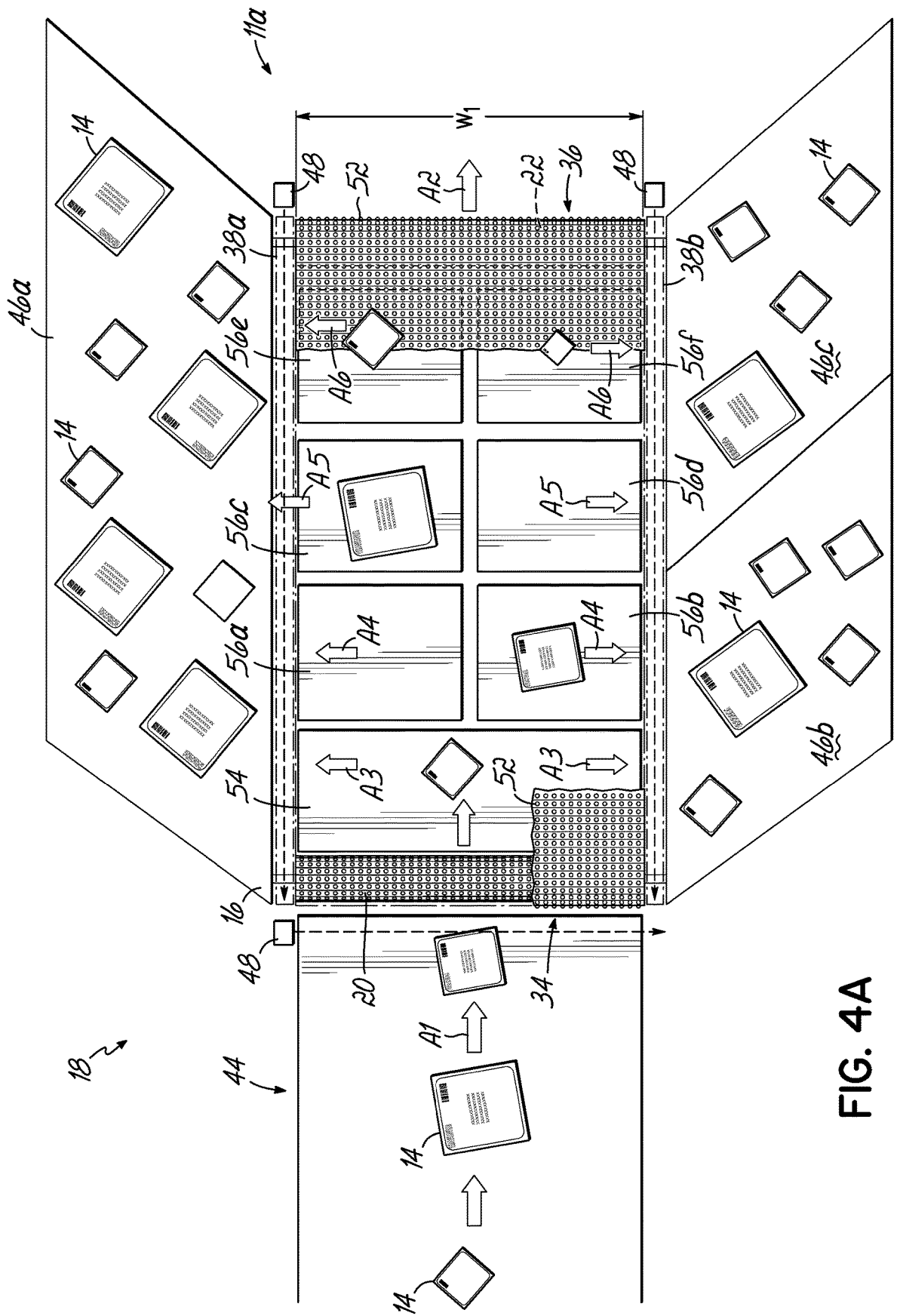
FIG. 4A is a top plan view of an alternative conveyor module using the conveyor chain drive system of an embodiment of the invention.

FIG. 4A illustrates a sortation system 18 having a sortation or diverter module 11*a* having sortation or diversion capabilities in accordance with another embodiment of the present invention. As shown, the diverter module 11*a* may implement a suitable module 10 that is sized and configured to provide the diverter module 11*a* shown. In particular, the diverter module 11*a* extends between a first end 34 where items 14 are received onto the diverter module 11*a* and an opposite second end 36 where certain items 14 may leave the diverter module 11*a*. In the sortation system 18 shown, the module 11*a* is aligned in an end-to-end arrangement with a feed conveyor 44 configured to direct items 14 onto the diverter module 11*a* for sortation and/or diversion. Specifically, the feed conveyor 44 is located adjacent the first end 34 of the divider module 11*a* and configured to convey items 14 in a direction, as indicated by arrow A1, and onto the diverter module 11*a*. The diverter module 11*a* may be operated to divert or sort items to either lateral side 38*a*, 38*b* of the module 11*a* and into one or more respective aftersort destinations 46*a*-46*c*, as will be described in further detail below. FIG. 4A illustrates a single destination 46*a* on one side and multiple destinations 46*b*, 46*c* on another side.

However, the number of destinations to either side of the module 11a can take other configurations and the illustrated example is not limiting. Further, the diverter module 11a may be operated to sort items to one side or the other and further convey certain items 14 along a conveyor line and to one or more other conveyor modules or other diverter modules (not shown) located adjacent to the second end 36 of the diverter module 11a.

As shown, the diverter module 11a includes a ball chain 52 wrapped around the module 11a and which may be engaged by both the inventive drive element 20 located at the first end 34 of the module 11a and the idler element 22 located at the second end 36. The ball chain 52 includes a width $W_1$ that is measured between lateral sides 38a, 38b of the diverter module 11a. Movement of the ball chain 52 is driven by the drive element 20 in a direction indicated by directional arrow A2, and the chain 52 may be driven similarly to the chain 12 described above with respect to FIG. 1, for example. The module 11a further includes at least one full-width diverter belt 54 and one or more smaller diverter belts, such as partial-width, selective diverter belts 56a-56f, that may arranged in line in the module to follow diverter belt 54 in the flow of product. The selective partial-width belts 56a-56f are arranged in series along the length of the module 11a as shown for selective diversion. The partial-width diverter belts 56a-56f may be arranged to for providing various selective sorting configurations. For example, pairs of diverter belts may occupy certain downstream sections of the module to address items 14 in the sections. Each of the diverter belts 56a-56f may be dedicated to a specific diverter direction, as shown, and may be selectively and independently operated as desired. In the illustrated embodiment, the smaller diverter belts 56a, 56c and 56e each are shown to divert or move items in one direction, such as to a lateral side 38a of the conveyor, while the smaller diverter belts 56b, 56d and 56f each divert or move items to the other lateral side 38b of the conveyor. A greater or lesser of such number of such smaller diverter belts might be used and the illustrated example is not limiting.

In the embodiment shown, the module 11a includes one full-width diverter belt 54 located at the first end 34 of the module 11a, a first pair 56a, 56b of partial-width diverter belts in the next section of the module, followed by a second pair 56c, 56d for the next downstream section and a third pair 56e, 56f of partial width diverter belts in a final section of the module, for a total of seven diverter belts in the illustrated example. As noted, other configurations of diverter belts 54, 56a-56f are possible, such as fewer or more diverter belts 54, 56a-56f arranged in different series configurations, for example. In such arrangements case, the ball chain 52 may be a single conveyor ball chain 52 implemented over top of each of the diverter belts 54, 56a-56f which are operated independently to selectively move and/or divert items 14 from the main direction of travel A1 to desired positions or to aftersort destinations 46a-46c.

The sortation system 18 may include various other components such as one or more photo-eyes 48 for controlling operation of the components of the sortation system 10. The photo-eyes 48 may be present at both the infeed of the divider module 11a and across the lateral sides 38a, 38b or discharge sections of the module 11a. To this end, the photo-eyes 48 may be used as an interface to a controller or may themselves contain logic for determining how the diverter belt array is to be controlled.

With continued reference to FIG. 4A, the full-width diverter belt 54 is located nearest the first end 34 of the module 11a and extends generally between the lateral sides 38a, 38b of the module 11a for the full width $W_1$ of the ball chain 52. Thus, the balls of the ball chain 52 may be driven in either direction across the full width $W_1$ of the ball chain 52. The full-width diverter belt 54 may be operated to side-justify or move the various items 14 toward either side 38a, 38b of the module 11a, as indicated by directional arrows A3 for further processing. Then the items may continue on the module, such as over the other belts 56a-56f for further processing and sorting. For example, once side justified, if the items are not to be diverted, they may continue off of the module 11a and further down a conveyor system. Alternatively, the items may be diverted off of the module immediately at belt 54. For example, the full-width diverter belt 54 may be operated in an appropriate direction to divert items into the aftersort destination 46a to one side 38a of the module 11a. Alternatively, the full-width diverter belt 54 may be operated in another direction to divert items into the aftersort destination 46b to the other side 38b of the module 11a.

If the items move beyond belt 54 they will move over the other partial-width belts 56a-56f located between the full-width diverter belt 54 and the second end 36 of the module. The other partial-width diverter belts 56a-56f are configured, if desired, to complete the divert cycle delivering the items 14 to desired aftersort destinations 46a-46c, if required. As shown, each partial-width diverter belt 56a-56f extends a length that is partially between the sides 38a, 38b of the module 11a or between the sides of the chain 52. Stated differently, the length of each diverter belt 56a-56f is less than the full width $W_1$ of the ball chain 52 or the full width of the module. In the embodiment shown, each partial-width diverter belt 56a-56f extends from proximate one lateral side 38a, 38b to approximately the center of the module 11a. Thus, each partial-width diverter belt 56a-56f extends for approximately half of the width $W_1$ of the ball chain 52 or module. However, the partial-width diverter belts 56a-56f may extend for other lengths that are less than the full width $W_1$ of the ball chain 52, for example, but greater than half of the width $W_1$ of the ball chain. The partial-width diverter belts may be configured as desired for their diversion purposes or other purposes and the partial-width diverter belts 56a-56f may be operated to be independently movable from each other or some of them may be operated to be movable together in any selected and desired operational arrangement. The partial-width diverter belts 56a-56f may be operated to divert individual items 14 in situations where items 14 are positioned such that no two subsequent items 14 are ever located over any single diverter belt 56a-56f at the same time. Alternately, items 14 may be handled in a bulk flow arrangement with no appreciable product gap present. The partial-width diverter belts 56a-56f may be operated to divert items 14 in opposite directions, as indicated by directional arrows A4, A5, and A6, respectively. In other scenarios, aligned pairs of partial-width diverter belts, such as 56a-56b across the width of the chain, may be operated in a same direction to move an item from one belt to the next and then to divert items 14 to the same side 38a or 38b of the divider module 11a. For example it may be desirable to divert an item from belt 56a to one of the stations 46b, 46c and so belt 56a might be selectively operated in the same direction of belts 56b, 56d or 56e. As may be appreciated, the various partial-width belts may be selectively operated independently as desired to be movable in either direction to achieve the final destination for an item.

The diverter belts 54, 56a-56f may driven and/or idled at their respective ends by drive and idler elements. The drive and idler elements may be similar to the rollers 28, 30 described above with respect to FIGS. 1-4, for example. In that regard, the drive and idler rollers will drive the respective belt 54, 56a-56f in either direction as shown by arrows A4, A5, A6 generally normal to or at 90 degrees with respect to the direction of travel or the conveying direction A2 of the ball chain 52, as shown.

The various modules 10 in a system may be operated using controllers 43 that are coupled to each module for operating the module in the larger system, as shown in FIG. 3. Each controller 43 will power and operate the drive elements that drive the chains and belts of the module. The control may thus be local and logic may reside in the motor control card of the controller 43 for a zone by zone control scheme as readily understood by a person of ordinary skill in the art. One or more power supplies, not shown, will provide the necessary power for powering the various drive elements and rollers to move the chains and belts as described herein. The controllers 43 may be used to selectively power the drive elements and rollers. Alternately, the controllers may be controlled by system logic control/PLC element 45, that may be used to provide divert signals to the modules. The PLC element 45 may also operate other equipment 47, such as infeed elements, check weighers, scanners, etc. The PLC element 45 for the conveyor system will then usually interface with a warehouse management or control system WMS/WCS 49 or other system that oversees the larger conveyor system and conveying operation. The system of FIG. 4 could be similarly controlled but it should be understood that the control layout is not limiting to the invention.

In accordance with one embodiment of the invention, the conveyor modules illustrated herein utilize uniquely configured drive elements 20 and idler elements 22 that uniquely engage with discrete links of a ball chain and provide for reliable, quiet, and cost-effective driving of the ball chain, such as over top of one or more diverter belts 26. FIGS. 1-3 illustrate modules 10 that incorporate a single conveyor chain 12 with a single diverter belt 26. However, the inventive drive elements and idler elements 20, 22 of the present invention may be implemented in any number of chain-driving scenarios including different diverter and sections as well as multiple diverter belts and sections beneath a single conveyor ball chain 12, as will be described in further detail below. It will be readily understood by a person of ordinary skill in the art that multiple drive elements 20 might also be used at each end of a ball chain 12, 60 to provide a drive force on the ball chains for driving the chain in two opposite directions. However, as illustrated herein, the drive element 20 will be described is being implemented in one end, while the opposite end implements an idler element 22.

FIG. 5 illustrates one embodiment of an inventive drive element 20 that may be implemented in accordance with the invention. The drive element 20 has an elongated body 74 that is configured to rotate about its longitudinal axis and an outer drive surface for engaging the ball chain. The drive surface on the outer surface of the body is formed by a plurality of generally flat or planar faces or facets 70 formed on the body 74. The facets extend along the length of the body, or in relation to the chain, across the width of the body 74 of the drive element as shown in FIG. 1. Because the chain travels in a direction essentially perpendicular to the longitudinal axis of the drive element body 74, the length of the body will be referred to herein as its "width" in relation to the width of the chain moving around the drive element. Each planar facet is configured to engage a respective link of the ball chain 12 when the drive element 20 drives the chain. In one embodiment of the invention, the planar facets 70 extend across the width of body 74 generally parallel to each other and are also contiguous with each other across that width and along the length of the body. More specifically, the facets 70 encircle the body and are angled with respect to each other. The angled facets join each other at transition lines or edges 71. In the embodiment as illustrated in FIG. 5, the transition edges 71 span the width of the body 74 (or extend along its length) and are also generally parallel to each other. The facets are formed or configured to continuously surround the elongated rotating body 74 as shown in FIG. 6 so that adjacent facets engage adjacent successive discreet links in the ball chain 12 as the ball chain loops around the drive element to be driven in a conveying direction. The facets are thus angled with respect to each other radially around the axis of the drive element. Each facet interfaces with a respective link of the ball chain when a portion of the chain engages the drive element to be driven. As seen in FIG. 6, only some of the links engage the drive element and contact respective facets as the chain is driven. With the contiguous planar facets, the transition edges 71 between each of the facets 70 form a plurality of angled transition peaks around the drive element as seen in cross-section in FIGS. 6-7. Simultaneous with the facet/link engagement, the peaks or transition edges 71 interface or engage with the hinge points defined by hinge elements 41 between the angled adjacent links as the chain wraps or loops around the drive element. The combination of the flat facets against the respective flat links and the transition peaks against the hinge points between links provide a synchronous drive of the chain when the drive element is rotated as described further herein to drive the chain.

The body 74 of the drive element is rotated in an appropriate manner for rotating the drive element and the plurality of facets to drive a chain in a chosen direction. In one embodiment, the drive element could be configured on a motor driven roller 72 (MDR). Such rollers contain a cylindrical body that would form the body 74 and an internal motor 76 which may be powered for providing a drive force to rotate the cylindrical rotating body 74 of the drive element 20 around a longitudinal axis 90. The facets 70 may be formed from a layer of material that is applied onto the body 74 to form the drive surface of the drive element. As noted below, a material layer or surface layer can be applied to a body 74 of a roller and then machined or otherwise formed to make the planar facets 70 and transition edges 71 for chain engagement. Alternatively, the body 74 might be molded or otherwise formed to have the facets and relief elements described herein. The construction as utilized for the drive element 20 as described herein may also be utilized for an idler element 22 or snub roller element or similar elements used in moving a looped ball chain 12, but generally the drive element 20 is referred to herein as the primary illustrative example.

FIGS. 6 and 7 show a side view and a side cross-sectional view, respectively, of the faceted drive element 20 illustrated in FIG. 5. In accordance with one aspect of the invention, drive element 20 acts as a synchronous drive element providing a synchronous drive of the links of the ball chain 12. As described with respect to FIG. 1, the ball chain 12 includes a plurality of generally flat links 40 that span across the width of the ball chain 12. The links 40 hinge with respect to each other around hinge points formed by appropriate axial hinge elements 41, such as hinge pins, that allow the links 40 to rotate or pivot individually with respect to the adjacent links, as illustrated in FIGS. 6 and 7. As illustrated in FIG. 1, each of the links 40 contain a row of freely rotating balls 42 that rotate in the body of the links. The facets 70 of the drive element 20 each engage a link of the ball chain 12. The links lie generally flat on the respective drive facet 70 of drive element 20. Referring to FIG. 7, the facets 70 of drive element 20 are configured to have a cross-sectional width $W_F$ that is similar to or the same as a cross-sectional width $W_L$ of each of the chain links 40 such that the links 40 will hinge and lie generally flat on a respective facet 70 as the drive element 20 rotates, such as the direction of arrow. For example, as shown in FIGS. 6 and 7, the loop of the ball chain 12 may generally engage five facets 70 of element 12 as it is driven around the drive element 20 in the conveying direction 16 as shown. At another end of the loop of ball chain 12 an idler element 22 similarly constructed as the drive element 20 is used. In that way, the ball chain 12 is powered, supported, and returned in a synchronous fashion. When incorporated in a live shaft scenario, an idler element 22 can be utilized to power an encoder or resolver. In other cases, the synchronous nature of the idler element 22 may be used to power other devices which require timed phasing with the main chain 12.

In accordance with another feature of the invention, the drive element 20 incorporates relief elements 84 for the moving elements in the chain, such as rotating balls or ball elements 42 in each of the facets 70. In the embodiment illustrated in FIGS. 5-7, the relief elements 84 are in the form of depressions or dimples that are positioned along a midline of each facet and are spaced along the length of the facet 70 and drive element 20. The relief elements 84 of the embodiment in FIG. 5 and various other figures herein are symmetrical depressions that are provided for each of the ball elements 42 and are appropriately spaced apart along the facets with respect to the spacing of the ball elements 42 in the chain along the width/length of each link 40. Generally, the length of the drive element will be close to the width of the chain so that the facets of the drive element interface with the chain across the width of the chain. The relief elements 84 are configured and positioned to receive the individual balls 42 of the links, so the links 40 lie generally flat on respective facets 70 to allow each of the links 40 to engage a respective facet 70 and provide a synchronous drive of the ball chain 12 in accordance with a feature of the invention. Furthermore, the engagement of each of the balls 42 within a respective relief element 84 further enhances the synchronous engagement of the ball chain 12 provided by drive element 20 in accordance with the principles of the invention. The drive element 20 thus locks on to the links 40 of the ball chain 12 through the facets 70 engagement with the links, through the transition edges 71 engagement at the hinge points 41 between links and finally with the engagement of the balls in the respective relief elements 84. Therefore, the synchronous driving of the ball chain is provided by a plurality of physical mechanisms of the drive element 20.

In one embodiment of the invention such as in FIG. 5, there are individual relief elements for each ball 42 of the chain links that pass over the drive element 20. The relief elements 84 of the drive element are configured so that the balls 42 will fall into a respective relief element of the flat link. The relief elements may be dimensioned and configured so that the bottom of the balls do not contact the bottom of the relief elements when the chain is driven and thus the balls remain free to rotate as the chain is driven. This may be appropriate for the drive element 20 so that an item on the chain, may freely transition to the chain on a successive module. Alternatively, the relief elements 84 may be configured so that the bottom of the balls do contact the bottom of the relief elements, and thus the balls are not free to rotate when contacting the facets of the element while driven. This may be appropriate for the idler element 22 so that an item on the chain at the intake end is grabbed by the non-rotating balls to more readily transition to the chain on the module. Further defining the relief elements or depressions 84, the depression 84 shown in FIG. 5 may be defined as having a length to width aspect ratio wherein the length of the dimple, Ld when divided by the width of the dimple Wd yields a quotient of or about 1 (e.g. Ld/Wd=1). In this manner the dimples are considered to be symmetrical about their geometric midline.

In the embodiment illustrated in FIG. 5-7, the drive element 20 will generally have a length that is close to or the same as the width of the chain 12 so as to engage the chain over its width. The facets 70 of the drive element 20 are continuous across the drive element and similar in length to the length of the drive element and thus the facets 70 extend across the width of the chain 12 to engage the links 40 across their width for efficient driving of the chain. However, in other embodiments, the facets are not continuous but rather are formed by discrete facet portions along the length of the drive element. Referring to FIG. 5A, a drive element 20a has a plurality of facet portions 73 that are positioned along the length of the drive element to effectively form the facets 70 to drive the chain. The portions have gaps 75 therebetween along the body 74. As with other embodiments, the facets formed by the facet portions 73 include relief elements 84 for receiving balls of the chains while the facet portions 73 engage respective portions of the link 40 of the chain at sections across the chain width. The length of each facet portion may be varied as shown in FIG. 5A as would be appropriate to achieve the desired drive force for the chain. Because the multi-action engagement features of the invention ensure a robust driving function, it is possible to drive the chain using such facet portions rather than engaging the chain across its entire width.

The relief elements 84 may take various shapes to receive the ball elements of the chain as the chain engages the facets 70 to be driven over the drive element. In the embodiment illustrated in FIG. 5-7, the individual relief elements are round in cross section. Referring to an alternative embodiment, as shown in FIG. 5B, in the drive element 20b, the relief elements 84b are square in cross section. Or the relief elements may be formed to accommodate another shape of the moving element in the chain. The relief elements as discussed are configured and dimensioned to give the portion of the balls 42 or other moving chain elements that sit above the flat surfaces defined by the faces of the links 40 the necessary clearance so that the flat or planar links and link faces of the chain can sit on the flat facets 70 of the drive element.

While many of the illustrated embodiments of the inventive drive element show it to be used to drive a ball chain, the invention may be used to drive other chains that have flat links or flat elements that are configured to support other moving elements, such as a roller rather than a ball. In such a case, the relief elements 84 would be appropriately configured to provide relief for such moving elements. Furthermore, the invention may be used to drive other chains that have flat links or flat elements that do not support any other moving elements. For example, FIGS. 5C and 5D illustrate an alternative embodiment of the drive element. Drive element 20d is used to drive a chain that does not implement other moving elements, like balls, therein. Specifically, a conveyor chain 12d may include flat links 40d that pivot at hinge points 41*d*. The drive element 20*d* includes planar facets 70, but the facets do not have relief elements formed therein. As such, the chain 12*d* is synchronously driven by the engagement of the facets 70 with links 40*d* and the engagement of the transition edges 71 with hinge points 41*d* as described herein. In that way, the inventive drive element may be used to drive number of chain designs having flat or planar links.

Figure 8:
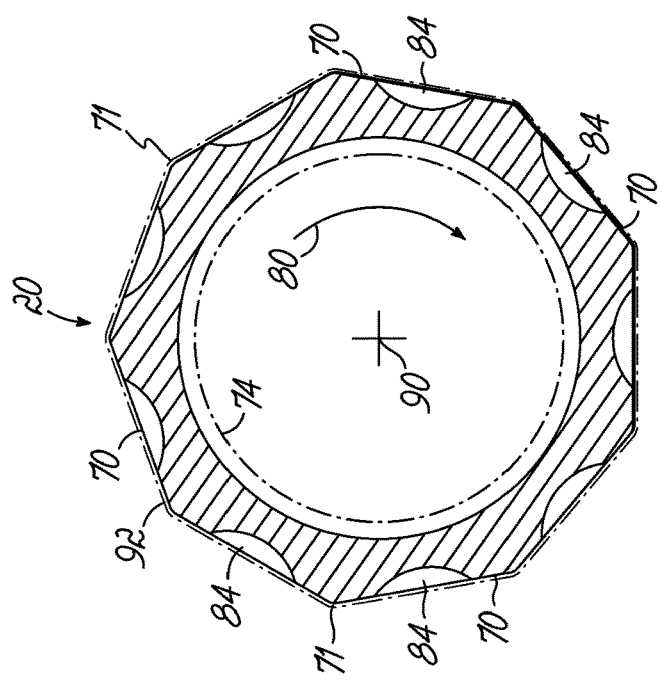
FIG. 8 is a side cross sectional view of a drive element in a conveyor chain drive system of an embodiment of the invention.

FIG. 8 illustrates a cross-sectional view of the drive element 20 with the ball chain 12 removed to illustrate the positioning of the relief elements 84 on the midline of each facet 70 of the drive element 20 and between the transition edges 71. Generally, the drive element 20 will be driven about an axis 90 defined by the housing 74 around which the drive element 20 rotates. As noted herein, the unique structure of drive element 20 as described herein may be utilized on other elements, such as idler elements, snub rollers, pulleys or other such structures which engage the ball chain 12 to effectively power, support and return the loop of the ball chain 12. As may be appreciated, the combination of the engagement between the facets 70 of drive element 20 with each of the individual planar links 40 as well as the engagement of the transition edges 71 with the hinge points 41 between links and finally the engagement between the ball relief elements 84 with each of the individual balls 42 of the link 40 provides a multi-action synchronous drive and engagement with the ball chain 12. For one exemplary drive element, each of the dimple relief elements 84 may have a width or length in the range of 0.375-0.550 inches and a depth in the range of 0.060-0.165 inches from the flat facet surfaces.

Referring again to FIG. 8, in accordance with one embodiment invention, drive element 20 and the various facets 70, transition edges 71 and relief elements 84 may be formed by applying an elastomeric coating layer 92 to body 74. The body may be formed of an appropriate material, such as metal, urethane or plastic. The body 74 in the illustrated embodiment is generally cylindrical with a circular cross section as shown. Bodies with other cross sectional shapes may be used however and it is the facets 70, transition edges 71 and relief elements 84 that engage the chain regardless of the body carrying the coating layer 92 forming those facets, edges and relief features. The elastomeric coating 92 may be applied around the body 74 in a mold to create the individual flat or planar facets 70 and transition edges 71. The relief elements 84 might then be machined into the individual flat facets 70. Alternatively the coating might be applied and the facets 70, edges 71 and relief elements might be machined into the desired shapes. Still further, the body 74 might be formed as a unitary element to have the various facets, edges, and relief elements. Suitable elastomeric coatings or materials include, but are not limited to: urethane thermoplastic rubber, nylon, ethylene propylene diene monomer rubber (EPDM). Surface hardness of the elastomeric coating 92 may encompass a wide range with typical values falling between a Shore A hardness of between 70 and 100. Alternately, the coating layer 92 geometry is suitable for driving the ball chain even when the surface hardness of the coating 92 exceeds a Shore D hardness of 80. Preferred hardness for the elastomeric coating 92 of the facets 70 and edges 71 resides on the Shore A scale at a level of approximately 74. It is to be understood that various materials and/or hardness may be applied to the rotatable body 74 without limiting the overall scope of the invention.

In one embodiment of the invention as illustrated in FIGS. 5-8, the drive element 20 incorporates nine individual facets 70 and transition edges 71 positioned around the drive element with each facet 70 including a respective row of appropriately spaced and configured relief elements 84, such as in the form of depressions, to provide relief for the balls 42. Utilizing an odd number of facets 70, or more specifically, a prime number of facets 70 facilitates distribution of wear between the drive element 20 and the ball chain 12. Ideal component wear distribution happens when both the number of facets 70 and the number of links 40 of the ball chain 12 are both prime numbers forcing a chain to facet hunting ratio to be established. However, the present invention may be scaled appropriately for larger or smaller sizes to provide the synchronous drive engagement between the various facets 70 and the links 40 of a ball chain 12.

Figure 9:
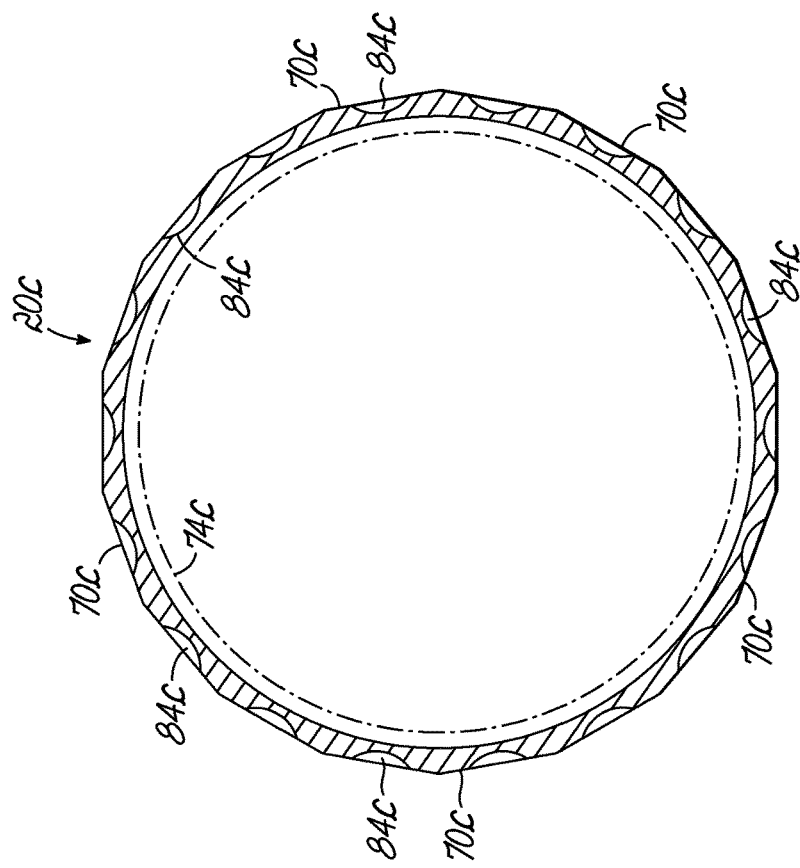
FIG. 9 is a side cross sectional view of an alternative drive element in a conveyor chain drive system of another embodiment of the invention.

For example, as illustrated in FIG. 9, a drive element 20*c* is illustrated with a body 74*c* having a greater number of facets, such as 18 facets 70*c* with appropriate relief elements 84*c*. Those facets 70*c* may be appropriately applied to the body 74*c* and are sized as appropriate for the use of the drive element 20*c*. Accordingly, the present invention is not limited to the number of facets 70*c* implemented. Such a configuration as illustrated in FIG. 9 may be used to drive a much longer section of the ball chain 12. The number of facets 70*a* utilized will be based on many factors included but not limited to; space constraints, the length of the ball chain driven, and the drive power required.

Figure 10:
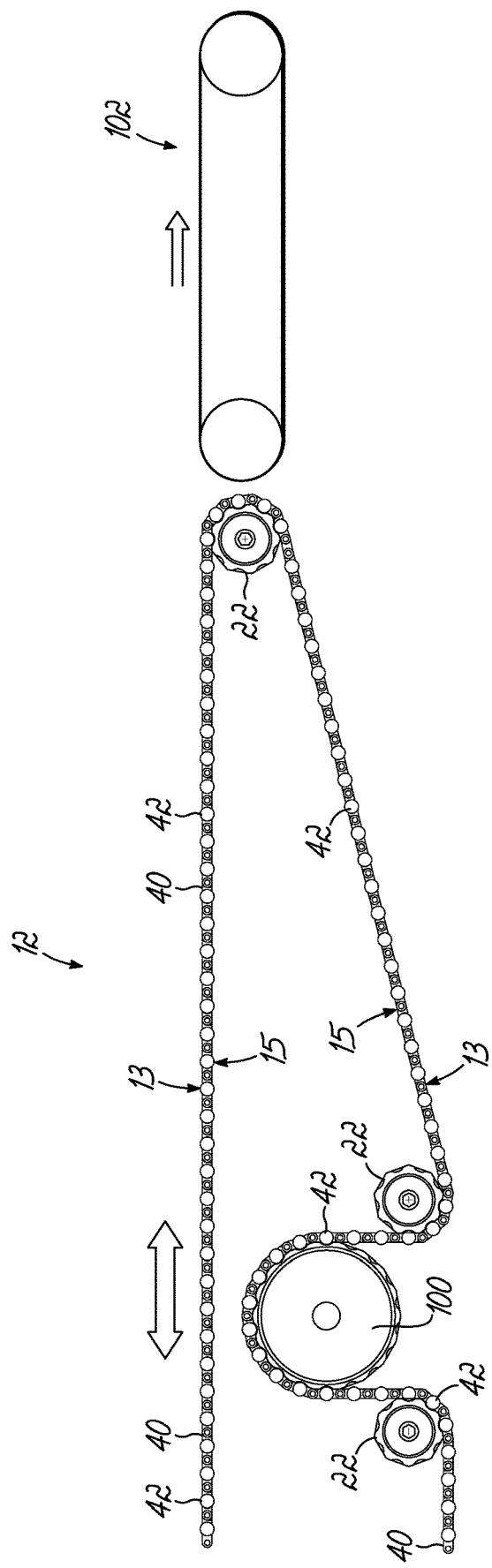
FIG. 10 is a side cross-sectional view of a conveyor module using the conveyor chain drive system in accordance with an embodiment of the invention.

In accordance with another embodiment of the invention, because of the unique multi-action functionality of the drive element 20 or idler element 22, those elements can operate on both sides of the ball chain 12. The facets and transition edges can operate on the chain links by engaging either the item-bearing side 13 or backside 15. That is, the chain may be operated by driving on the item-bearing side of the chain 12. Generally, prior art drive elements incorporate sprockets which engage the cavities on the backside of the chain to drive or guide the chain, while the item-bearing side remains smooth. As such, typical drives can only be implemented to drive on the backside of the conveyor chain. However, the drive element 20 of the invention which incorporates facets 70, transition edges 71 and relief elements 84 may engage the item-bearing side of the ball chain 12 as well. Referring to FIG. 10, a ball chain 12 is illustrated driven by a back-wrap drive configuration. As noted, ball chain 12 has an item-bearing side 13 and a backside 15. As illustrated by idler elements 22 in FIG. 10, it is generally the backside 15 that engages such drive or idler elements, and the traditional drive element as shown in FIG. 2, drives the ball chain 12 on the backside 15. However, as shown by drive element 100, the drive element 100 may engage the item-bearing side 13 and drive ball chain 12. This may provide a particular advantage when it is necessary to have a tight transition between the ball chain 12 and another piece of equipment 102 as illustrated in FIG. 10. In such a scenario, a drive element that is the size of element 22 may not be adequate to drive the ball chain 12 effectively. A larger drive element might be needed. Accordingly, a drive element, such as drive element 100 may be implemented in a back-wrap drive configuration is shown in FIG. 10 to drive the ball chain 12. As such, the drive element 100, 20 may be used in either a traditional drive position or a back wrapped drive position depending upon individual requirements. The ability to mount the same drive element on either side of the ball chain 12, while maintaining the synchronous nature of the drive, allows for one component to be used in many drive scenarios without the need to produce different parts based on the drive element 20, 100 location.

Figure 11:
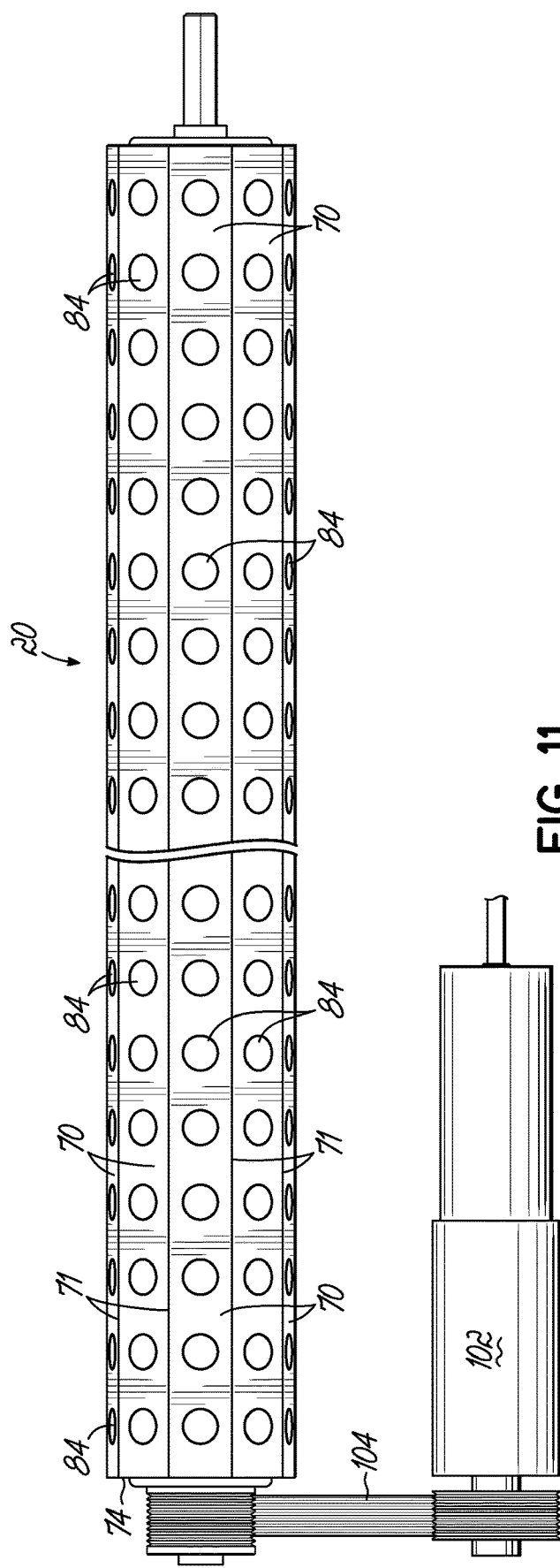
FIGS. 11 and 11A are a front view and side cross-sectional view, respectively, using a belt drive system as an alternate method of driving the drive element in accordance with an embodiment of the invention.
Figure 11A:
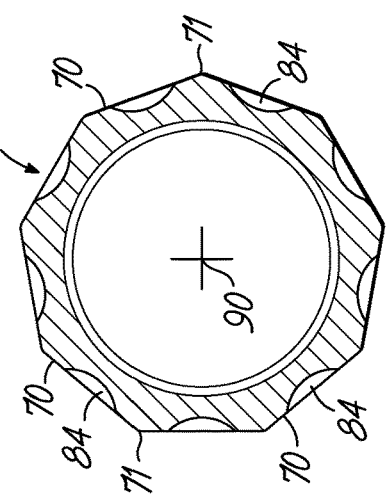

In accordance with one aspect of the invention, to provide a driving force for the drive element 20, the body 74 might be implemented into a motorized drive roller, for example, as illustrated in FIGS. 5-7. Alternatively, the body 74 might be indirectly driven as illustrated in FIGS. 11 and 11A. More specifically, the drive element 20 might be powered indirectly through an external motor 102 and a drive belt 104 or other appropriate linkage. As such, the drive element 20 as disclosed herein may be driven in a number of different ways utilizing a number of different power schemes to achieve the benefits of the invention. The various different drive elements as disclosed herein are not limited to the way in which they are powered or driven.

In accordance with another embodiment the invention, the relief elements 84 implemented within the facets 70 of the drive element 20 may take different forms. For example, referring to FIGS. 12 and 12A, a drive element 110 includes a plurality of faces or facets 112 and transition edges 113 which may be similar to the facets 70 and transition edges 71 described in previous embodiments.

The relief elements 114 formed in each facet 112 are in the form of an axial or longitudinal groove or relief formed in each facet 112 along the length of the facet. The axial grooves or reliefs 114 are positioned generally along the centerline of the facet 112 and are configured for receiving the row of balls 42 of a ball chain 12 as the link 40 lies on the facet 112. In a similar fashion as discussed with respect to drive element 20, the drive element 110 provides a multi-action synchronous drive of a ball chain having links 40 and balls 42. Each of the facets 112 engage with a link 40, the transition edges engage with hinge points 41 while the balls 42 are received by the axial grooves 114 in each facet 112. Generally, each axial groove 114 extends along an appropriate facet 112 along the length of the drive element 110 so as to engage across the width of a ball chain 12 to synchronously drive the ball chain 12 through the engagement with the links 40. The axial grooves 114 may have a width and depth dimension in the noted ranges for the discreet relief elements 84.

FIGS. 13 and 13A illustrate an alternative embodiment of a drive element 120 of the invention utilizing a plurality of facets 122. Specifically, drive element 120 includes a plurality of facets 122 that are positioned on the drive element with appropriate transition edges 113 as shown in FIG. 13A. Each of the facets 122 includes various relief elements that take the form of facet grooves 124 that extend perpendicular to each of the longitudinal facets 122 that extend along the length of the drive element 120. As illustrated in FIG. 13A, the perpendicular grooves 124 of a facet are continuous with the grooves of another facet across the transition edges 113. Therefore, generally a single continuous groove, formed of faceted groove sections, extends around the body 74 to form relief elements for the multiple facets 122. The continuous grooves are positioned side by side along the length of the drive element to form a plurality of relief elements in each facet 122 that are spaced to coincide with the ball spacing in the chain links. Suitable relief for balls 42 of the ball chain 12 is provided to allow for a synchronous drive of the ball chain when the various planar facets 122 engage the links 40 of the ball chain 12. In the embodiment illustrated in FIGS. 13 and 13A, the balls themselves would not provide a strong synchronous driving force on the ball chain as the individual facet grooves 124 extend perpendicular to the flat facets 122 along the length of the drive element 120 and therefore extend generally perpendicular to the links of the chain. As such, when the drive element 120 is rotated any balls 42 of the ball chain 12 are free to roll across the relief grooves 124 from facet to facet. Accordingly, the main synchronized driving force provided by drive element 120 would be provided by the various facets 122 which engage the flat links 40 of the ball chain and the transition edges 113 which engage with hinge points 41.

FIGS. 14 and 14A illustrate another alternative embodiment of a drive element 130 of the invention, wherein the synchronous drive function of the drive element 130 is provided primarily by the ball relief elements 84. Turning to FIG. 14, a drive element 130 is illustrated in the form of a cylindrical roller element incorporating discrete relief elements 132 that extend in aligned rows 134 along the length of the drive element 130. Each of the relief elements 132, in the form of dimples, are spaced apart in the row 134 and the rows themselves are spaced apart around the circumference of the drive element 130 in order to align with the various balls 42 positioned in the links 40 of the ball chain 12. In that way, drive element 130 provides a synchronous drive function for a ball chain through engagement between the balls 42 and discrete relief elements 132 although the individual links 40 are not engaged by facets as described in the embodiments of FIGS. 5 to 7, for example. FIG. 14A illustrates a round cross-section wherein the individual relief elements 132 are shown positioned around the circumference of the drive element 130 so as to receive the various balls 42 of a ball chain 12 progressing around the drive element 130.

FIGS. 15 and 15A illustrate still another alternative embodiment of a drive element 140 for providing a synchronous drive of a ball chain 12. The drive element 140 is in the form of a cylindrical roller element also having a round cross-section as illustrated in FIG. 15A wherein a plurality of relief elements 142 are positioned along the length of the roller in the form of axial grooves 142 similar to the embodiment of the drive roller 110 illustrated in FIGS. 12 and 12*a*. Drive element 140 does not incorporate facets, and therefore the synchronous drive functionality is provided by the engagement of the individual balls 42 of a ball chain with the axial grooves 142 positioned around the circumference of the drive element 140 as illustrated in FIG. 15A. The axial grooves 142 are positioned and spaced around the circumference of the drive element 140 (see FIG. 15A) so as to align with each of the links 140 in order to accept or provide relief to a row of ball elements 42 associated with each of the links 40 of a ball chain 12. Since the grooves extend longitudinally or axially along the drive element 140 in a direction generally perpendicular to the conveyor direction 16 of the ball chain 12 as illustrated in FIG. 1, the axial grooves 142 will act upon the individual ball elements 42 and thereby synchronously drive the ball chain 12 in the conveyor direction 16 is desired.

Turning with reference to FIGS. 16-20, in accordance with another feature of the invention, the module 10 may include a transition guide 160 for aiding transition of the ball chain 12 from the diverter belt 26 to the drive or idler element 20, 22, or vice-versa, in accordance with one aspect of the invention. As shown, the transition guide 160 is positioned to beneath the diverter belt 26 and extends along or proximate to a width of the ball chain 12 (e.g., between the side edges of the diverter belt 26 and generally parallel to the drive rollers 28, 30) and may be supported thereunder by the frame structure 50 of the module 10. The transition guide 160 is generally planer in shape and has a width that generally corresponds to a width of the ball chain 12. In this regard, the transition guide 160 is configured to control the transition and "landing" of the link 40 and balls 42 of the ball chain 12 onto a facet of the drive or idler elements as the chain moves from riding on the diverter belt 26 to engage the drive element 20 or from the idler element 22 and onto the diverter belt 26. As shown, the transition guide 160 includes two opposed transition ramp portions 162 located at either end of the transition guide 160. Each transition ramp portion 162 is configured to extend from the diverter belt 26 to a position slightly over the corresponding drive or idler elements 20, 22 for the chain 12 to transition onto or off of the elements. Thus, the transition ramp portions 162 are generally positioned between the corresponding drive or idler elements 20, 22 and the diverter belt 26. Each transition guide 160 extends in width generally along a length of the respective drive or idler elements 20, 22 that it is adjacent to and spans the general width of the chain 12.

With continued reference to FIGS. 16-20, the transition guide 160 further includes a planar surface 164 located between the two transition ramps or ramp portions 162. The planar surface 164 has a machined area, or channel, sized to receive the diverter belt 26 therein. The planar surface 164 positions the diverter belt 26 generally level with a plurality of ball guides 166 on each of the transition ramp portions 162 to ensure a smooth transition of the ball chain 12, and more particularly the transition of each of the links 40 and the balls 42, between riding on the diverter belt 26 and onto and off of the drive and idler elements 20, 22, as described in additional detail below.

Figure 16:
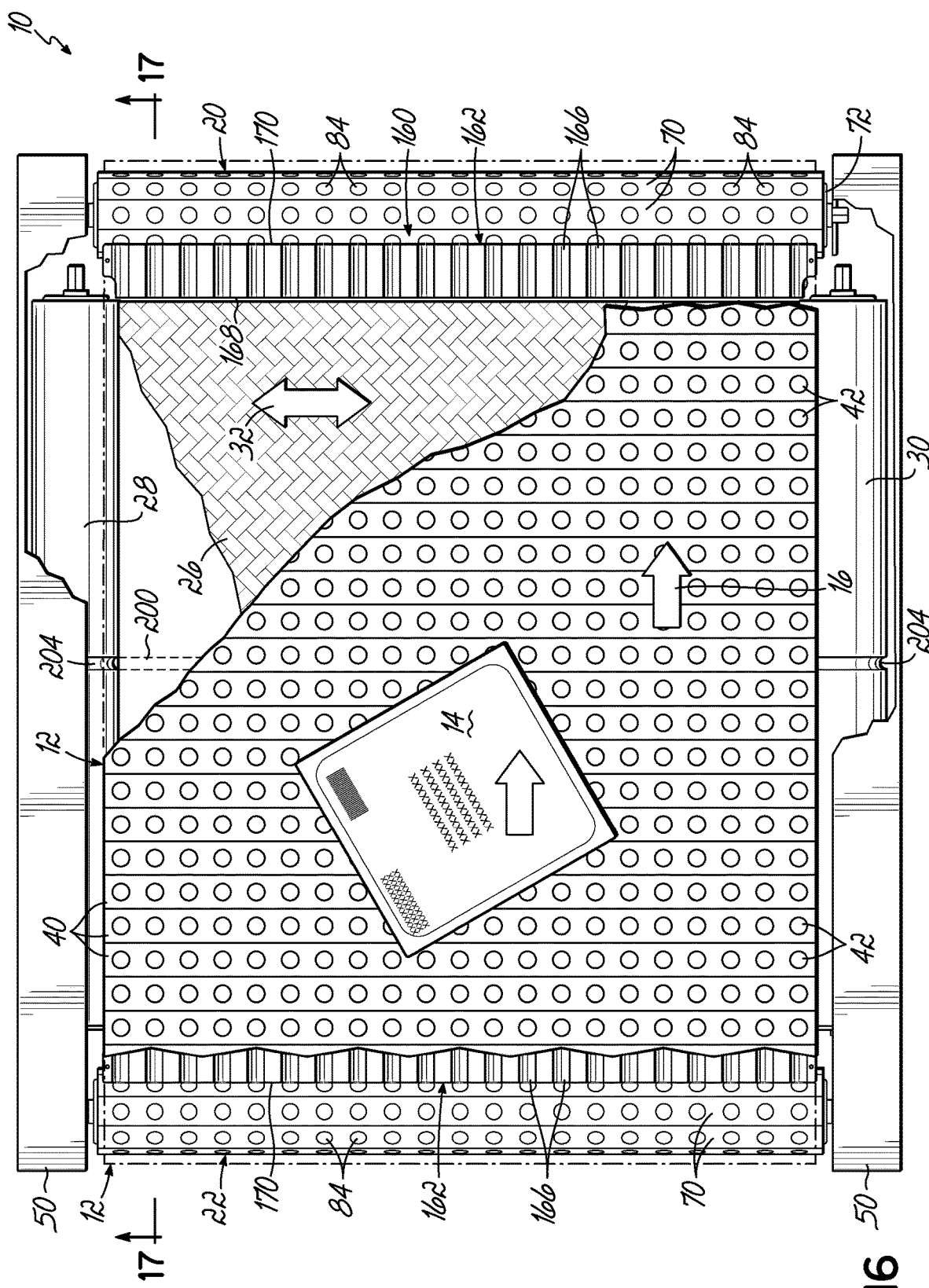
FIG. 16 is a top plan view, in partial section, of a conveyor module using the conveyor chain drive system and having a transition guide according to an embodiment of the invention.
Figure 17:
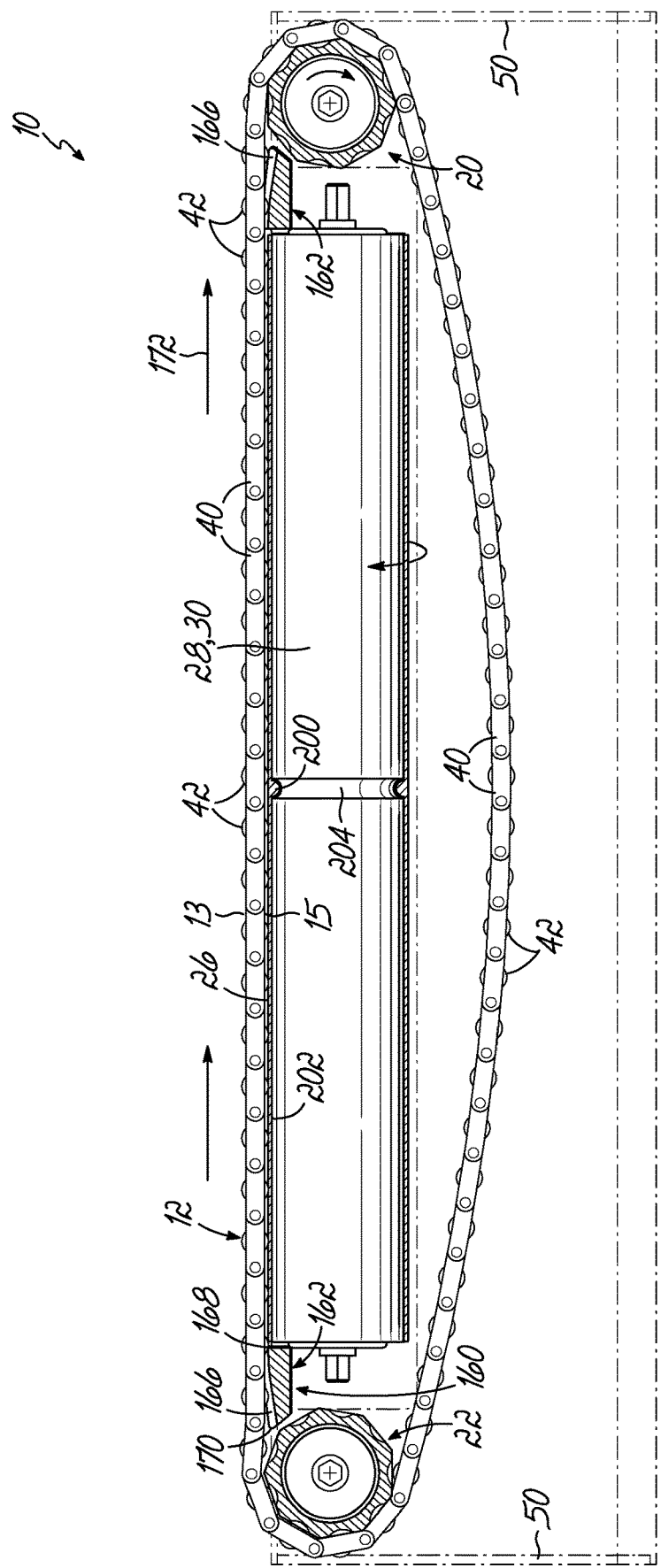
FIG. 17 is a side partial cross-sectional view of a conveyor module using the conveyor chain drive system and the transition guide of an embodiment of the invention.

As shown in FIG. 16, each transition ramp portion 162 includes a plurality of ball landing guides 166 that extend longitudinally from a first end 168 to a second end 170 of each transition ramp portion 162. The ball landing guides 166 are approximately aligned to be in-line with the balls 42 across a link in the ball chain 12 to improve the transition of the ball chain 12 between the diverter belt 26 and the corresponding drive or idler elements 20, 22 to prevent the balls 42 from abruptly impacting against the planar surface 164 during transition, which could cause increased noise as well as accelerated wear of those elements. In that regard, as shown in FIG. 17, the ball landing guides 166 on the transition ramp portion 162 that faces the idler element 22 are configured to receive corresponding balls 42 of a link of the ball chain 12 as the link of the chain 12 disengages from a facet of the idler element 22 and moves onto the diverter belt 26. Thus, as the chain links disengage with the idler element 22, the rows of balls 42 are received by corresponding ball guides 166. The upper surface of the transition ramp portion 162 is configured to control the link 40 of the ball chain 12 as the ball chain 12 is transitioning from the idler element 22 to the diverter belt 26 which is guided atop the planar surface 164 of the guide 160. By landing the link 40 of the ball chain 12 onto the transition guide 160, prior to allowing contact of the balls 42 of the ball chain 12, the guide 160 seamlessly lands the balls 42 of the ball chain 12 with a minimum amount of noise or wear, as the ball chain 12 moves in the direction of arrows 172. More particularly, as the chain 12 is driven in the direction of arrows 172 by the drive element 20, the rows of balls 42 are moved from the idler element 22 and into corresponding landing guides 166 at the second end 170 of the transition ramp portion 162. The guides 166 then gently transition the link 40 and balls 42 from an area of no contact with the guide 160 to an area of full contact with the guide as they are moved therethrough until the balls 42 exit the guides 166 at the first end 168 of the transition ramp portion 162 and move onto the diverter belt 26. To this end, the transition ramp portion 162 creates a smooth and generally seamless transition for the balls 42 between the idler element 22 and the diverter belt 26 thus minimizing the sound and wear generally associated with traditional designs.

The transition ramp portion 162 that faces the drive element 20 operates in a similar manner to transition the link 40 and balls 42 and guide the ball chain 12 from the diverter belt 26 and onto the drive element 20. More particularly, as the chain 12 disengages from the belt 26 on the planar surface 164, the balls are received in corresponding landing guides 166 at the first end 168 of the diverter ramp. As the ball chain 12 is moved over the transfer ramp portion 162, the balls are progressed through corresponding guides 166 in a direction towards the second end 170 of the ramp at which point the balls 42 disengage the ramp portion 162 and engage with the drive element 20. Since the landing guides 166 align with the balls across a link, they also align with the relief elements in an embodiment of the drive and idler elements. To this end, the transfer ramp portions 162 and ball guides 166 transition the balls 42 of the ball chain 12 between the diverter belt and drive and idler elements 20, 22.

Figure 18:
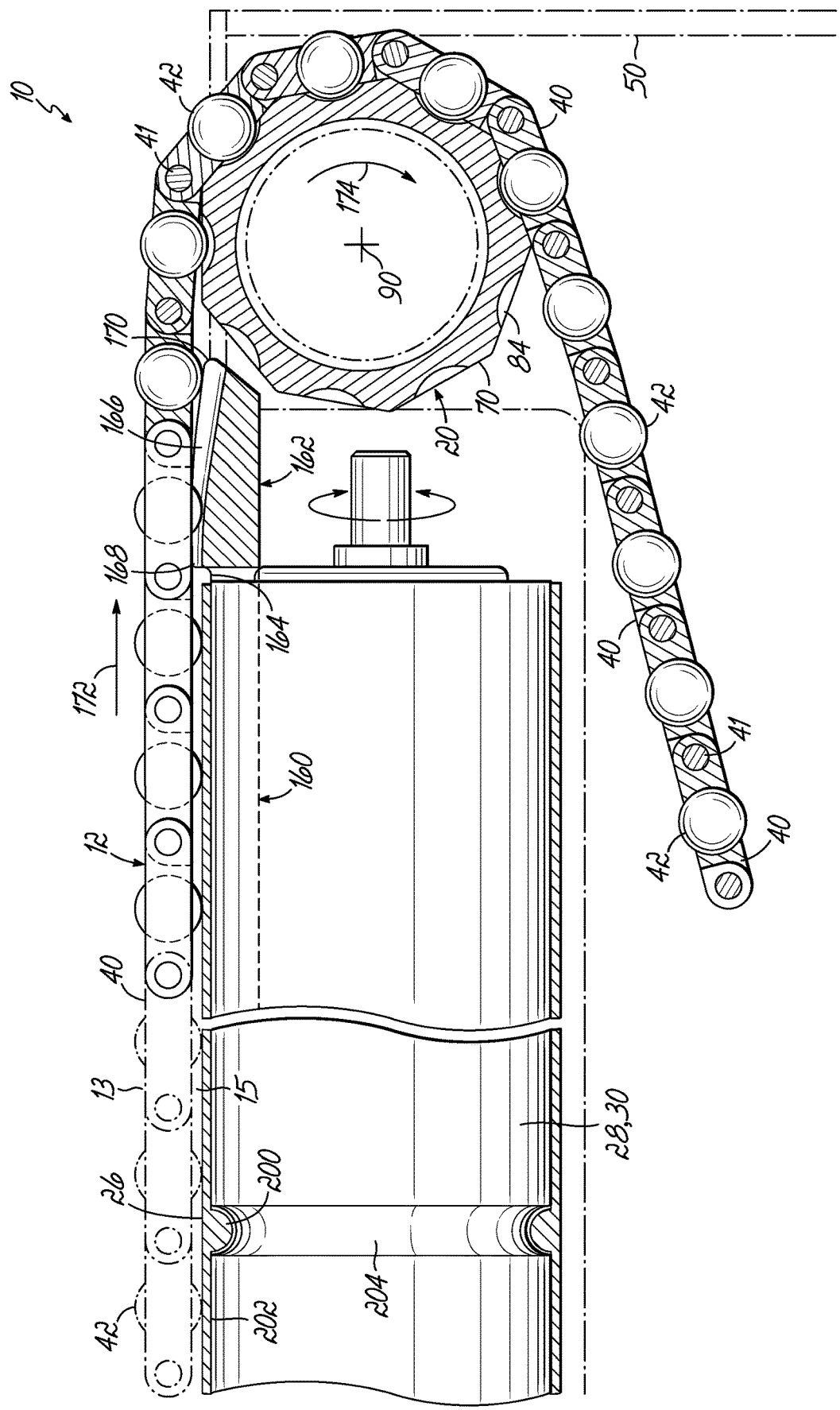
FIG. 18 is a side cross-sectional view of a drive element implemented in a conveyor chain drive system of an embodiment of the invention.

FIG. 18 is an enlarged view of the transition ramp portion 162 that faces the drive element 20. As shown, the diverter belt 26 is positioned atop the planar surface 164 and is generally level with the guides 166 at the first end 168 of the transition ramp portion 162 so that the ball chain 12 and corresponding balls 42 are seamlessly moved from the diverter belt 26 and onto the transition ramp portion 162 as the drive element 20 rotates in direction of arrow 174 to move the ball chain 12 in the direction of arrow 172. To facilitate the transition of the corresponding balls 42 onto the drive element 20, each transition ramp 160 is angled downward from the planar surface 164 where the diverter belt 26 is located and in a direction toward the second end 170 and corresponding drive or idler element 20, 22. The contoured nature of the ramp portion 162, combined with the increasing rate of change of the depth of the ball guide 166, creates a gradual slope for each of the guides 166 such that a depth of each guide 166 gradually increases from the first end 168 of the ramp portion 162 towards the second end 170. The gradual slope of each ball guide 166 facilitates transfer of the balls 42 from corresponding guides 166 to corresponding relief elements 84 on the drive element 20 to thereby minimize wear on the chain 12 from the balls 42 vigorously impacting the drive element 20.

Figure 19:
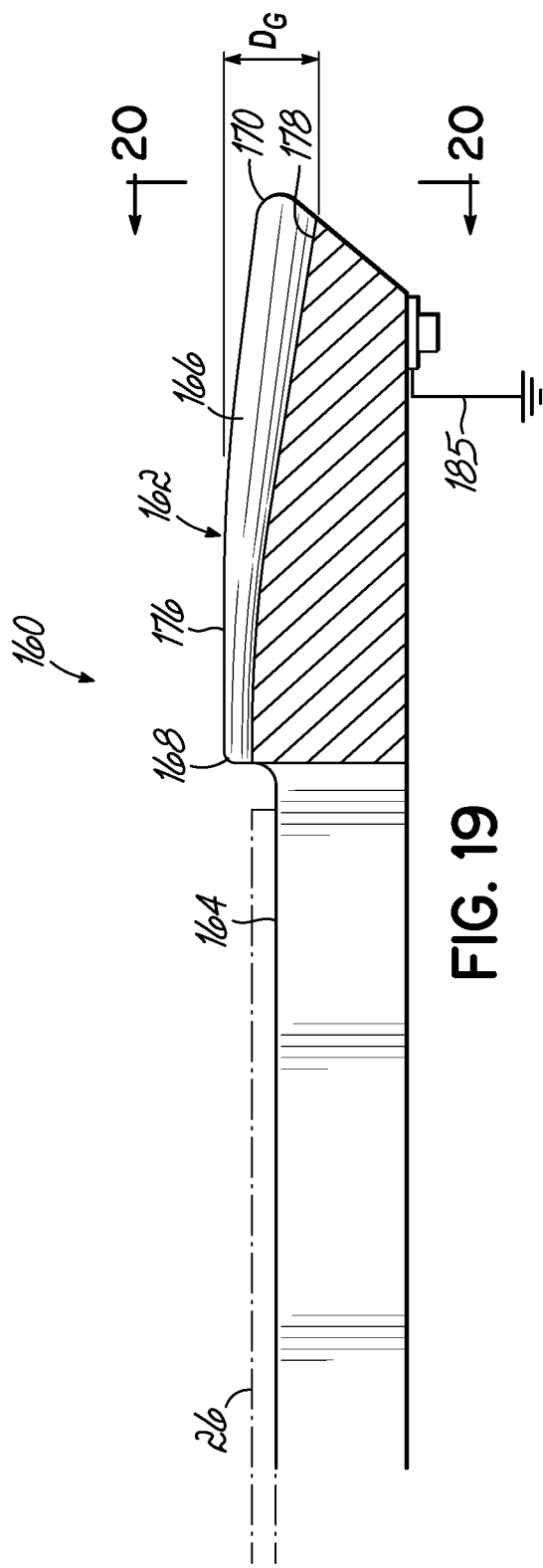
FIG. 19 is a side cross-sectional view of a transition guide of an embodiment of the invention.
Figure 20:
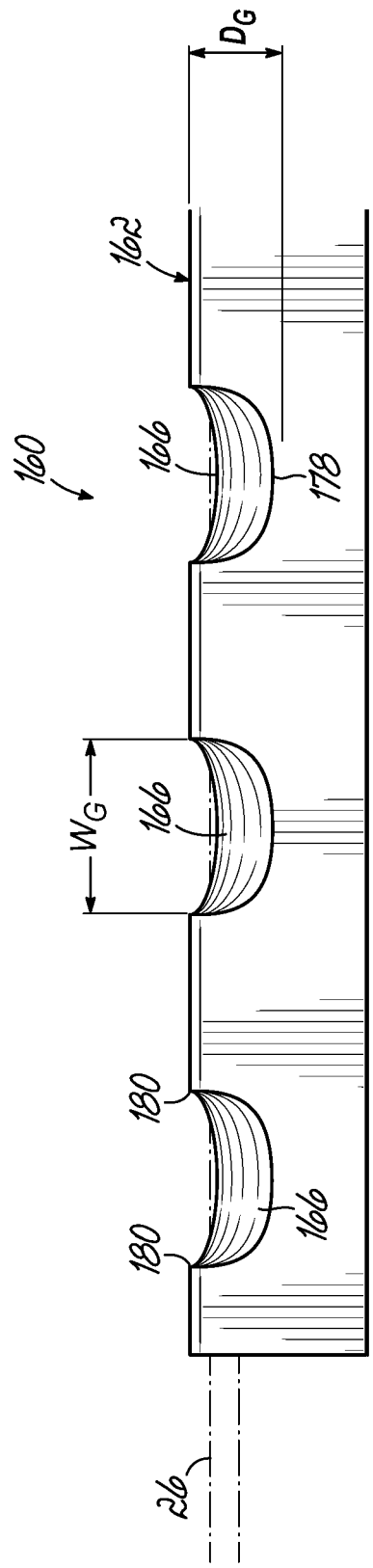
FIG. 20 is a front view of the transition guide of FIG. 19, illustrating a transition ramp according to an embodiment of the invention.

Turning with reference to FIGS. 19 and 20, an exemplary section of either transition ramp portion 162 of the transition guide 160 is shown in detail. As shown, each ball guide 166 has a depth $D_G$ which is a distance between an upper surface 176 of the transition guide 160 and a base 178 of the ball guide 166. As shown in FIG. 19, the depth $D_G$ of each ball guide 166 gradually increases from the first end 168 to the second end 170 of the transition ramp portion 162. Each ball guide 166 also includes a width $W_G$ which is a distance between side edges 180 of the guides 166. The width $W_G$ of each guide may also increase, or decrease or remain constant from the first end 168 to the second end 170 of the transition guide 160. To this end, each guide 166 acts as a control surface for the chain 12 as the balls 42 engage with and move along corresponding guides 166. Further, as each ball 42 is progressed from the first end 168 to the second end 170 of the transition guide 160 via movement of the chain 12 by the drive element 20, more of the ball 42 is cradled by the U-shaped control surface of the corresponding guide 166. By first controlling the link 40 of the ball chain 12, prior to contacting the balls 42 of the ball chain 12, the transition guide 160, eliminates any possible "teetering" of the link 40 of the ball chain 12 as the ball chain 12 is transitioned from the diverter belt 26 to the drive element 20. The transition guide system may be made of various materials such as, ultra high molecular weight polyethylene (UHMW), delrin, phenolic sheet, wood, or other suitable materials which offer low friction characteristics against the diverter belt 26, links 40 of the ball chain 12. Of particular importance to proper performance of the transition guide 160 is the ability for the material to dissipate any electrostatic build-up on the surface of the transition guide 160, diverter belt 26, and ball chain 12. For example a suitable material for the transition guide 160 might be a static dissipative ultra high molecular weight polyethylene, commonly referred to in the industry as "SD-UHMW". Ground straps 185 (see FIG. 19) or wires may be utilized between the transition guide 160, and the frame structure 50.

Figure 21:
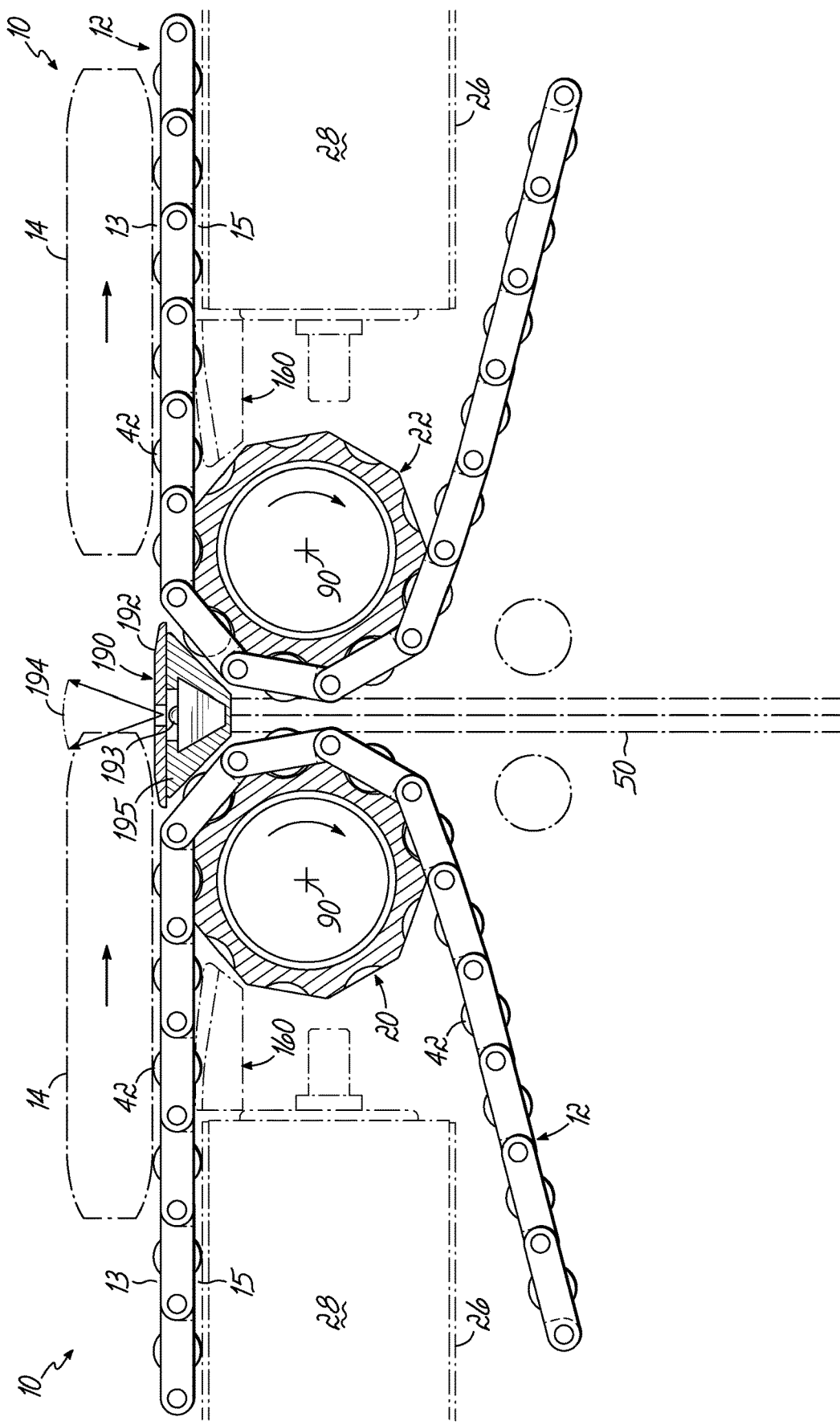
FIG. 21 is a side cross-sectional view of a plurality of conveyor modules in an end-to-end arrangement having a photo-eye according to an embodiment of the invention.

FIG. 21 illustrates one embodiment that may be implemented in accordance with aspects of the invention. As shown, two modules 10 according to any one of the embodiments disclosed herein are illustrated stacked together in an end-to-end configuration as part of a chain of modules 10 for a conveyor system configured to move and/or divert items 14 therealong in accordance with the invention. More particularly, a photo-eye 190 is positioned between the modules 10 and includes a transfer surface 192 that spans a distance between the two modules 10 and is aligned with the item-bearing sides 13 of the modules 10. The photo-eye 190 may be supported by the frame 50 of one of the modules 10 or independently supported. In either case, the photo-eye 190 is positioned between the two modules 10 at what might be considered a "pinch point." Thus, in addition to operating as a photo-eye, the transfer surface 192 of the photo-eye 190 also blocks a known "pinch point" and acts as a safety prevention mechanism.

The photo-eye 190 may be any type of photoelectric sensor, such as a diffuse or through-beam sensor that is configured to emit a beam of light that is used to detect the presence or absence of items, equipment, or changes in surface conditions. In this regard, the photo-eye 190 is configured to detect, in a detectable range 194 between the modules 10, the presence or absence, or specific location and/or orientation of item 14, for example. The photo-eye 190 may include one or more light transmitting elements 193 mounted in a housing 195. The housing 195 is configured to span the width of the belt 26 to completely cover the space between the two modules 10. The photo-eye 190 may be used to track the following: item location and/or alignment on the modules 10, item 14 count, and item 14 movement speed, among other processing and efficiency parameters. To this end, the photo-eye 190 may be electrically coupled to a controller (not shown) programmed to track and make determinations based on inputs received from the photo-eye 190. For example, the one or more modules 10 in the chain may also be electrically coupled to the controller which is programmed to vary operational parameters of the one or more modules 10 based on inputs received from the photo-eye 190.

Figure 22:
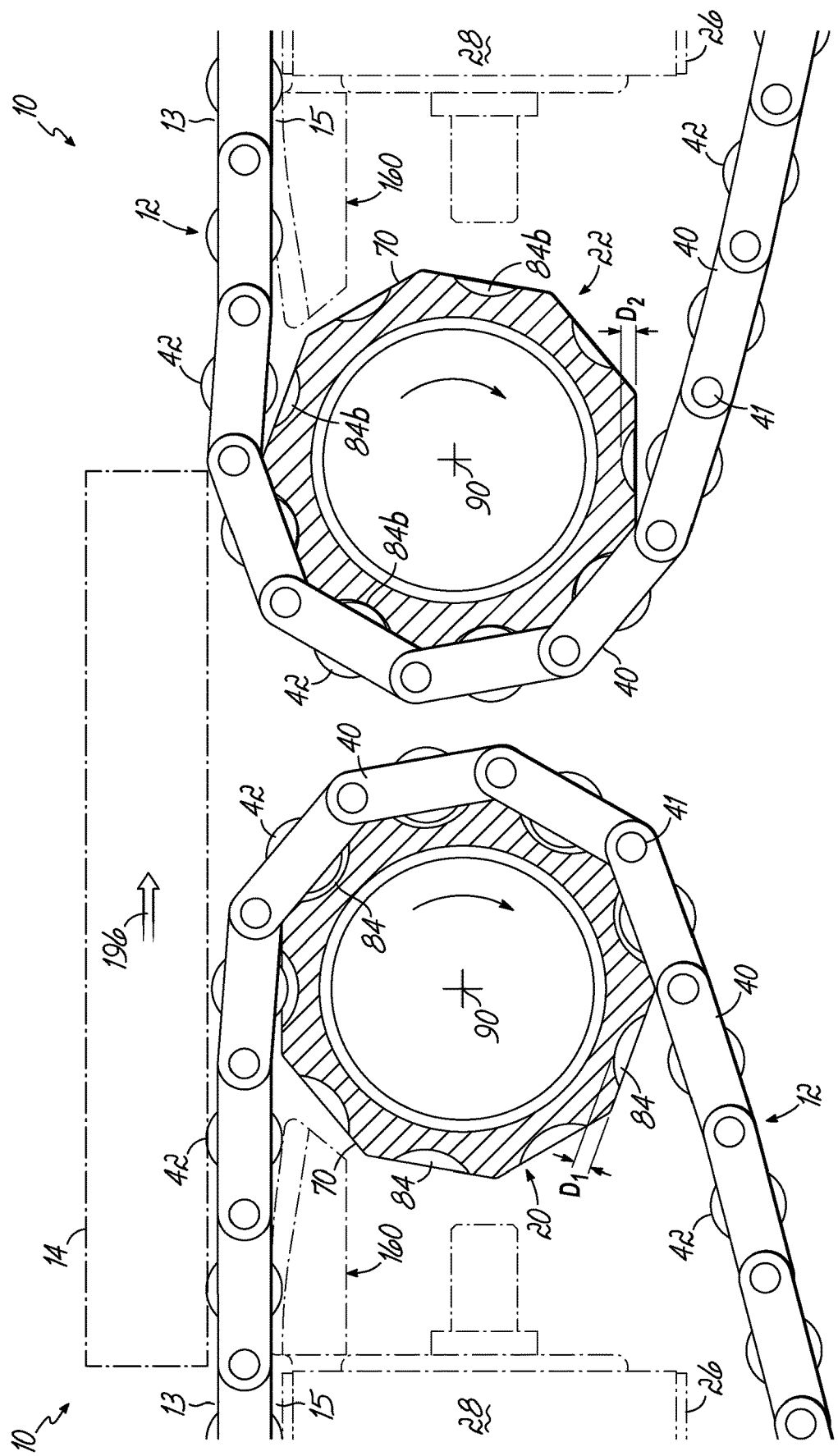
FIG. 22 is a side cross-sectional view of a plurality of conveyor modules in an end-to-end arrangement having an alternative chain drive element and idler element configuration according to an embodiment of the invention.

In accordance with another embodiment of the invention, shown in FIG. 22, relief elements 84*b* on the idler element 22 are shallower in depth compared to the depth of the relief elements 84 on the driver element 20. While FIG. 22 illustrates two modules 10 stacked end-to-end, it is understood that each module 10 may include relief elements 84*b* on the idler element 22 that are shallower in depth compared to the depth of the relief elements 84 on the driver element 20. As shown, the relief elements 84 on the drive element 20 are configured to have a depth $D_1$ and the relief elements 84*b* on the idler element 22 are configured to have a depth $D_2$, where $D_1 > D_2$. More particularly, $D_1$ is dimensioned in depth to provide some clearance between the relief elements 84 and the corresponding ball 42 positioned therein to allow the ball to rotate in the relief element, while $D_2$ is sized such that the relief elements 84*a* provide some contact with some portion of the surface of the corresponding ball 42 positioned therein for hindering the ball from rotating in the relief element. Thus, when two modules 10 are positioned in a stacked arrangement, as shown, the balls 42 on the ball chain 12 moving over the drive element 20 remain freely movable within respective relief elements 84 of the drive element 20 as corresponding links 40 of the chain 12 engage with facets 70 on the drive element 20 to rotate the chain 12 thereabout. The movability of the balls 42 within the relief elements 84 when the chain 12 is engaged with the drive element 20 allows the balls 42 to continue to rotate on the drive element 20 such that an item 14 moving in the direction of arrow 196 does not get stopped, or impeded, as a result of the rotational movement of the balls 42 getting stopped or slowed when entering onto the drive element 20. Rather, by allowing clearance between the balls 42 of the chain 12 and the relief elements 84, the balls 42 can maintain momentum as they leave the diverter belt 26 and approach and engage with the drive element 20. This configuration facilitates improved transfer of the item 14 from the first module 10 to the second module 10 by way of eliminating dead areas of motion.

The idler elements 22 of the modules 10 in this embodiment include shallower relief elements 84*b* compared to those of the drive elements 20, as set forth above. In that regard, as shown in FIG. 22, the geometry of the relief elements 84*b* on the idler element 22 is configured such that the relief elements 84*b* engage some portion of the surfaces of the balls 42 as the chain 12 is fed onto the idler element 22. The engagement between the relief elements 84*b* and corresponding balls 42 prohibits movement of the balls 42, particularly while the links 40 of the chain 12 are engaged with the facets 70 on the idler element 20 as the chain 12 is rotated thereabout. This "locking" of the balls 42 to the idler element 22 prevents the balls 42 from rotating backwards when the item 14 transitions between modules, and provides additional drive to (on an uptake of item 14) as the chain 12 engages with an underside of the item 14 to move the item 14 from the first module 10 to the second module 10, as shown. The "locking" or "brake" effect on the balls 42 caused by the relief elements 84*b* facilitates improved movement of the item 14 from the first module 10 to the second module 10 to thereby keep the item 14 moving in the direction of travel of arrow 196.

Figure 22A:
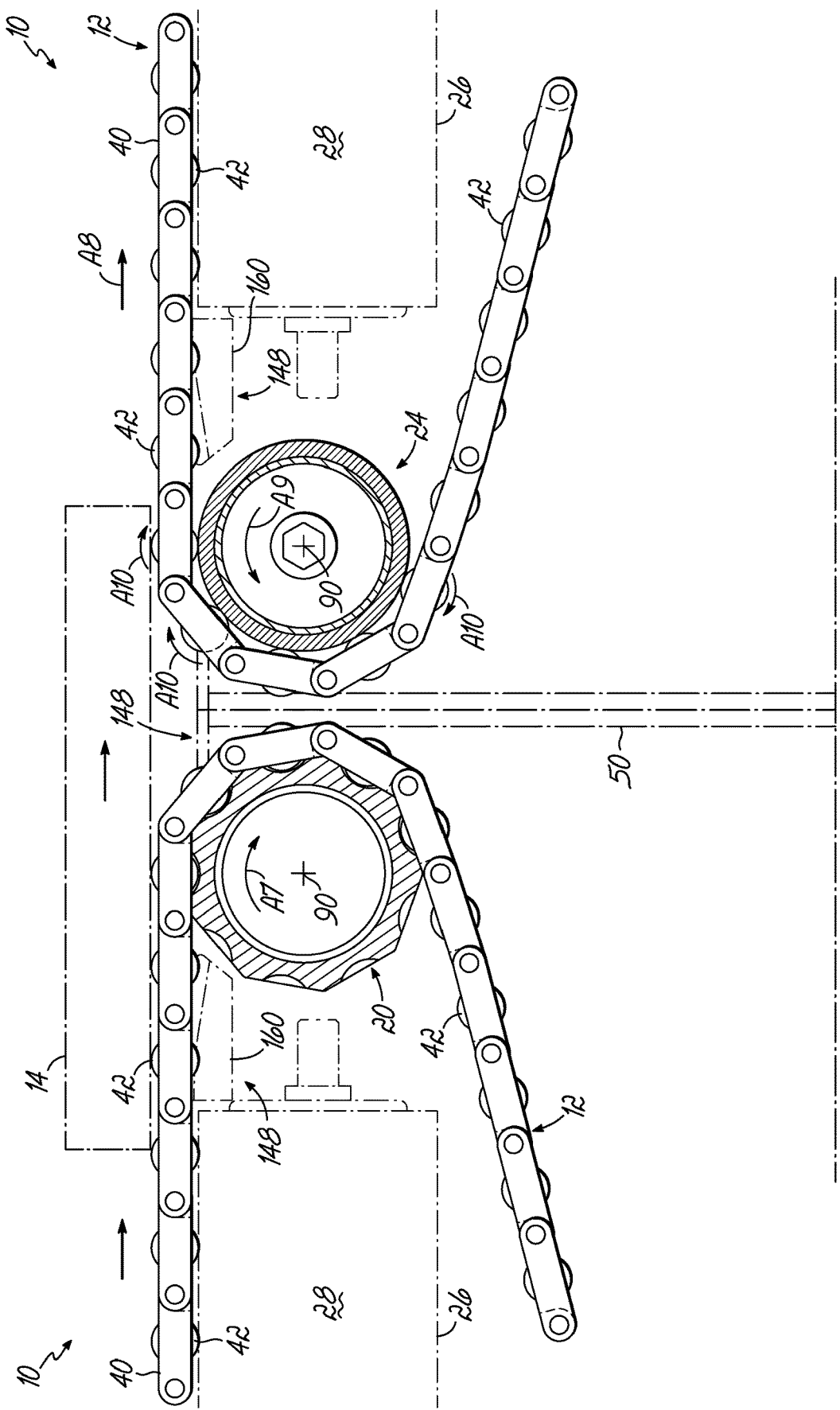
FIG. 22A is a side cross-sectional view of a plurality of conveyor modules in an end-to-end arrangement having an alternative idler element configuration in the form of a roller according to an embodiment of the invention.

In accordance with another embodiment of the invention, shown in FIGS. 22A-22D, the module 10 may include a drive element 20 at one end and a moving or driven roller 24 instead of an idler element 22, to assist in the transition of items between modules. As discussed herein, the moving roller at the front end or intake end of the module, acts on balls 42 immediately before the diverter belts of the module and start their movement in order to grab items immediately at the intake end of the module. In that regard, for each module 10, the ball chain 12 loops in a continuous loop over the drive element 20 and over the driven roller 24. The drive element 20 positioned at the discharge end of the module is configured to rotate in a first direction A7 to act on the ball chain 12 and drive movement of the ball chain 12 at to move the chain 12 on the module for conveying. The ball chain 12 also moves over the roller 24 at the other end or intake end of the module 10. In that way, the module 10 operates in a defined conveying direction, as indicated by directional arrows A8. In that process, the ball chain moves over one or more surfaces, such as diverter belts, to impart movement to the balls and accelerate the speed of the item on the module. However, when the balls of the chain are returning back to the intake end, they are not engaged by a diverter belt surface or other surface and thus are not generally moving. As illustrated in FIG. 17, for example, the balls will not start being driven to move again until they circle around the intake end and engage a guide 166 or the diverter belt(s) 26. This thus creates a slack area or "no-drive" zone of the ball chain at the intake end of the module, just as it is receiving an item from another module. Conversely, the balls 42 in the ball chain of the preceding module as shown in FIG. 22A, that are not engaging a diverter belt surface and are engaging the drive element 20, will also not be moving significantly, which adds to the slack area that an item encounters in the transition.

To address that issue, an alternative embodiment of the invention as shown in FIGS. 22A-22D, and described in further detail below, uses a driven or moving roller 24 that is configured to rotate in a direction A9 opposite to the direction in which the drive element 20 rotates. The driven roller of the downstream module and ball chain is configured to engage the balls 42 of the ball chain 12 at the front end of the module before the chain passes over the diverter belt 26 or other surface of that module. The oppositely driven or upstream driven moving roller, in turn, acts to thereby rotate the balls 42 in the downstream or conveying direction A8 of the module 10, as indicated by directional arrows A10, similar to the way in which the balls 42 are driven when engaging the diverter belt in the module. The downstream direction is the same way that the ball chain is driven as discussed herein. The balls of the chain are "pre-rolled" immediately at the intake end of the module to reduce any "no-drive" zone and to grab and start moving or conveying an item downstream immediately as it transitions from an upstream module as shown in FIG. 22A. Rotational movement of the balls 42 drives movement of the item 14 in the conveying direction A8, as will be described in further detail below.

In an alternative embodiment, the roller 24 may be a stationary or fixed roller or element having a high-friction outer surface to achieve a similar effect. In that regard, as the ball chain 12 is moved over the outer surface of the fixed roller, the balls 42 are caused to rotate in the conveying direction A8 of the module 10 at a similar velocity compared to when the ball chain 12 moves directly over the high friction belt surface of the diverter belt 26, for example.

Figure 22B:
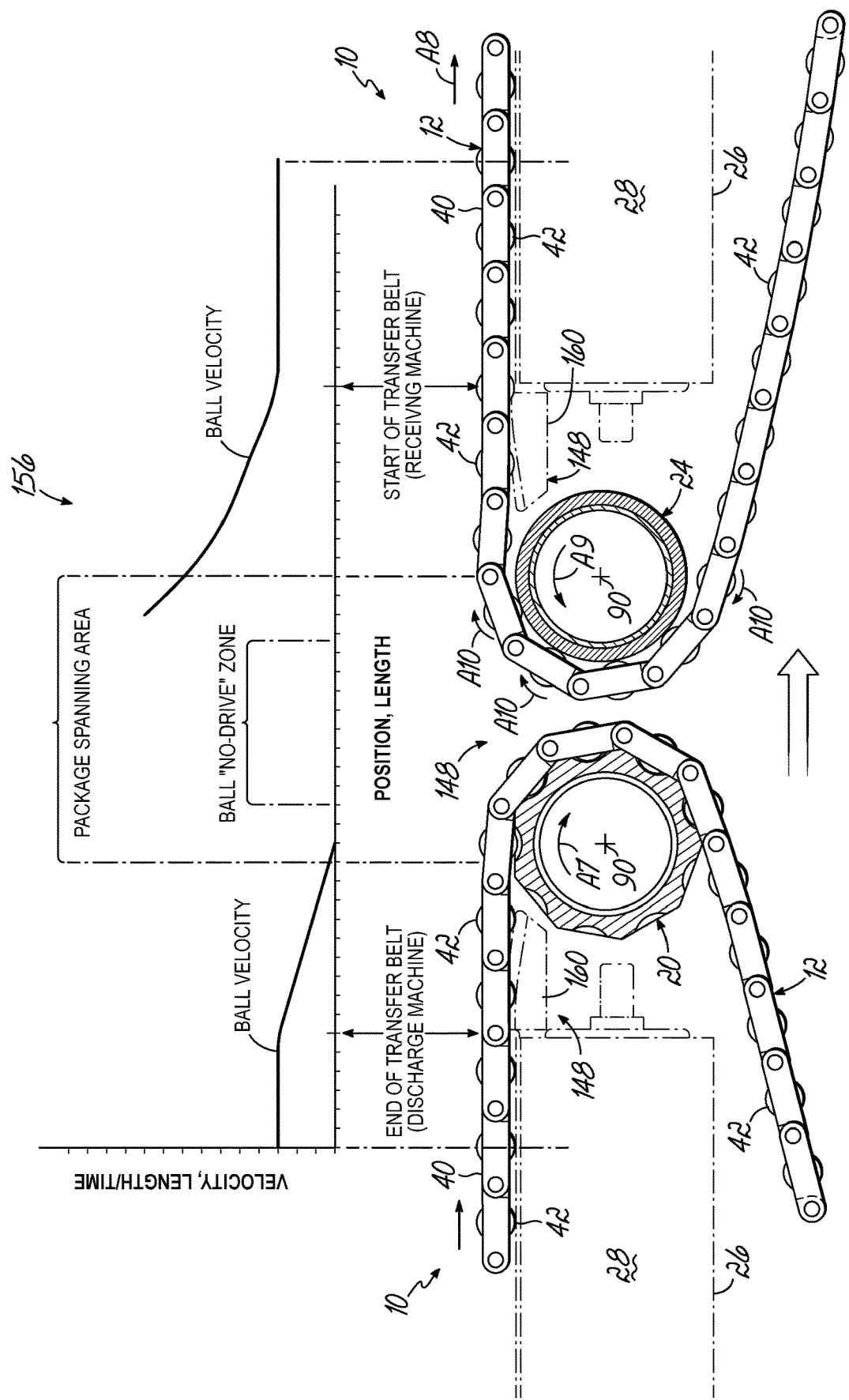
FIG. 22B is a view similar to FIG. 22A, illustrating a ball velocity of each conveyor module conveyor chain.

As shown in FIGS. 22A-22B, two modules 10 are illustrated stacked together in an end-to-end configuration as part of a chain of modules 10 for a conveyor system that is configured to move and/or divert items 14 therealong in a conveying direction A8. Each module 10 includes a driven element 20 at one end of the module and a roller 24 at the opposite end of the module 10. When stacked together in an end-to-end configuration, as shown, the roller 24 of one module 10 is located adjacent to the driven element 20 of another module 10. Generally speaking, the forward velocity of the item 14 is comprised of the forward velocity of the ball chain 12 and the velocity from the rotational effects of the rotation of the various balls 42 within the ball chain 12. Generally, rotation of each ball 42 within the ball chain 12 is a result of movement of the ball chain 12 over the high-friction surface of the diverter belt 26 or some other surface. To this end, as the ball chain 12 moves in the conveying direction A8, the balls 42 are caused to also rotate in the conveying direction A8. Thus, the total velocity of the item 14 is made up of approximately 50% contribution from the forward velocity of the ball chain 12 and 50% of the rotation effects of the ball 42 within the ball chain 12. In cases where it is not possible to have balls 42 of the ball chain 12 rotating, the item 14 velocity can be effectively reduced by 50%. This can become problematic as small items 14 are transitioning between modules 10 which are stacked back to back, or when another piece of equipment such as a transportation conveyor 44 (e.g., FIG. 4A) is feeding or taking product away from a module 10.

As shown in FIGS. 22A-22B, gaps 148 are present at transitions between modules 10, or between modules 10 and other pieces of equipment. The gaps 148 affect the velocity of an item 14 as it passes over the gaps 148 between modules 10. For example, while the transition guide 160 at the discharge end of the first module 10 and the ball pocket geometry 84 of the drive element 20 allow for the balls 42 of the ball chain 12 to free wheel and remain in rotation as they leave the surface of the diverter belt 26, ball 42 velocity (and thus item 14 velocity) decreases significantly once the ball chain 12 leaves the surface of the diverter belt 26. To this end, full ball 42 rotation is not achieved until the balls 42 of the ball chain 12 are again directly over the high friction belt surface of the diverter belt 26, or another stationary high friction surface, for example, of the downstream module. To make up for the velocity loss of the balls 42 and thus the item 14 as it travels over the drive element 20 and across the gaps 148, it is desirable to initiate the forward motion of the balls 42 of the ball chain 12 (i.e., ball velocity) as soon as possible, such as in the area where the item 14 is received onto the downstream receiving module 10.

Referring to FIG. 22B a graph is illustrated above the transition areas between the modules. As the belt of the upstream discharge module leaves the diverter belt, the velocity of the balls decreases and the item will enter a package spanning area where the ball velocity has effectively gone to zero. This is illustrated in the ball "no-drive" zone. That zone would effectively extend until the ball chain then either starts to engage the transition guide 160 or engages the diverter belt or other surface of the downstream or receiving module. However, as shown, the invention and moving roller 24 begins ball velocity much earlier in the transition. In fact, in accordance with one feature of the invention, depending on the drive velocity of the moving roller 24, the ball velocity might be immediately increased from zero to some velocity that even exceeds the steady state ball velocity on the module, which is determined by the conveying speed. That is, drive element 20 might be driven or rotated at a first velocity or conveying velocity to move the chain at that velocity. This would then generally result in the rotation of the balls over a diverter belt or other surface of the module at that similar conveying velocity to create the steady state ball velocity of the moving ball chain. The driven roller would then be driven at a second velocity that is higher than the first or conveying velocity. This would drive the balls at that front end of the chain at a higher velocity than the balls further along the chain in the module. This initial increase in velocity of the balls of the chain is shown in FIG. 22B at the beginning or front end of the downstream or receiving module. In that way, the item in the transition is essentially "grabbed" off of the upstream module by the balls and driven roller of the downstream or receiving module and propelled onto the downstream module to effectuate a smooth transition between modules. Once the item proceeds past the driven roller to the diverter belt region of the module, it will then encounter balls rotating generally at the conveying velocity.

In the scenario wherein the roller 24 is not moving or driven, it will act as a friction surface so that the balls will begin moving when the ball chain encounters the roller 24. In such a scenario with a stationary roller, the velocity of the balls will be similar to the velocity that is created when the balls of the chain engage a diverter belt or other surface, for example.

Referring now to FIGS. 22C-22D, details of the roller 24 are shown in accordance with one embodiment of the invention. The roller 24 may be a motor driven roller (MDR), having an external drive or internal drive, and includes an elongated body 150 that is configured to rotate about its longitudinal axis 152 and an outer drive surface 154 for engaging the balls 42 of the ball chain 12. The body of the roller 24 is cylindrical in shape with an outer drive surface 154 being smoothly curved. To improve engagement between the roller 24 and the balls 42 of the ball chain 12, the outer drive surface 154 may comprise an elastomeric coating such as, for example, urethane thermoplastic rubber, nylon, ethylene propylene diene monomer rubber (EPDM), or other suitable friction material for driving rotation of the balls 42 of the ball chain 12 when the roller rotates. To this end, the outer drive surface 154 may have a wide range of material properties or durometers to create a high friction surface.

As shown, the roller 24 supports the ball chain 12 by only engaging the balls 42. The roller 24 is not generally in direct contact with the links 40 of the ball chain 12. Since the balls 42 of the ball chain 12 are free to rotate within the links 40 of the ball chain 12, it is possible to rotate the roller 24 in a "backwards" or upstream direction A9 from the downstream or conveying (i.e., forward) direction A8 of the ball chain 12 (FIG. 22A). In this way, the balls 42 of the ball chain 12 are effectively driven in a conveying or downstream direction A10 which is the conveying direction A8 of the ball chain, such that on the receiving end of the module 10, the item 14 is presented with balls 42 which are being driven as soon as the item 14 comes into contact with the chain 12 at the receiving end of the module 10.

Again referring again to FIGS. 22A-22B, operation of the roller 24 of the receiving module 10 increases the speed of the balls 42 of the ball chain 12 such that the balls 42 of the ball chain 12 can be driving or rotating at a heightened velocity before the item 14 comes into contact with the balls 42 of the ball chain 12. Further, speed adjustment of the roller 24 provides the ability to accelerate or overdrive the ball speed such that the balls 42 of the ball chain 12 have a heightened ball 42 velocity as related to the standard ball 42 velocity present when the ball chain 12 is pulled across a high friction surface. The balls 42 have forward rotational momentum until the balls 42 reach the transition guide 160 and can be driven by way of the relative motion of the ball chain 12 over the diverter belt 26 or other surface. Since the balls 42 of the ball chain 12 are traditionally made of a lightweight polymer material, they do not have significant inertia once rolling. Since there is a gap 148 between the point at which the item 14 touches the ball 42 of the ball chain 12 and the high friction surface of the transfer belt 26 of the module 10, it is beneficial for the balls 42 to be given a high starting velocity at the point at which the item 14 touches the balls 42 of the ball chain 12. By rotating the roller 24 at the receiving end of the module 10 in a reverse direction A9, the balls 42 of the ball chain 12 can be given a significant velocity such that they can maintain a forward driving motion of the item 14 to "carry" this velocity over the gap 148 until the balls 42 of the ball chain 12 are presented to the high friction diverter belt 26 of the module 10. Providing the balls 42 of the ball chain 12 at the receiving end of the module 10 with a higher initial ball 42 velocity allows for the balls 42 to continue in a forward motion to cover for any inertial decay of the velocity of the balls 42 an item is carried to the deck of the downstream module 10. To this end, the speed of the roller 24 may be adjustable independently of the speed of the drive element 20, or may be tied to the speed of the drive element 20 by way of a controls algorithm. Alternately, the speed of the roller 24 may be adjusted "on the fly" depending on the running parameters of the module 10 or system and the types and size and weight of items 14 being conveyed. The roller 24 may be run simultaneously with the drive element 20, or may be run on a different timing methodology required by the application of the module 10.

Referring now to FIGS. 22E-22F, details of a roller 80 are shown in accordance with another embodiment of the invention. Like the roller 24 described above with respect to FIGS. 22A-22D, the roller 80 may be a motor driven roller and may comprise an external drive or internal drive as is present with a traditional motorized roller. However, in an alternative embodiment, the roller 80 may instead be a stationary or static roller. In either case, the roller 80 includes an elongated body 82, that may be configured to rotate (if a moving roller) about its longitudinal axis 86. The roller includes an outer surface 88 formed of a moderate to high friction elastomeric coating such as, for example, urethane thermoplastic rubber, nylon, ethylene propylene diene monomer rubber (EPDM), or other suitable material for driving rotation of the balls 42 of the ball chain 12. The body 82 of the roller 80 is generally cylindrical in shape and includes a plurality of circumferentially extending grooves 94 for engaging and driving rotation of the balls 42 of the ball chain 12. To this end, the outer surface 88 and surfaces of the grooves 94 may comprise the same elastomeric coating.

With continued reference to FIGS. 22E-22F, the circumferential grooves 94 are spaced apart along a width of the roller 80 in an arrangement that is generally consistent with the spacing of the rows of balls 42 along the width of the ball chain 12. Because the ball chain 12 travels in a direction essentially perpendicular to the longitudinal axis 86 of the roller 80, the length of the body 82 will be referred to herein as its "width" in relation to the width of the chain 12. In any event, each circumferential groove 94 is annular in shape and extends about the body 82 of the roller 80 in a direction that is generally perpendicular to the longitudinal axis 86. As shown in FIG. 22E, each groove 94 is configured to receive corresponding ball 42 of a respective row of balls 42 of the ball chain 12. In that regard, each groove 94 defines a curved or u-shaped surface that generally corresponds to the curved outer surface of a ball 42 of the ball chain 12.

As shown in FIG. 22F, the roller 80 is configured to support the ball chain 12 by only engaging the balls 42. In particular, the balls 42 of the ball chain 12 are received in respective grooves 94 of the roller 80 such that the body 82 of the roller 80 is not in direct contact with the links 40 of the ball chain 12. Rather, the only contact between the ball chain 12 and the roller 80 is between the grooves 94 and the balls 42 of the ball chain 12. For example, the grooves 94 may be sized to receive a portion of each ball 42 therein, such as a portion consisting of approximately 15% (or less) of the diameter each ball 42, for example. The U-shaped configuration of the grooves 94 provides a cradle and thus more surface area contact between surfaces of the roller 80 and the balls 42 for driving rotation of the balls 42 in the conveying direction A8 of the module, as described above.

Referring now to FIGS. 22G-22H, details of a roller 96 are shown in accordance with another embodiment of the invention. Like the roller 80 described above with respect to FIGS. 22E-22F, the roller 96 may be a motor driven roller and may comprise an external drive or internal drive as is present with a traditional motorized roller. However, in an alternative embodiment, the roller 96 may instead be a stationary or static roller. In either case, the roller 96 includes an elongated body 98, that may be configured to rotate about its longitudinal axis 106 (if a moving roller). The roller includes an outer surface 108 formed of a low friction coating. The body 106 of the roller 96 is generally cylindrical in shape and includes a plurality of circumferentially extending grooves 116 for engaging and driving rotation of the balls 42 of the ball chain 12. In that regard, surfaces of the grooves 94 include a high friction elastomeric coating such as, for example, urethane thermoplastic rubber, nylon, ethylene propylene diene monomer rubber (EPDM), or other suitable material for driving rotation of the balls 42 of the ball chain 12.

With continued reference to FIGS. 22G-22H, the circumferential grooves 116 are spaced apart along a width of the roller 96 in an arrangement that is generally consistent with the spacing of the rows of balls 42 along the width of the ball chain 12. Each circumferential groove 116 is annular in shape and extends about the body 98 of the roller 96 in a direction that is generally perpendicular to the longitudinal axis 106. As shown in FIG. 22G, each groove 116 is configured to receive corresponding balls 42 of a respective row of balls 42 of the ball chain 12. In that regard, each groove 116 defines a curved or u-shaped surface that generally corresponds to the curved outer surface of a ball 42 of the ball chain 12.

As shown in FIG. 22H, the roller 96 is configured to support the ball chain 12 by engaging both the balls 42 and the chain links 40. In particular, the balls 42 of the ball chain 12 are received in respective grooves 94 of the roller 96 such that a portion of each chain link 40 is placed in engagement with the body 98 of the roller 96. In that regard, the grooves 94 may be sized to receive a portion of each ball 42 therein, such as a portion consisting of approximately 22% (or less) of the diameter each ball 42, for example. The U-shaped configuration of the grooves 94 provides a cradle to receive the balls 42 yet allows for some contact between the links 40 and the low-friction outer surface 108 of the roller 96. To this end, the low-friction outer surface 108 of the roller 96 allows the roller 96 to rotatably engage the ball chain 12 with minimal resistance to thereby drive rotation of the balls 42 in the conveying direction A8 of the module, as described above.

Returning with reference to FIGS. 16-18, the diverter belt 26 may include a rib or guide 200 positioned on an inner surface 202 of the belt 26, at a location on the belt, such as a centered location. The rib 200 extends continually about an entire length of the inner surface 202 of the diverter belt 26. The rib 200 is configured to be received within a correspondingly shaped groove 204 formed in the drive rollers 28, 30 at a location to align with the rib, such as a center location. As shown in the illustrated embodiment, grooves 204 are centrally located on the drive and idler rollers 28, 30 and are generally U-shaped to receive the rib 200 therein. The rib 200 in conjunction with the grooves 204 in the drive rollers 28, 30 works to keep the diverter belt 26 tracked and properly and centrally positioned on the drive and idler rollers 28, 30. This prevents any drift of the diverter belt 26 to any one side caused by the continual side loading placed on the diverter belt 26 by the ball chain 12, as it moves in the direction of arrows 172. The rib 200 in one embodiment may be integrally formed with the inner surface 202 of the diverter belt 26 and be made of the same material used to form inner surface 202 of the diverter belt 26, for example.

Figure 23:
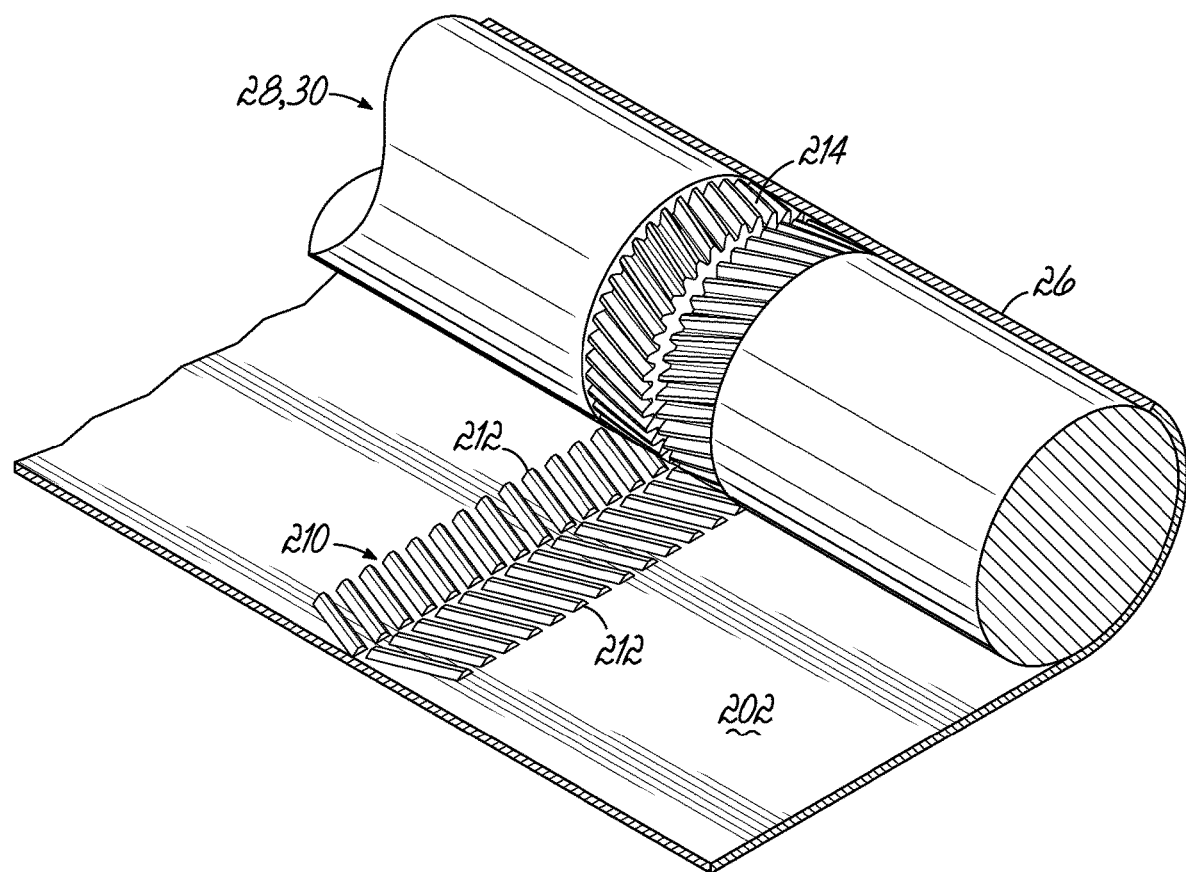
FIG. 23 is a partial cross-sectional perspective view of a diverter belt and drive roller configuration according to an embodiment of the invention.

In another embodiment, shown in FIG. 23, the rib 200 may be replaced with a herringbone tracking guide 210. Similar to the rib 200, the herringbone tracking guide 210 is also located on the inner surface 202 of the diverter belt 26 at an appropriate location, such as an approximately central location. The tracking guide 210 is configured to extend continually along an entire length of the inner surface 202 of the diverter belt 26. As shown, the herringbone tracking guide 210 includes two parallel rows of elongate protrusions 212. More particularly, the elongate protrusions 212 of each row are angled to create the herringbone pattern, with one row of protrusions 212 being offset from the other. The herringbone tracking guide 210 is configured to interact or align with a correspondingly shaped herringbone drive groove 214 formed in the drive and idler rollers 28, 30. As shown, the drive grooves 214 may be located on the drive and idler rollers 28, 30 and include a teethed herringbone pattern extending circumferentially around the rollers 28, 30 to receive the herringbone tracking guide 210 therein. Alternately, the herringbone tracking guide 210 may be positioned towards either edge of the diverter belt 26 along the inner surface 202 of diverter belt 26. The herringbone tracking guide 210 in conjunction with the drive grooves 214 in the drive and idler rollers 28, 30 not only maintains central positioning of the diverter belt 26 on the drive and idler rollers 28, 30, but also functions to allow driving the diverter belt 26 with significantly more power as compared to the friction driven configurations of previous embodiments. Moreover, the herringbone tracking guide 210 serves to create a fully synchronous coupling to the drive and idler rollers 28, 30 to allow for greater positional control over the diverter belt 26. The herringbone drive groove, 214 may be made of the same material as the drive and idler rollers 28, 30 or may be made from a different material than the rollers. The herringbone drive groove may also be configured onto a sleeve which may be attached to the drive and idler rollers by way of; fasteners, welding, adhesives, or other suitable method(s). To this end, the herringbone tracking guide 210 may be integrally formed with the inner surface 202 of the diverter belt 26 and be made from coated urethane, plastic, or metal, for example.

Figure 24:
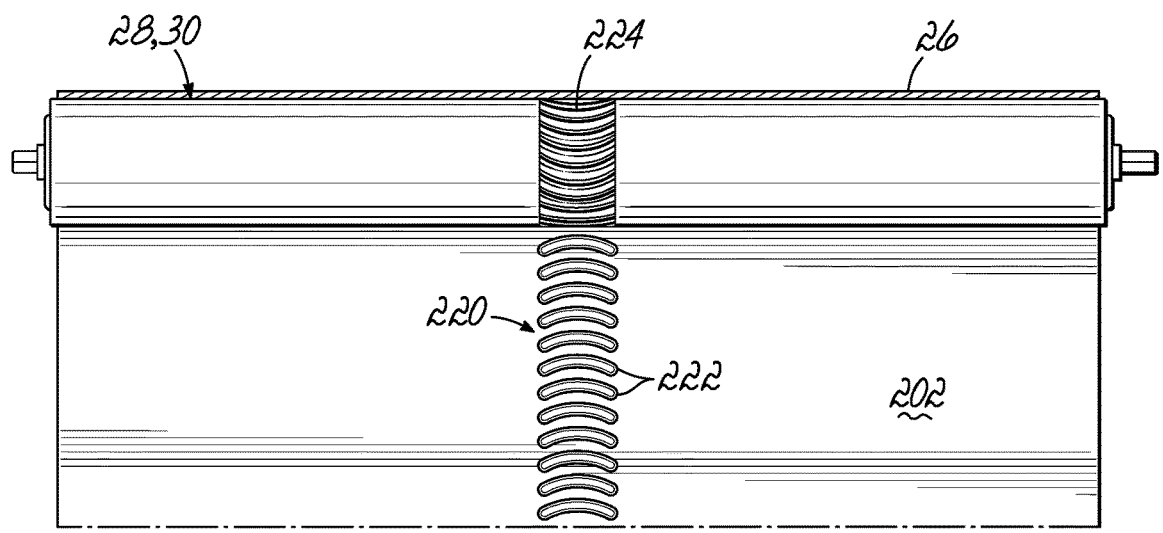
FIG. 24 is a plan view of an alternative diverter belt and drive roller configuration according to an embodiment of the invention.

In another embodiment, shown in FIG. 24, the rib 200 may be replaced with a curved tracking guide 220. Similar to the rib 200, the curved tracking guide 220 is also located on the inner surface 202 of the diverter belt 26 at an approximately central location, and configured to extend continually about an entire length of the inner surface 202 of the diverter belt 26. Alternately, the curved tracking guide 220 may be positioned towards either edge of the diverter belt 26 along the inner surface 202 of diverter belt 26. As shown, the curved tracking guide 220 includes one row of curved protrusions or teeth 222, which may be generally half-mooned in shape. The curved tracking guide 220 is configured to interact or align with a correspondingly shaped curved drive groove 224 formed in the drive and idler rollers 28, 30. As shown, the drive grooves 214 may be centrally located on the drive and idler rollers 28, 30 and include a curved teeth pattern extending circumferentially around the roller 28, 30 to receive the curved tracking guide 220 therein as the diverter belt 26 moves over the drive or idler elements 28, 30. The curved tracking guide 220 in conjunction with the drive grooves 224 in the drive and idler rollers 28, 30 not only maintains central positioning of the diverter belt 26, but also functions to allow driving the diverter belt 26 with significantly more power as compared to the friction driven configuration of previous embodiments. Moreover, the curved tracking guide 222 serves to create a fully synchronous coupling to the drive and idler rollers 28, 30 to allow for greater positional control over the diverter belt 26. The curved drive groove, 224 may be made of the same material as the drive and idler rollers 28, 30 or may be made from a different material than the rollers. The curved drive groove may also be configured onto a sleeve which may be attached to the drive and idler rollers by way of; fasteners, welding, adhesives, or other suitable method(s). The curved tracking guide 220 may be integrally formed with the inner surface 202 of the diverter belt 26 and be made from coated urethane, plastic, or metal, for example.

Figure 25:
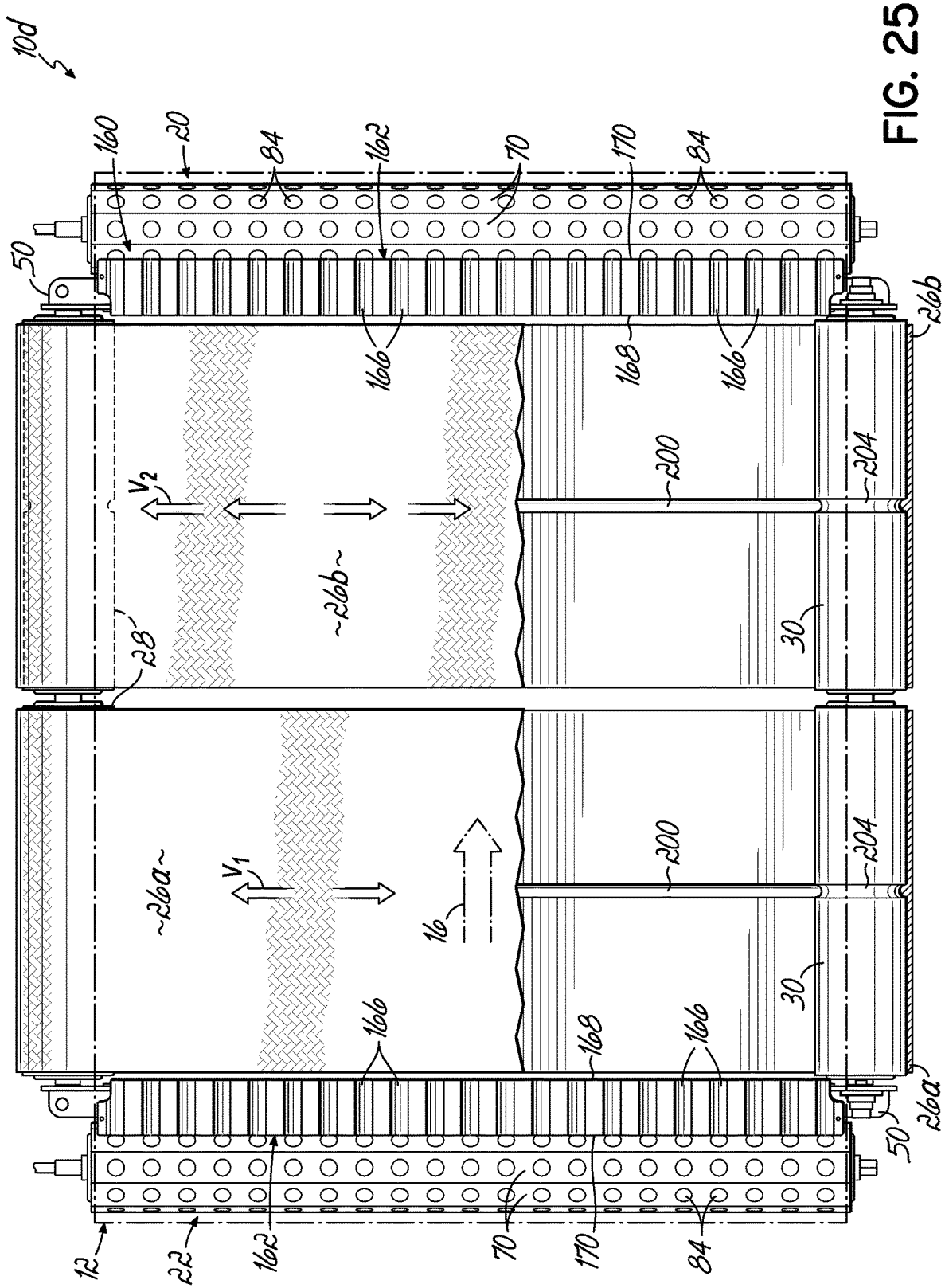
FIG. 25 is a top plan view, in partial section, of a conveyor module using the conveyor chain drive system and a dual speed divert zone according to an embodiment of the invention.
Figure 26:
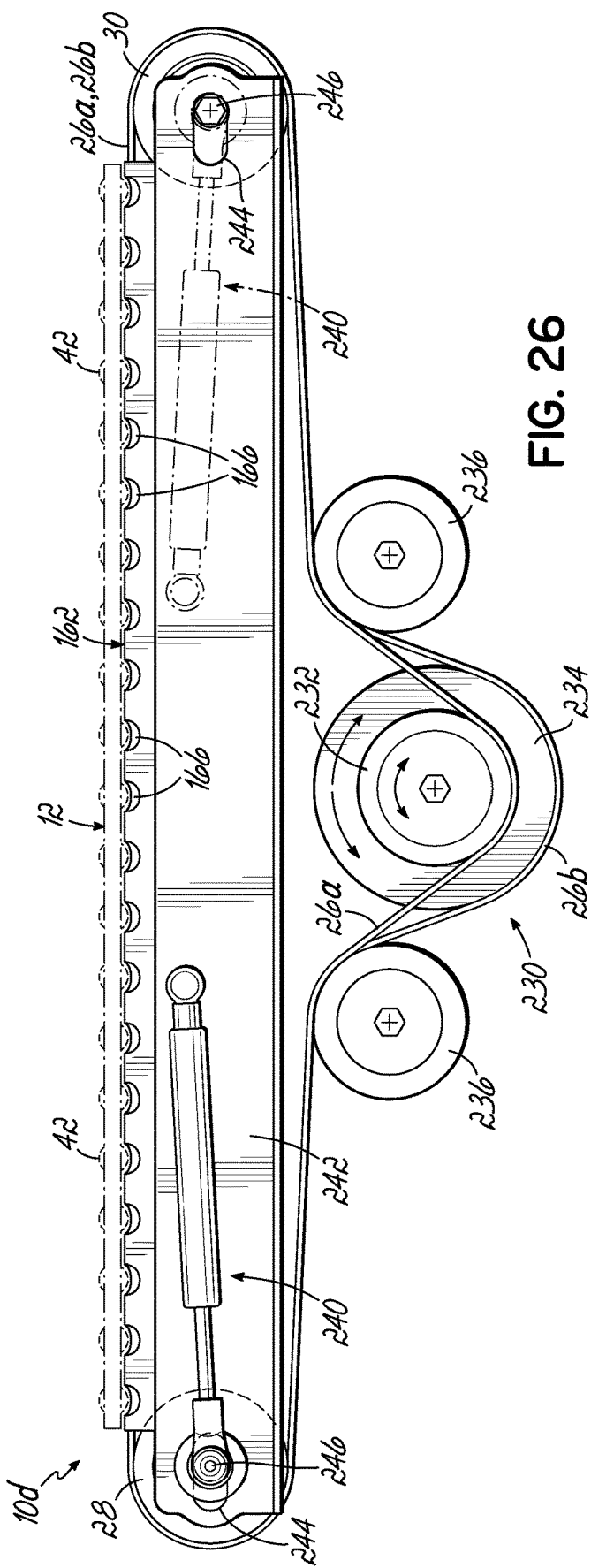
FIG. 26 is a side cross-sectional view of the conveyor module of FIG. 25, illustrating a single drive roller for the dual speed divert zone according to an embodiment of the invention.
Figure 27:
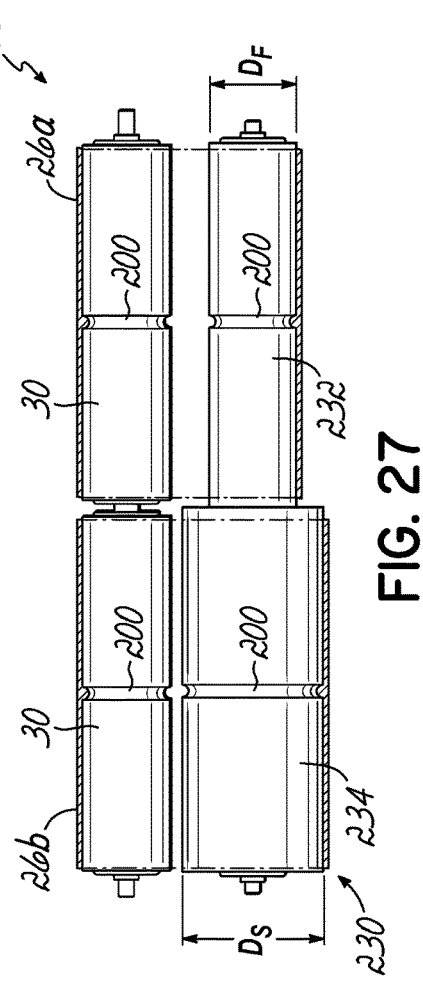
FIG. 27 is a front view, in partial section, of the single drive roller of FIG. 26.
Figure 28:
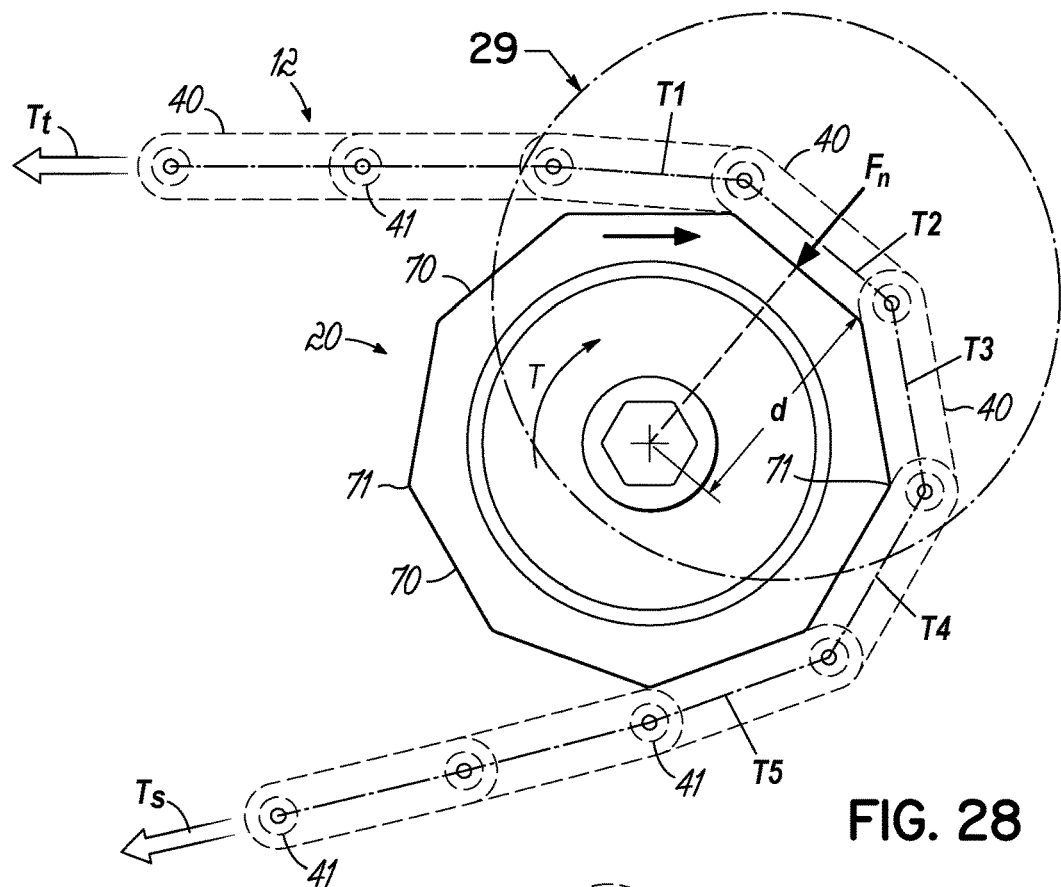
FIGS. 28-29 are side views of a drive element implemented in a conveyor chain drive system of an embodiment of the invention illustrating forces between the chain and roller.

In accordance with another embodiment of the invention, shown in FIGS. 25-27, a module 10d includes a plurality of diverter belts, for example, two diverter belts 26a, 26b which are driven at different speeds. The belts are driven by a single drive roller 230 (shown in FIGS. 26-27) to cause the module 10d to have a dual speed divert zone for an item. While the module 10d shown includes two diverter belts 26a, 26b driven at different speeds, it is within the scope of the invention to include three or more belts driven by a single drive roller at different speeds. As shown in FIG. 27, the drive roller 230 is configured to drive the first diverter belt 26a at a first speed $V_1$ and at the same time drive the second diverter belt 26b at a second speed $V_2$, where $V_2 > V_1$. In this regard, the dual speed diverter belt configuration of the module 10d can be used to steepen a divert angle of an item as it is moved along the module 10d with the ball chain 12. More particularly, the divert angle of the item 14 is shallower as the chain 12 and item move over the first diverter belt 26a which is moving at speed $V_1$. As the chain 12 transitions from the first diverter belt 26a to the second diverter belt 26b, the divert angle of the item 14 is steepened by the higher speed $V_2$ of the second diverter belt 26b acting on the balls 42 of the chain 12. To this end, the item 14 may have a generally parabolic trajectory as it is progressed from the first diverter belt 26a to the second diverter belt 26b via the ball chain 12. This dual speed configuration allows for a two-step transition in the velocity in the divert direction 32 which allows for the change in velocity from no divert speed to full divert speed $V_2$ to be done in an incremental manner to ensure the item 14 has the greatest possibility of transitioning from a divert velocity of 0 to the full velocity of $V_2$ without having to subject the item 14 to a velocity step (i.e. excessive acceleration) from 0 to $V_2$. Rather two velocity steps from 0 to $V_1$, then from $V_1$ to $V_2$, will minimize the slip associated with attempting to subject the item 14 to the full acceleration (e.g. F=mA) associated with a single divert direction velocity step from 0 to $V_2$. The divert zone is achieved using one drive roller 230 as described in further detail below.

With reference to FIGS. 26 and 27, the drive roller 230 for the diverter belts 26a, 26b is positioned below the module 10d and may be operatively supported by the frame structure 50, for example. The drive roller 230 is driven by a single motor, such as by an internal motor or an external motor and a drive belt, for example. However, the drive roller 230 as disclosed herein may be driven in a number of different ways utilizing a number of different power schemes to achieve the benefits of the invention. As shown, the drive roller 230 includes first and second roller sections 232, 234, each having a different diameter. More particularly, the first roller section 232 has a diameter $D_F$ and the second roller section 234 has a diameter $D_S$, where $D_F < D_S$. The differing speeds $V_1$, $V_2$, of the diverter belts 26a, 26b, respectively, are achieved by routing each belt 26a, 26b simultaneously over a corresponding one of the first or second roller sections 232, 234 of the drive roller 230. In this regard, the first diverter belt 26a is routed over and driven by the first roller section 232 of the drive roller 230 and the second diverter belt 26b is routed over and driven by the second roller section 234 of the drive roller 230. Each belt 26a, 26b may further be routed, or back-wrapped, over a plurality of idler rollers 236 and the rollers 28, 30 to further support and/or tension the belts 26a, 26b during operation. Moreover the tensioning of the diverter belts 26a, 26b may be accomplished through the use of elastomeric belting materials which do not require the use of a moving tensioning device. The drive rollers and idler rollers 28, 30 of this embodiment may also be explicitly idler rollers, for example. In any event, as the drive roller 230 rotates at a specified constant angular velocity, each of the diverter belts 26a, 26b are driven simultaneously at different resultant speeds $V_1$, $V_2$ as a result of the size difference in the diameters $D_F$, $D_S$ of the first and second roller sections 232, 234 of the drive roller 230, which creates the twin speed divert zone as described above. To this end, it is advantageous to have a module 10d with a dual speed divert zone that is operated with one drive roller 230 and motor due to the limit on available drive force as a result of the low coefficient of friction between item and balls 42 in the ball chain 12. This configuration is also more compact and less complex as compared to configurations requiring multiple driver rollers and motors.

FIG. 26 illustrates one embodiment that may be implemented in accordance with aspects of the invention. As shown, the module 10d includes one or more tensioners 240 utilized to apply a constant force to one or both of the drive and idler rollers 28, 30 to maintain the diverter belt(s) 26, 26a, 26b under a constant tension, particularly as the belt(s) 26, 26a, 26b stretch over time from use. The tensioner 240 may be a gas spring, piston, or other suitable structure for apply a constant force on the one or more belts 26a, 26b of the module 10d and may also include damping to mitigate oscillations caused by wind up of the diverter belts 26, 26a, 26b when loaded during diverting. As shown, the one or more tensioners 240 are operably coupled between one of the drive or idler rollers 28, 30 and a frame member 242 of the module 10d to act on a respective roller. In the embodiment shown, one tensioner 240 is attached to idler roller 28. However, the tensioner 240 may be attached to either one of the drive or idler rollers 28, 30, or both as shown. In any event, a tensioner 240 is configured to laterally space the drive roller 28 from the opposite roller 30 to thereby apply a tensioning force on the diverter belt(s) 26, 26a, 26b. To permit lateral movement of the drive or idler rollers 28, 30 by the tensioner 240, the frame member 242 includes slots 244 through which an axle 246 of the drive or idler rollers 28, 30 is positioned. The tensioners 240 may be connected to the axles 246 of the corresponding drive or idler rollers 28, 30 for belt 26, 26a, 26b tensioning. To this end, the tensioner 240 is configured to continually maintain belts 26, 26a, 26b under proper tension. As the belts 26, 26a, 26b elongate over time, the tension is further configured to adjust the force applied to the belt 26a, 26b to maintain the belts 26, 26a, 26b under a proper and constant tension.

As noted herein, the invention provides a multi-action and synchronous drive of a ball chain. FIGS. 28-36 illustrate such action and various forces and advantages created by the multi-action and synchronous drive of a ball chain. The basics of the drive are described as a build-up of the following action constituents:
1 Face engagement of the facets with the flat chain link
2. Wedge effect on facet engagement of the link
3 Ball in pocket engagement Referring to FIG. 28, the basic face engagement of the ball chain link with the facets of the drive element 20 is depicted with the balls 42 of the ball chain 12 removed for clarity. Tt represents the tension side of the chain 12, which is determined by various factors, but basically is mainly driven by the overall weight of the chain and the amount of catenary sag the chain has. It is this tension force which "holds" the chain links 40 to the facets 70 of the drive element 20. $T_s$ represents the tension on the slack side of the chain 12. The resulting chain link tensions represented by T1, T2, T3, T4 and T5 are shown. In the array of tensions, Link T1 will have the highest tension, whereas T5 has the lowest tension. So, in this regard, T1>T2>T3>T4>T5. The chain links 40 lying on the surfaces of the drive element 20 offer a significant surface area with which to contact the chain 12. It is this surface area in contact which represents the basic underlying driving force of the drive element 20.

Figure 29:
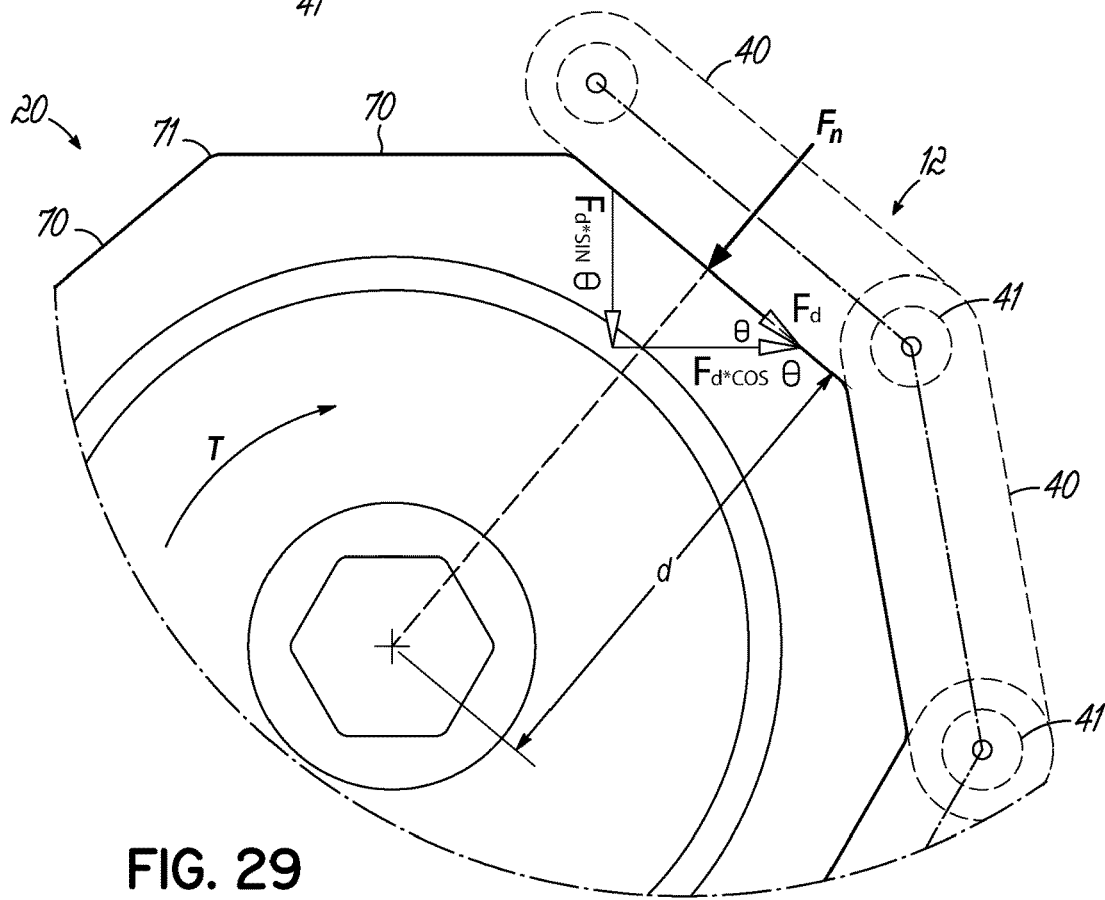

Augmentation of the sheer surface area of engagement for driving the chain is achieved by the wedge effect of the face of the drive element 20. Referring to FIG. 29, as torque, T is applied to the drive element 20 and rotation is started, the link 40 at the 12:00 position is forced to rotate around such that the angle of the facet 70 is at a position where the wedge effect on the drive element starts to take effect. The image shown in FIG. 29 depicts the forces acting on the link 40 at a position rotated 40 degrees, or "one facet cycle" from the 12:00 position. As the drive element 20 is rotating, this angle is changing throughout the rotation cycle. The number of degrees per facet cycle is dependent on the number of facets 70 of the drive element 20, which, in turn, determines the overall size of the drive element.

The angle of the facets 70 with respect to each other, as defined at the transition edges 71, serves to augment the driving force of the surface area in contact by providing a driving force which is based on the angle of the facet. It is obvious that the wedge effect from the transition edges 71 gets lower and lower as more and more facets are added to the drive element based on the change of the facet angle with respect to an adjacent facet. As the drive element 20 rotates and the tail end or transition edge 71 of the facet "heels up", the chain link 40 is presented with a wedge or angled edge that the link would have to climb over to achieve slip. The driving force, $F_d$ represents the chain driving force at that position of drive element 20, and the term $F_d$*Cos Θ represents the X direction driving component which is moving the chain 12 across the bed of the module. $F_d$*Sin Θ represents the component of the drive force which is attempting to force the chain link into the facet 70 of the drive element 20. These forces are in a constant state of change as the angle of the facet, Θ changes throughout the cycle. Since the chain tension is highest at the first position on drive element 20 (as viewed in the direction of travel from the 12:00 position), most of the drive force is occurring in the initial angle of rotation. As the links 40 give up their tension while rotating around the drive element 20, the driving forces become less. Thus, chain tension is important for the function of drive element 20, which is fundamentally no different than for any synchronous drive, such as a chain and sprocket, or timing belt with timing belt pulley.

One of the key advantages of drive element 20 is that it allows the balls 42 of the ball chain 12 to engage with the relief elements or pockets of the drive element 20. This "ball-in-pocket" effect further augments the drive element 20 and the force it provides is additive over and above the surface area contact and wedge effect drive components of the drive. Thus the synchronous drive affect of the invention has multiple actions. This further prevents slippage of the chain on the drive element in addition to just having the links in contact with the facets of the drive element 20.

Figure 30:
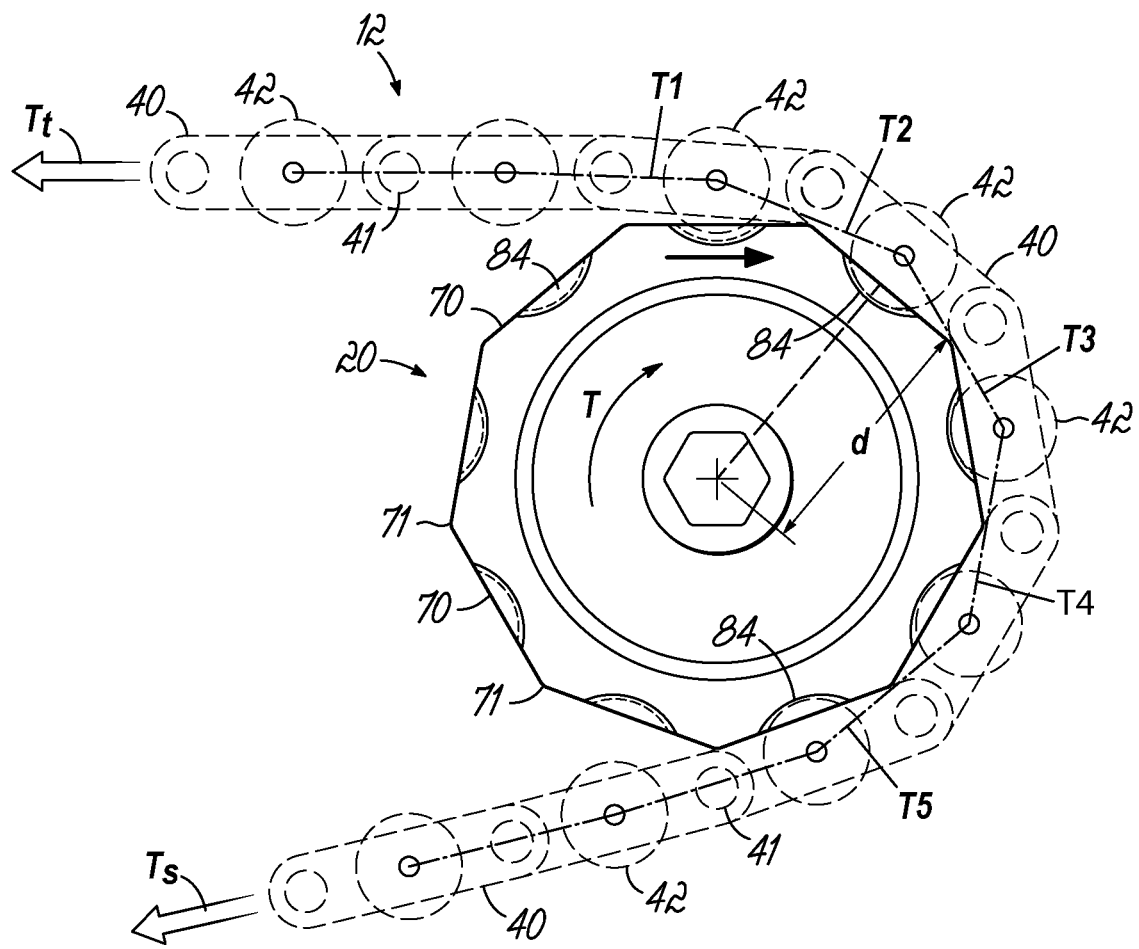
FIGS. 30-31 are side views, in partial section, of a drive element implemented in a conveyor chain drive system of an embodiment of the invention illustrating forces between the chain balls and roller.

The diagram of FIG. 30 depicts the basic interface of the geometry of the chain with the drive element 20. Again, Tt is the high tension side of the ball chain and $T_s$ is the slack side tension of the ball chain. In this Figure, the tensions T1-T5 are being "borne" by the straight line links between actual ball paths. These line to line paths differ from the pin to pin line paths defined by the basic chain links. Again, T1>T2>T3>T4>T5.

Figure 31:
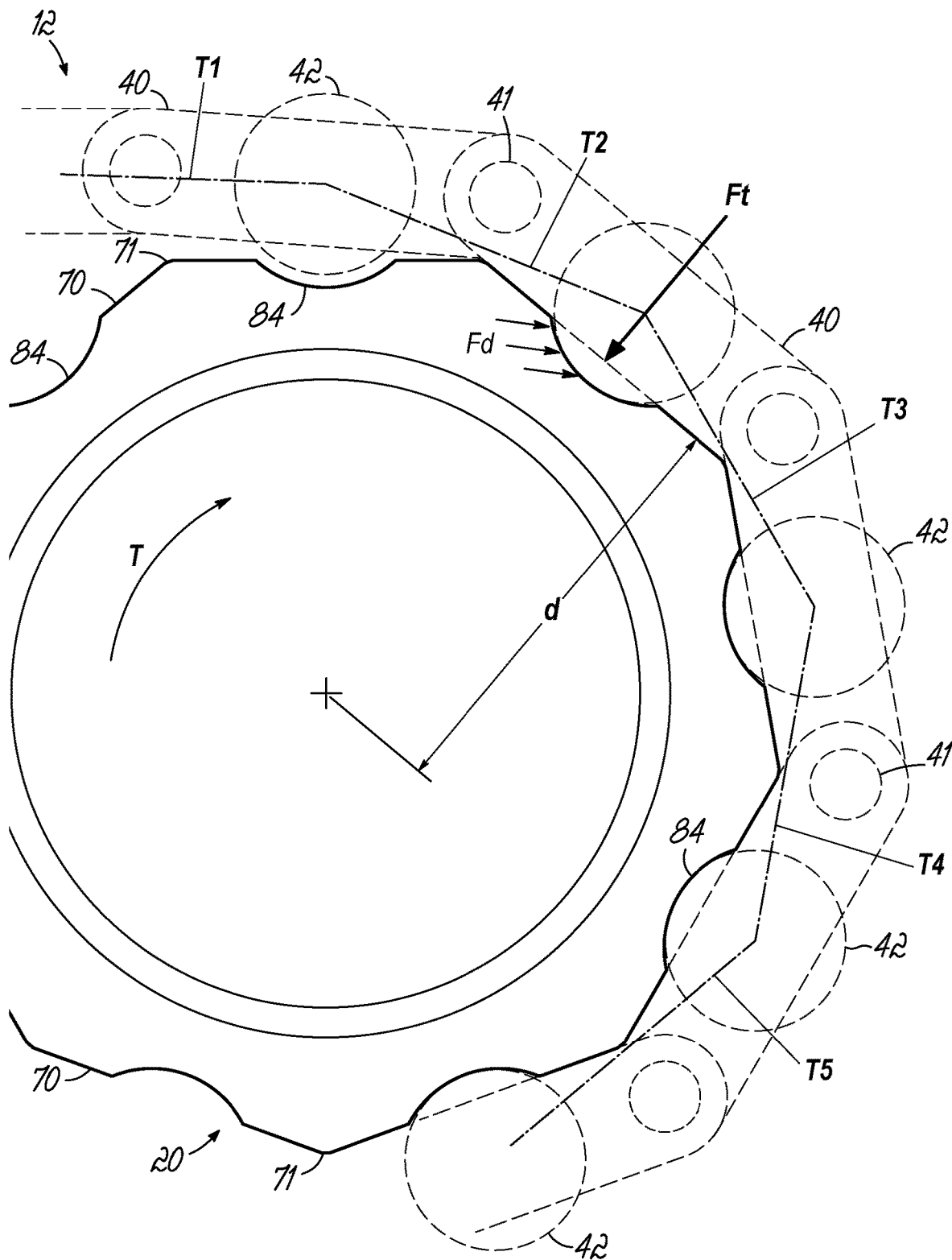

This ball in pocket arrangement works very similarly to a traditional sprocket and chain, with the exception of the drive element 20 relief element or pocket 84 representing a "negative tooth", or perhaps more appropriately the "teeth" in this case are actually connected to the chain and not to the sprocket (i.e. drive element 20). The ball 42 in pocket 84 offers additional resistance to slipping of the drive element 20 by allowing the trailing wall of the drive element 20 pocket to act against the balls of the ball chain 12. While this additional driving "augmentation" is not as significant as say, the impact of a full toothed sprocket on a chain it still does have a significant impact for the drive element 20. Referring to FIG. 31, $F_d$ as depicted here is the driving force of the rear wall of the ball pocket or relief element 84 against the ball 42 of the ball chain 12. At any given time in the cycle there are 4-5 facets 70 and respective sets of relief elements or pockets imparting driving force to the ball chain 12, as the drive element attempts to approach the point of slip, or cogging.

Referring to FIGS. 32-35, the drive element 20 has been broken into basic constituents of just the chain links and then the links with the balls. This figures illustrate a graphical superposition to slip that illustrates the incremental effects of having the various chain balls 42 engaged by the relief elements 84 in addition to the engagement of the flat facets with the chain links 40. A starting point 79 and 180 degree point 77 are shown.

Figure 32:
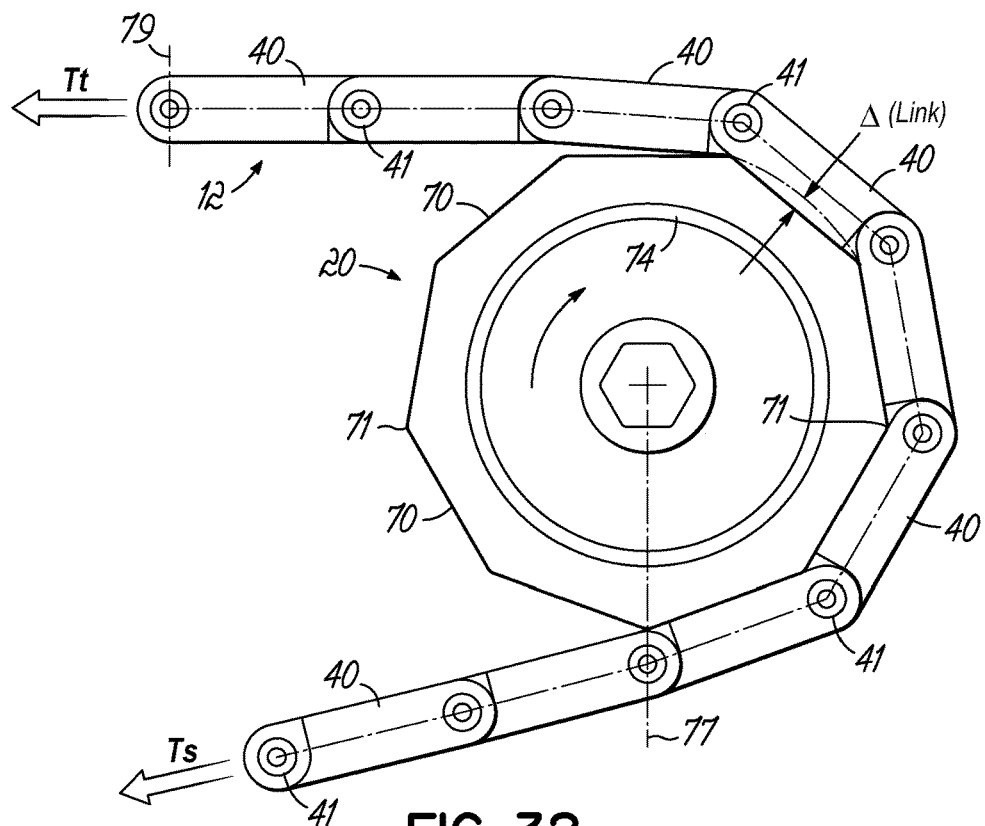
FIGS. 32-35 are side views of a drive element implemented in a conveyor chain drive system of an embodiment of the invention illustrating forces between the chain, chain balls and roller illustrating the resistance to chain slippage.

The normal interface of the drive element 20 with the chain link allows for the face of the link 40 of the chain to lie planer with the facet 70 of the drive element 20. The desired method of operation is to allow the links of the chain to remain in this position relative to the facets of the drive element 20. The swept path or travel path of the rotating body 74 and the drive element facets 70 may be thought of as a circular rotation path. The Δ(link) of FIG. 32 represents the distance required for the drive element 20 to lift the chain link 40 away from the facet 70 of the drive element to attempt to achieve slip, or cogging. The higher that this lift distance is made, the higher the resistance to slip of the chain using the drive element of the invention.

Figure 33:
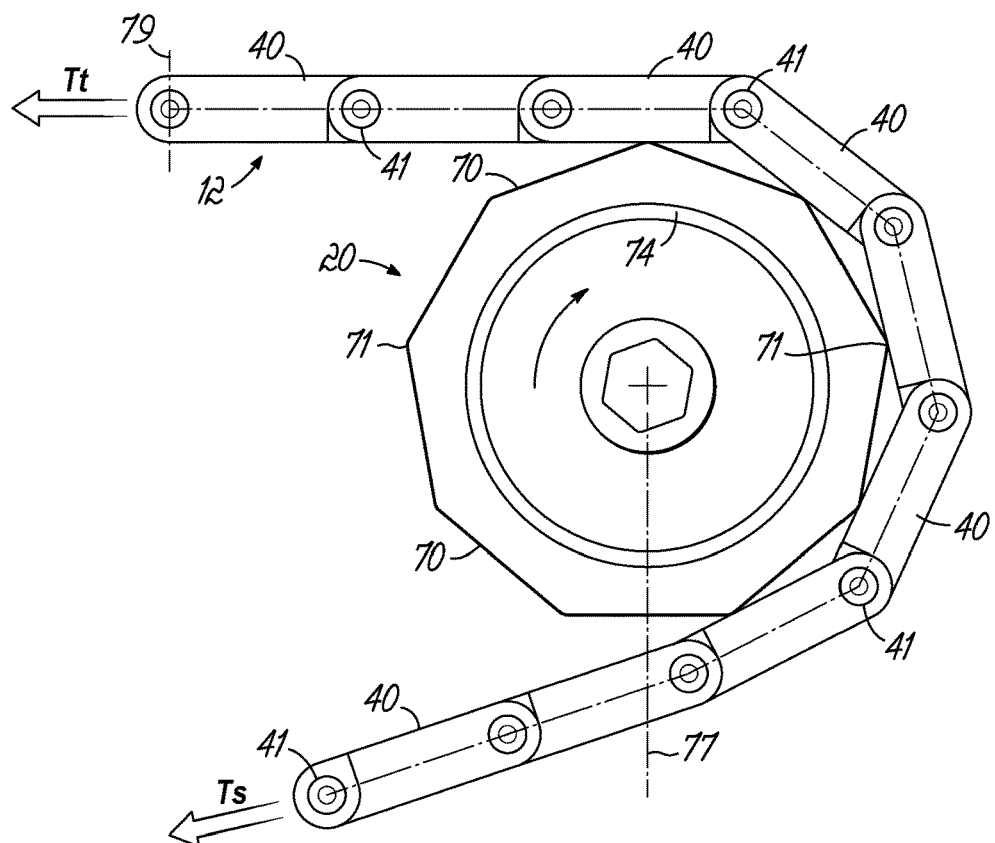

The FIG. 33 graphically depicts what happens if the drive element 20 were to go into full slip or cogging against the link of the ball chain 12. In this depiction, the balls have been removed to show the impacts of just the angled, planar facets of drive element 20 against the flat link 40 of the chain 12. Clearly this is not a desirable state of operation, but as can be seen from the diagram some incremental amount of chain link is now required to get to the same relative point which is depicted as the 180 degree point 77 on the FIGS. 33-36.

Figure 34:
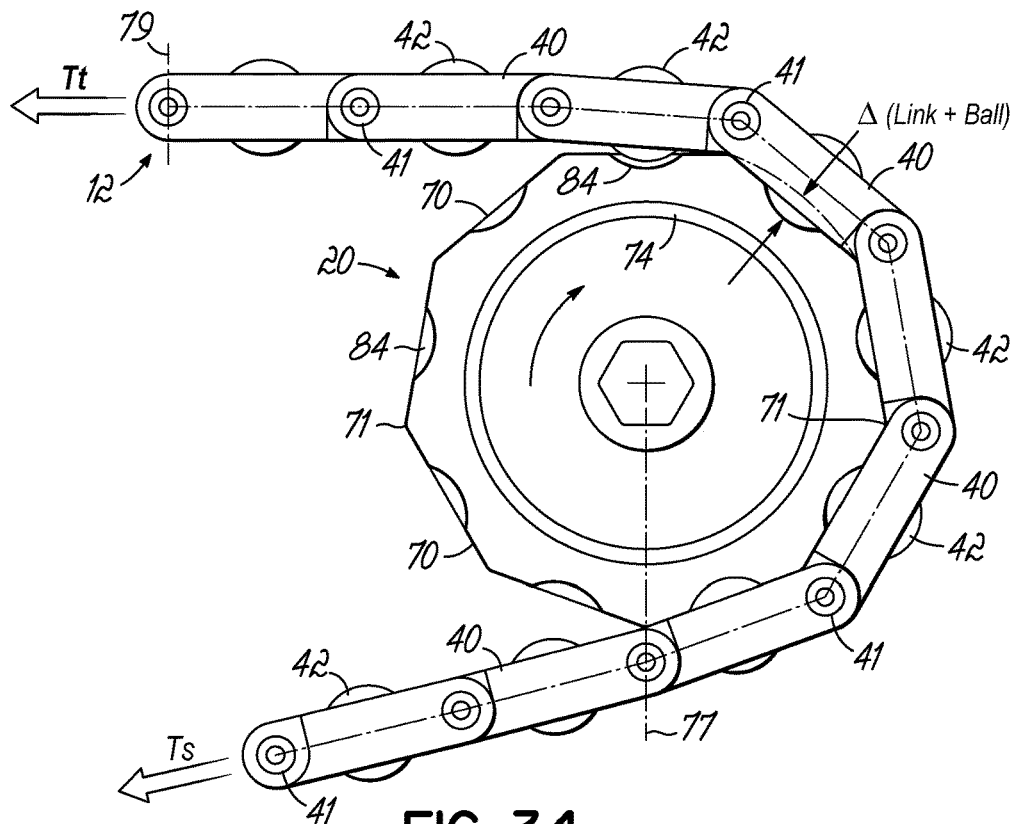
Figure 35:
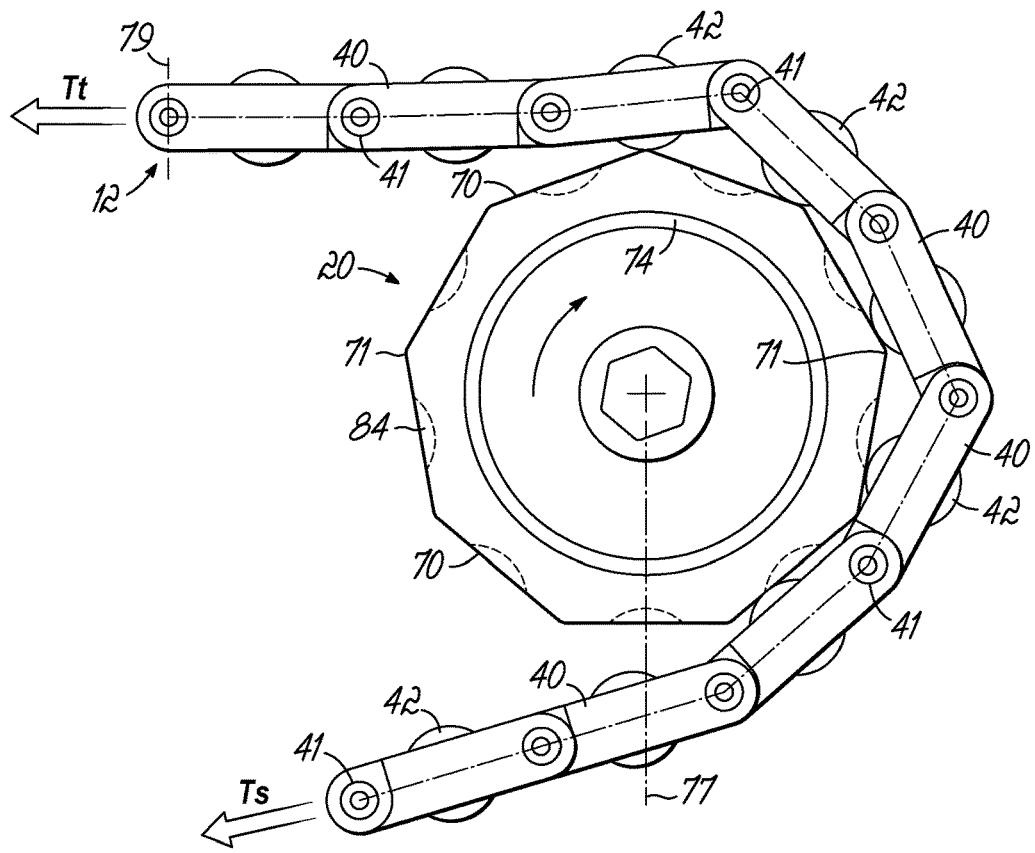

Adding the balls 42 back into the equation, as is shown in FIGS. 34-35 more clearly shows the actual scenario at play in the drive element of the invention. In this case, the Δ(link+ball) is depicted. This distance represents the distance the base of the ball 42 of chain has to be lifted to clear the transition edge 71 of the facet 70 of the drive element 20. It is a higher distance than the distance required to lift just the link 70 when the balls 42 are not present. Therefore in accordance with another feature of the invention Δ (link+ball)>Δ (link)

Progressing further to full slip or cog of the drive element 20 against a fully functional ball chain 12 looks significantly different than just the links themselves do without the balls. Since the chain links with balls have to be lifted a higher distance to achieve slip, and in turn, the balls have to roll over the trailing transition edges 71 of the facets 70 of the drive element 20, the graphical depiction takes on a slightly more unique configuration as shown in FIG. 35. Of significant note is the additional length of chain 12 which is now required to get to the same relative 180 degree point 77 as depicted in the previous models so that the links lie flat on the facets. In this way, it is shown graphically that, using the unique drive element of the invention, the balls 42 contribute positively to creating an even higher threshold of slip than the just the chain links offer by themselves.

Figure 36:
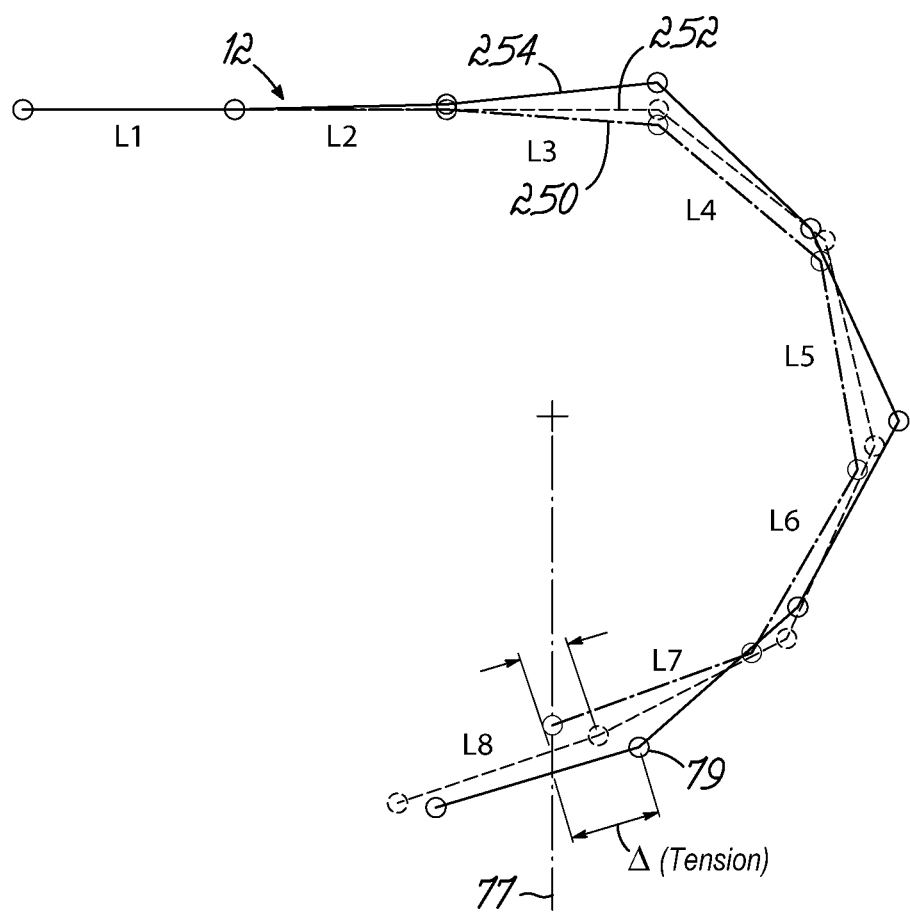
FIG. 36 is a side view of potential slip paths of a drive element implemented in a conveyor chain drive system of the invention illustrating the resistance to chain slippage.

The unique facets 70 and transition edges 71 of the drive element 20, and the engagement with the links 40 and with balls 42 at slip, illustrates the significant resistance to slipping presented by the invention. FIG. 36 illustrates the paths for slip prevention in accordance with the invention. The path shows the possible chain link slip paths around the drive element 20 at normal operation as shown by path 250, the slip path 252 with just the link, and the slip path 254 with link+ball. In order for the drive element 20 to achieve slip, or cog, the FIG. 36 shows an incremental length of chain A (tension) required to get from the arbitrary start point 79 to the same 180 degree point 77. In one embodiment of a ball chain 12, the results achieved using actual geometry are as follows:

Normal Operation: 7 links
Slip with just Link 7.23 Links
Slip with Link+Ball: 7.43 Links The additional link length required as is reflected in the present invention based upon slip scenarios of the ball chain would increase the chain tension as will be understood. As chain tension increases, resistance to slip also increases, and therefore the ability to transmit more driving force also increases. The 0.23 and 0.43 links of additional length, using the inventive drive element, creates an increase in chain tension which is not linear. The resistance to slip of the drive element 20 is significantly higher than a simple cylinder drive imparting a friction-only based drive force to the chain links. The flat facets 70 of the drive and the sharp transition edges 71 prevent slipping. The addition of the balls 42 in the links 40 with interface to the relief elements 84 or pockets, further augments the synchronous nature of the drive element 20.

The drive element 20 represents a cost-effective, fully synchronous drive which can be used to impart a driving force to any commercially available ball belt chain. The drive is unique in that it is using a multi-action driving method to the chain, including an interface of the flat facets 70 of the drive element 20 to the links of the ball chain, the wedge-drive augmentation off of the transition edges 71 of the drive element 20 and the incremental driving force from the effects of the balls 42 in the relief element/pockets 84 of the drive element 20. As such the overall drive force of the drive element 20 can be described by:

Total Drive Force=Impact of Surface of Link on facets+the impact of the transition edges (e.g. wedge effect)+the impact of the balls in the relief elements/pockets.

The drive element 20 of the invention is a viable way to effectively drive any of commercially available ball chain. The unique shape factor of the drive element 20 has been proven empirically proven to effectively drive a transfer module more robustly and with less slip than some available roller-based drive systems. The invention offers the ability to transmit more power than other available roller based drive systems and avoids the increased noise, complexity, and cost associated with traditional sprocket drive based designs. Additionally the ability to drive the working side 13 of the chain 12, or the back side 15 of the chain allows for maximum configuration flexibility.

FIGS. 37 and 37A illustrate an alternative embodiment of a chain drive element. Rather than facets, the drive element 290 incorporates a body 292 that is configured to rotate. For example, the body might be a cylindrical body incorporated into a motor driven roller (MDR). The body might also be driven in some other fashion to rotate to drive a conveyor chain. For chain engagement, the drive element 290 incorporates sprockets 306 implemented on slidable sleeves 300. The sprockets are configured for engaging a surface of a chain 12 to drive the chain, as shown in FIG. 37A, such as by engaging pockets (not shown) in the chain surface as would be understood by a person of skill in the art. Referring to FIG. 37A, teeth 308 of the sprockets 306 engage with a surface of the chain 12 for driving the chain. The chain 12, similar to other chains described herein, may be a ball chain having links 40 and balls 42.

The sleeves 300 are configured to slide over the body. For example, if the body is cylindrical as shown in FIG. 37, the sleeves might have a circular cross-section to slide down the cylindrical body and into place on the body. To fix the sprockets 306 on the body 292 to be rotated, one or more sprockets are coupled with or integrally formed with a respective sleeve 300. In the embodiment in FIG. 37, each sleeve includes a sprocket 306, as illustrated. Each sleeve 300 is configured so the sleeve and sprocket slide onto the body 292 and down the length of the body. The sprocket sleeves 300 engage without fasteners or keys on the body 292.

More specifically, the body 292 includes a plurality of lugs 302 that are fixed to extend radially on the body. The lugs 302 are positioned along the length of the body. Each of the sleeves 300 includes slots 304 and the sleeves are slid on the body 292 so the slots 304 slide onto the lugs 302. The slots 304 are configured in the sleeves 300 and with respect to the lugs so that they snap or click lock onto the lugs or otherwise lock onto the lugs. The slots 304 of each sleeve 300 are configured to snap onto a respective lug 302. In that way, the drive element includes a plurality of sprockets along the length of the body to engage a chain to drive the chain. For sliding the sleeves 300 over intervening lugs 302, the sleeves include keyways or passages 310 formed in the sleeve to allow the sleeve to pass over the lugs. The passage 310 of a sleeve is aligned with a lug and slid down the body and over the lug to the proper position along the length of the body. The lug slides through the passage of a sleeve allowing the sleeve to pass over the lug and into a desirable position near another lug. The sleeve may then be rotated on the body to align the slot 304 with the respective lug 302. The sleeve 300 is then snapped onto the respective lug 302 to fix the sleeve and sprocket(s) 306 in position. The drive element may then be used as any other sprocketed drive element to drive the chain 12. To remove the sprocket, such as for repair or replacement, the sleeve 300 may be slid to unsnap the lug 302 from the slot 304, then rotated so it can slide off the body with the sleeve passage 310 sliding over intervening lugs, then slid from the body to be removed. The sprocket 306 may be molded or machined from a wide variety of materials which allow for the snap lock feature to facilitate easy installation and removal of the sprocket, yet provide adequate driving force. Suitable elastomeric materials include, but are not limited to: urethane thermoplastic rubber, nylon, ethylene propylene diene monomer rubber (EPDM). Hardness of the elastomeric material used on the sprocket 306 may encompass a wide range with typical values falling between a Shore D hardness of between 70 and 75.

Alternately, the teeth 308 of the sprocket 306 may be formed of a softer elastomeric material in the range of 90-90 Shore A. In this way the sprocket hub 300 may be of a harness which is significantly higher than that of the teeth 308. This "dual durometer" allows the slideable sleeve 300, to be able to properly transmit the drive force imparted to the lug 302, from the surface layer 74a of the driver. Alternately the softer material of the teeth 308 allows for quieter operation of the chain 12 as compared to traditional designs which utilize a harder material throughout the body of the sprocket (e.g. 308+306). It is to be understood that various materials and/or hardness may be applied to the sprocket 306 without limiting the overall scope of the invention.

Accordingly, the conveyor module of any previous embodiment of the invention which implements the inventive drive elements as described herein which incorporate a faceted element or roller-style element in combination with ball relief elements provides a synchronous multi-action drive function for the ball chain. Furthermore, the synchronous drive features of the drive elements in addition to the durometer rating for the urethane provides a low noise drive of the ball chain. Drive elements described herein can be manufactured and configured at a lower cost than traditional available driveshafts incorporating sprockets, or rolling elements incorporating sprocket-like features. Additionally, the configuration of the drive element may be implemented in other elements of the conveyor module, such as idler elements and snub roller elements to provide a benefit to the invention in a cost-effective way to power, support and return the loop of the ball chain. The unique construction and configuration of such drive elements and other elements provide the ability to utilize a back-wrapped drive configuration as discussed herein. Furthermore, the scalability of the design allows the different drive elements to be used to drive various ball chains and ball chain chains from different manufacturers, allowing maximum flexibility for sourcing of ball chains from multiple suppliers. Accordingly, the present invention presents significant advantages in functionality, cost, longevity, sound levels and reliability over existing drive technology for ball chains.

Additionally, the inventive elements associated with the diverter belt system, transition guide(s), tracking groove, herringbone or curved belt protrusion, belt tensioning and multiple speed divert belts as described herein represent significant improvements in current state of the art as it pertains to utilization with commercially available ball chains. The unique construction and configuration of these inventive elements allows for enhanced performance, reduced cost, reduced component wear and ease of maintenance as compared to current state of the art equipment.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

What is claimed is:

1. A conveyor system comprising:
a chain including a plurality of links that are coupled together in a loop and hinge with respect to each other at hinge points;
the chain including a plurality of balls that freely rotate in at least one link to define a row of balls of the link;
the chain configured to move in the loop around a drive element and a driven roller;
the drive element configured for engaging the chain to drive the chain around the drive element and driven roller in a conveying direction, the drive element rotating in a first direction and including:
an elongated body configured for rotating about a longitudinal axis, the body including a surface layer on the body;
the surface layer having a plurality of generally planar facets arranged around the longitudinal axis of the elongated body, each of the facets extending along the body and configured for engaging a respective link of the chain as the body is rotated to drive the chain;
relief elements located in each facet, the relief elements configured for receiving the balls of a link engaging the facet so the link lies generally flat on the facet when the chain is driven;
the driven roller configured for rotating in a second direction opposite to the first direction of the drive element as the chain is driven and engaging balls of the chain to rotate the balls in the first direction.

2. The conveyor system of claim 1 wherein the driven roller includes a layer of friction material thereon for engaging balls of the ball chain to rotate the balls.

3. The conveyor system of claim 1 further comprising a plurality of grooves located on the driven roller, the grooves configured for receiving and engaging balls of a link that engages the driven roller so the balls are rotated by the driven roller.

4. The conveyor system of claim 3 wherein at least one of the driven roller grooves includes a layer of friction material in the at least one groove for engaging balls of the ball chain to rotate the balls.

5. The conveyor system of claim 1 wherein the plurality of generally planar facets are contiguous with each other around the elongated body to form a plurality of transition edges extending along the body, the transition edges configured for engaging hinge points of the chain as the chain is driven.

6. The conveyor system of claim 1 wherein the drive element includes 9 generally planar facets arranged around the elongated body.

7. The conveyor system of claim 1 wherein the drive element rotates at a first velocity in the first direction and the driven roller rotates at a second velocity in the second direction that is different than the first velocity.

8. The conveyor system of claim 7 wherein the second velocity is higher than the first velocity.

9. The conveyor system of claim 1 further comprising:
a diverter belt positioned beneath the chain for engaging the balls of the chain to rotate the balls as the chain is driven over the diverter belt;
the diverter belt selectively driven in a direction generally perpendicular to the conveying direction for rotating the balls of the chain to divert an item conveyed on the chain.

10. The conveyor system of claim 1 further comprising:
a transition ramp positioned under the chain and proximate to the driven roller, the transition ramp including a plurality of landing guides configured to align with the plurality of balls of a link for guiding a link and rotating balls of the link from the driven roller.

11. A conveyor system comprising:
a chain including a plurality of links that are coupled together in a loop and hinge with respect to each other at hinge points;
the chain including a plurality of balls that freely rotate in at least one link to define a row of balls of the link;
the chain configured to move in the loop around a drive element and a stationary roller;
the drive element configured for engaging the chain to drive the chain around the drive element and driven roller in a conveying direction, the drive element rotating in a first direction and including:
an elongated body configured for rotating about a longitudinal axis, the body including a surface layer on the body;
the surface layer having a plurality of generally planar facets arranged around the longitudinal axis of the elongated body, each of the facets extending along the body and configured for engaging a respective link of the chain as the body is rotated to drive the chain;
relief elements located in each facet, the relief elements configured for receiving the balls of a link engaging the facet so the link lies generally flat on the facet when the chain is driven;
the stationary roller including a friction surface for engaging the balls of the chain as the chain is driven therearound to rotate the balls in the first direction.

12. The conveyor system of claim 11 further comprising a plurality of grooves located on the stationary roller, the grooves configured for receiving and engaging balls of the ball chain to rotate the balls.

13. The conveyor system of claim 12 wherein the roller includes a layer of friction material in the grooves for engaging balls of the ball chain to rotate the balls.

14. A conveyor system comprising:
a frame structure having opposing sides;
a chain having a width and including a plurality of links that are coupled together in a loop and hinge with respect to each other at hinge points;
the chain including a plurality of balls that freely rotate in at least one link to define a row of balls of the link;
the chain configured to move in the loop driven by a drive element;
the drive element configured for engaging the chain to drive the chain around the drive element in a conveying direction, the drive element rotating in a first direction and including:
an elongated body configured for rotating about a longitudinal axis, the body including a surface layer on the body;
the surface layer having a plurality of generally planar facets arranged around the longitudinal axis of the elongated body, each of the facets extending along the body and configured for engaging a respective link of the chain as the body is rotated to drive the chain;
relief elements located in each facet, the relief elements configured for receiving the balls of a link engaging the facet so the link lies generally flat on the facet when the chain is driven;
a plurality of diverter belts positioned beneath the chain for engaging the balls of the chain to rotate the balls as the chain is driven over the diverter belts;
the diverter belts selectively movable in a direction generally perpendicular to the conveying direction of the chain for rotating the balls of the chain to divert an item conveyed on the chain;
at least one of the diverter belts being a partial-width diverter belt extending from a side of the frame structure but less than the full width of the chain.

15. The conveyor system of claim 14 further comprising a plurality of partial-width diverter belts positioned beneath the chain, the partial-width diverter belts being independently movable with respect to each other.

16. The conveyor system of claim 15 wherein at least two of the partial-width diverter belts are independently movable with respect to each other to move in the same direction with respect to the chain.

17. The conveyor system of claim 15 wherein at least two of the partial-width diverter belts are independently movable with respect to each other to move in opposite directions with respect to the chain.

18. The conveyor system of claim 14 further comprising:
a plurality of rollers, a diverter belt traveling in a loop over the rollers;
a tensioner operably coupled with at least one of the plurality of rollers, the tensioner acting on the roller for maintaining the diverter belt under tension.

19. The conveyor system of claim 14 further comprising:
a plurality of rollers, a diverter belt traveling in a loop over the rollers;
a tracking guide on the diverter belt, at least one of the plurality of rollers including a guide groove configured to interact with the belt tracking guide to prevent drift of the diverter belt.

20. The conveyor system of claim 19 wherein the at least one relief element includes at least one of a depression, an axial groove or a perpendicular groove.

* * * * *